US008402667B2

(12) United States Patent
Spaulding

(10) Patent No.: US 8,402,667 B2
(45) Date of Patent: Mar. 26, 2013

(54) CLAMP LEVEL

(75) Inventor: James Spaulding, Bristol, CT (US)

(73) Assignee: Stanley Black & Decker, Inc., New Britain, CT (US)

( * ) Notice: Subject to any disclaimer, the term of this patent is extended or adjusted under 35 U.S.C. 154(b) by 291 days.

(21) Appl. No.: 12/726,180

(22) Filed: Mar. 17, 2010

(65) Prior Publication Data

US 2011/0146091 A1 Jun. 23, 2011

Related U.S. Application Data

(60) Provisional application No. 61/287,479, filed on Dec. 17, 2009.

(51) Int. Cl.
*G01C 9/02* (2006.01)
*G01C 9/24* (2006.01)

(52) U.S. Cl. .............................. 33/372; 33/370

(58) Field of Classification Search ............. 33/370–373
See application file for complete search history.

(56) References Cited

U.S. PATENT DOCUMENTS

| 9,867 | A | 7/1853 | Sherman |
| 478,309 | A | 7/1892 | Burchinal |
| 527,815 | A | 10/1894 | Schnell |
| 634,657 | A | 10/1899 | Young |
| 1,074,367 | A | 9/1913 | Keefauver |
| 1,153,760 | A | 9/1915 | Butler |
| 1,229,916 | A | 6/1917 | Duncan |
| 1,909,267 | A | 5/1933 | Colt |
| 2,624,118 | A | 1/1953 | Anderson |
| 3,296,708 | A | 1/1967 | Moody |
| 3,707,772 | A | 1/1973 | Cotter |
| 4,066,232 | A | 1/1978 | Hermeyer |
| 4,829,676 | A * | 5/1989 | Waldron .......................... 33/372 |
| 4,970,796 | A | 11/1990 | Masters et al. |
| 5,402,579 | A | 4/1995 | Smith |
| 5,408,752 | A | 4/1995 | Eadens |
| 5,442,864 | A | 8/1995 | Erman |
| 5,581,900 | A | 12/1996 | Payne |
| 5,749,151 | A | 5/1998 | Scott et al. |
| 5,799,404 | A | 9/1998 | Payne |
| 5,815,937 | A * | 10/1998 | Glorioso, Jr. .................... 33/370 |
| 5,819,425 | A * | 10/1998 | Payne .............................. 33/370 |
| D409,100 | S | 5/1999 | Brimer |
| 5,996,238 | A | 12/1999 | Yonke |
| 6,029,359 | A * | 2/2000 | Szumer ............................ 33/373 |
| 6,131,298 | A | 10/2000 | McKinney et al. |
| 6,332,277 | B1 | 12/2001 | Owoc et al. |
| 6,640,456 | B2 | 11/2003 | Owoc et al. |
| 6,792,686 | B2 | 9/2004 | Krehel et al. |
| 6,796,045 | B2 | 9/2004 | Hallee |
| 6,839,973 | B1 | 1/2005 | Woodward |
| 7,555,842 | B1 * | 7/2009 | Asay ................................. 33/373 |
| 7,562,462 | B2 * | 7/2009 | Gentleman et al. .............. 33/372 |
| 7,644,506 | B2 * | 1/2010 | Wong ............................... 33/373 |

(Continued)

FOREIGN PATENT DOCUMENTS

EP 0126844 12/1984
FR 2685083 6/1993

*Primary Examiner* — Yaritza Guadalupe-McCall
(74) *Attorney, Agent, or Firm* — Pillsbury Winthrop Shaw Pittman LLP

(57) ABSTRACT

A device for determining the relationship of a surface relative to level is provided, the device having an elongated body portion and at least one attachment portion for attaching the elongated body portion to a workpiece. The at least one attachment portion may include a clamp or other attachment mechanism that can be stored in a storage position and deployed in at least one deployed position so as to attach the elongated body portion to the workpiece.

52 Claims, 41 Drawing Sheets

U.S. PATENT DOCUMENTS

| | | | |
|---|---|---|---|
| 8,061,051 B2* | 11/2011 | Allemand | 33/371 |
| 2001/0034945 A1* | 11/2001 | Smochek | 33/373 |
| 2005/0120572 A1 | 6/2005 | Valenti | |
| 2006/0137200 A1 | 6/2006 | Lollar et al. | |
| 2007/0245580 A1 | 10/2007 | Jelinek | |
| 2008/0141546 A1 | 6/2008 | Strutt et al. | |
| 2008/0235967 A1* | 10/2008 | Gentleman et al. | 33/372 |
| 2008/0271331 A1* | 11/2008 | Allemand | 33/371 |
| 2009/0205214 A1* | 8/2009 | Wong | 33/371 |
| 2011/0146091 A1* | 6/2011 | Spaulding | 33/372 |

* cited by examiner

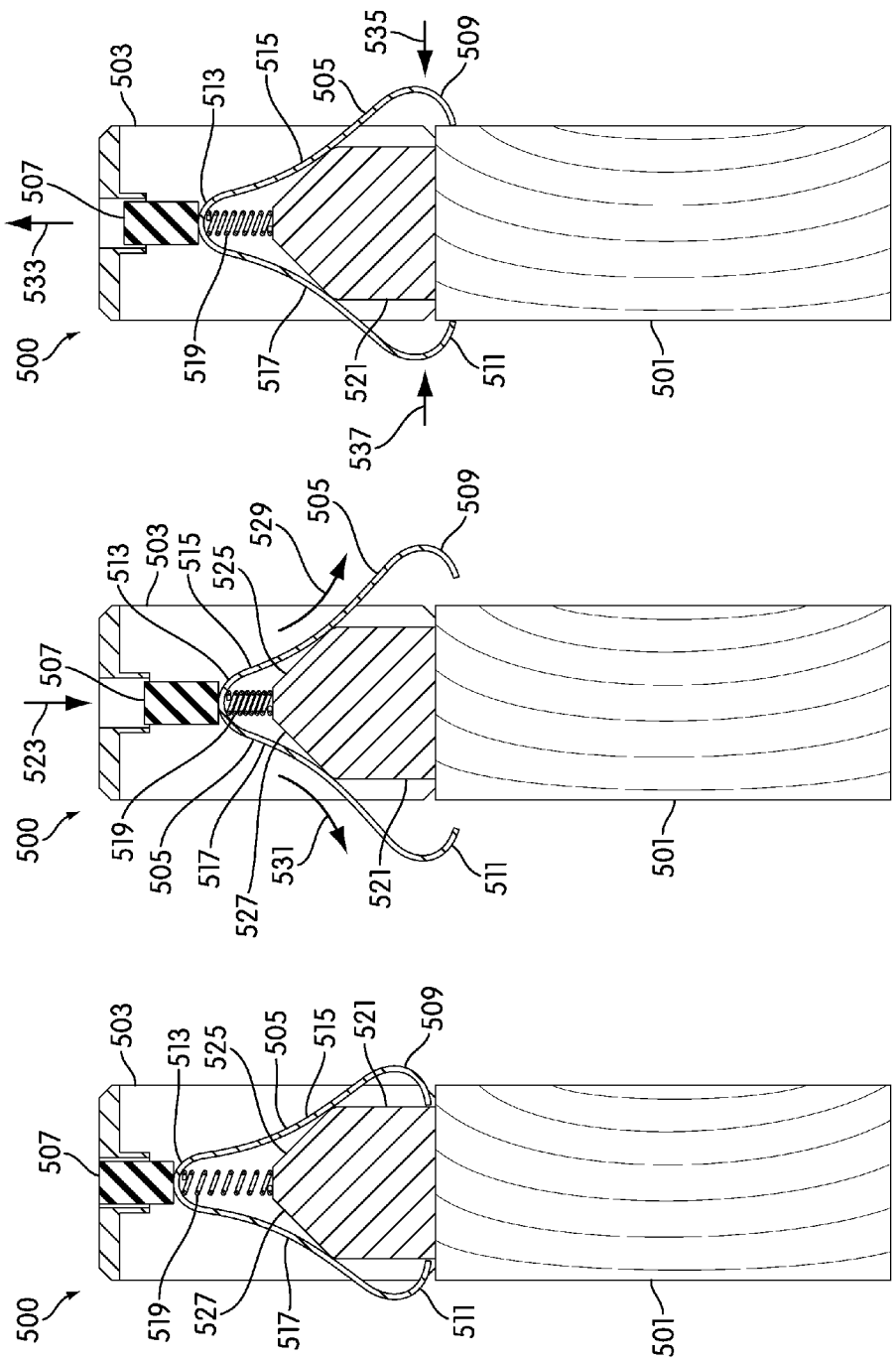

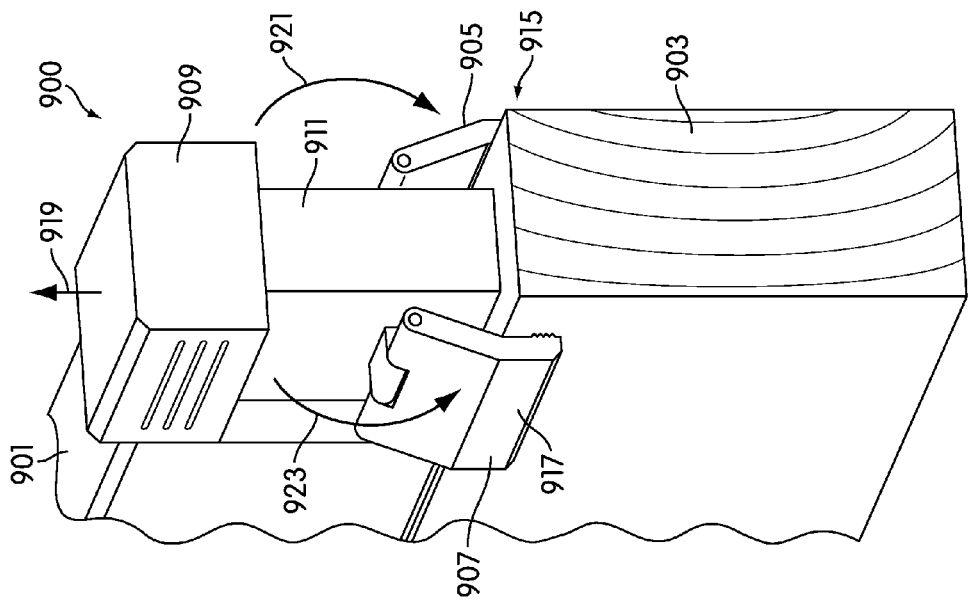
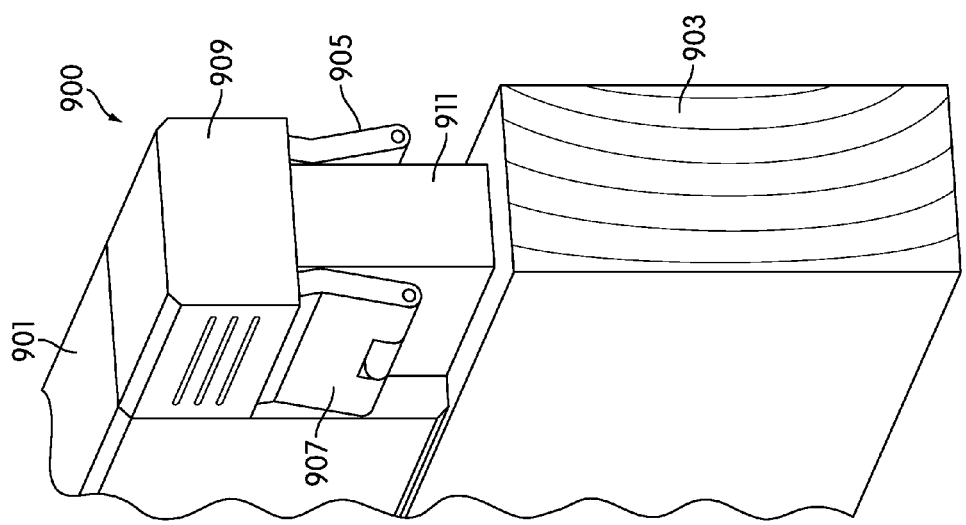
FIG. 9B
FIG. 9A

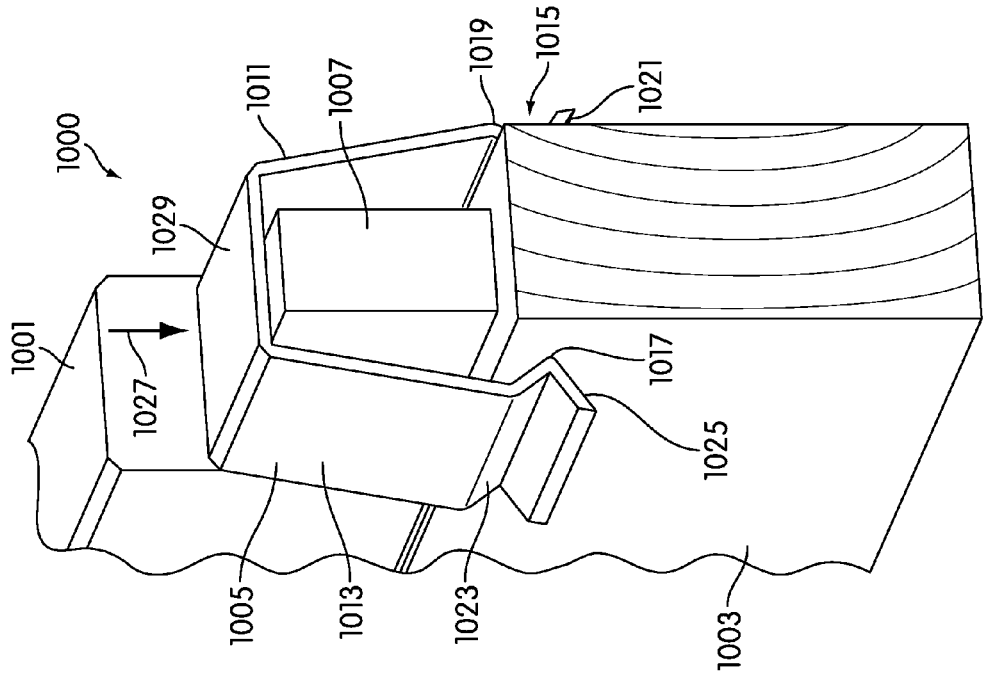
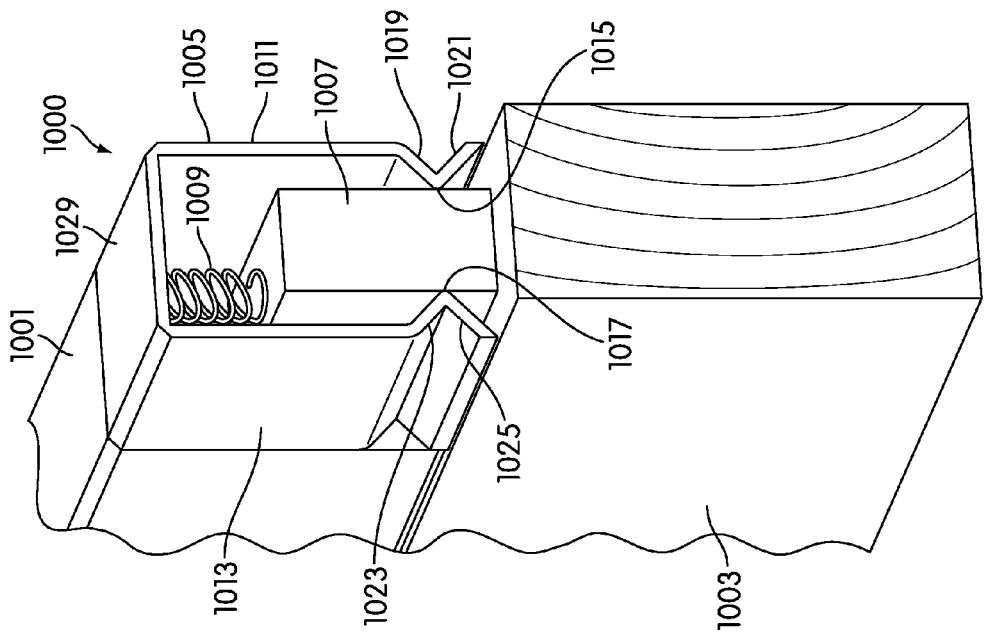

CLAMP LEVEL

REFERENCE TO RELATED APPLICATIONS

This application claims the benefit of U.S. Provisional Patent Application No. 61/287,479, filed Dec. 17, 2009, the contents of which are hereby incorporated by reference herein in their entirety.

BACKGROUND

1. Field of the Invention

The invention relates to a level that is attachable to a workpiece or object via one or more clamp portions.

2. Description of Related Art

When working with devices that sense or indicate the inclination/declination (if any) of a surface to level (hereinafter "levels"), workers often have a need to place a level on a surface. Thus, it is desirable to removably secure levels to surfaces in various positions.

BRIEF SUMMARY

The invention relates to a level device that is attachable to a workpiece. In some implementations, the level device includes an elongated body portion having one or more level-sensing elements incorporated therein. The level device also includes one or more attachment portions that enable attachment of the elongated body to a workpiece.

In some implementations, the one or more attachment portions may include one or more clamps that enable clamping of the elongated body to a workpiece. In some implementations, a clamp that attaches the elongated body to a workpiece may include at least two clamp members that clamp the workpiece therebetween. In some implementations, clamp members of a clamp are configurable in a storage position and at least one deployed position. In some implementations, clamp members of a clamp are deployable in more than one deployed position, wherein each deployed position enables clamping of the elongated body to a different sized workpiece (or different size range). In some implementations, when clamp members are configured in a storage position, the elements of the clamp do not exceed the height and/or width dimensions of the elongated body portion of the level device.

In some implementations, a clamp used to attach an elongated body of a level device to a workpiece may include a stationary member and at least one movable member, wherein the workpiece is clamped between the stationary member and the at least one movable member.

In some implementations, a clamp used to attach an elongated body of a level device to a workpiece may include one or more rigid elements (e.g., springs) that bias the elongated body towards the workpiece when the clamps are attached to the workpiece. This promotes contact between the elongated body and the workpiece and enables more reliable measurement of the workpiece's relationship to level in a myriad of angles and positions.

In some implementations, the attachment portion includes an attachment member such as, for example, one or more spikes or screws that penetrate the workpiece to attach the elongated body thereto.

These and other objects, features, and advantages of the invention will be apparent through the detailed description and the drawings attached hereto. It is also to be understood that both the foregoing summary and the following detailed description are exemplary and not restrictive of the scope of the invention.

BRIEF DESCRIPTION OF THE DRAWINGS

FIG. 5A illustrates a cross-section of a clamp and a workpiece according to various implementations of the invention.

FIG. 5B illustrates a cross-section of a clamp and a workpiece according to various implementations of the invention.

FIG. 5C illustrates a cross-section of a clamp and a workpiece according to various implementations of the invention.

FIG. 9A illustrates at least a portion of an end of a clamp level and a workpiece according to various implementations of the invention.

FIG. 9B illustrates at least a portion of an end of a clamp level and a workpiece according to various implementations of the invention.

FIG. 10A illustrates at least a portion of an end of a clamp level and a workpiece according to various implementations of the invention.

FIG. 10B illustrates at least a portion of an end of a clamp level and a workpiece according to various implementations of the invention.

DETAILED DESCRIPTION

Figure 1:
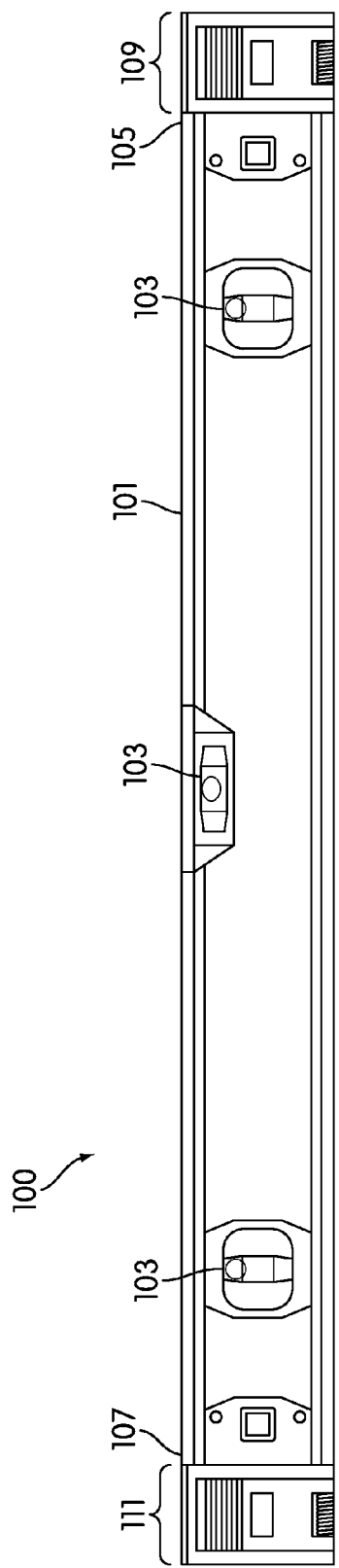
FIG. 1 illustrates a clamp level according to various implementations of the invention.

In some embodiments, an elongated level sensing/indicating device having one or more clamps carried by a body portion is provided. FIG. 1 illustrates a level 100, which is an example of a level having two clamping ends according to one embodiment. Level 100 includes an elongated body portion 101 having one or more level-sensing/indicating elements 103 incorporated therein. Elongated body portion 101 includes a first end 105 and a second end 107. In some implementations, elongated body portion 101 may include a rigid frame made of metal, plastic, wood, or other suitable rigid material. In some implementations, one or more level sensing elements 103 may include bubble vials, electronic sensors/indicators, or other level sensing/indicating elements that determine the relationship and/or orientation of a surface upon which elongated body 101 is placed to level (relative to the surface of the earth).

In some implementations, level 100 also includes a first clamp 109 attached to first end 105 of body portion 101 and a second clamp 111 attached to second end 107 of body portion 101.

Figure 2A:
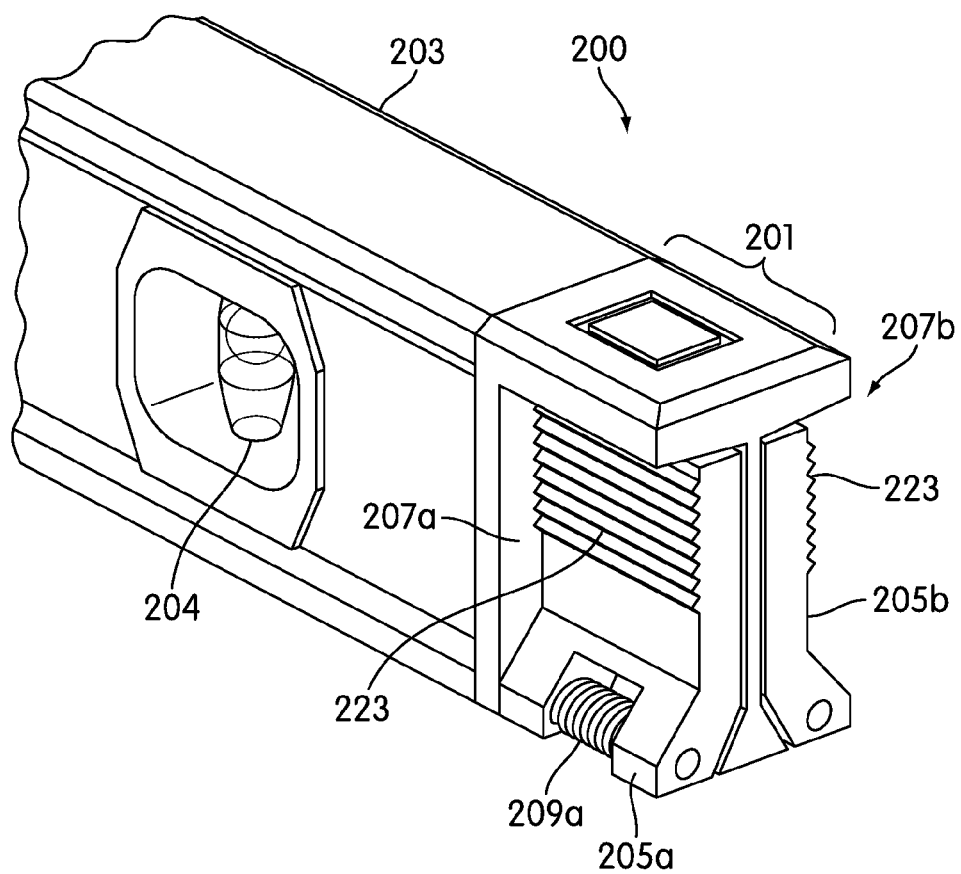
FIG. 2A illustrates an end of a clamp level according to various implementations of the invention.
Figure 2B:
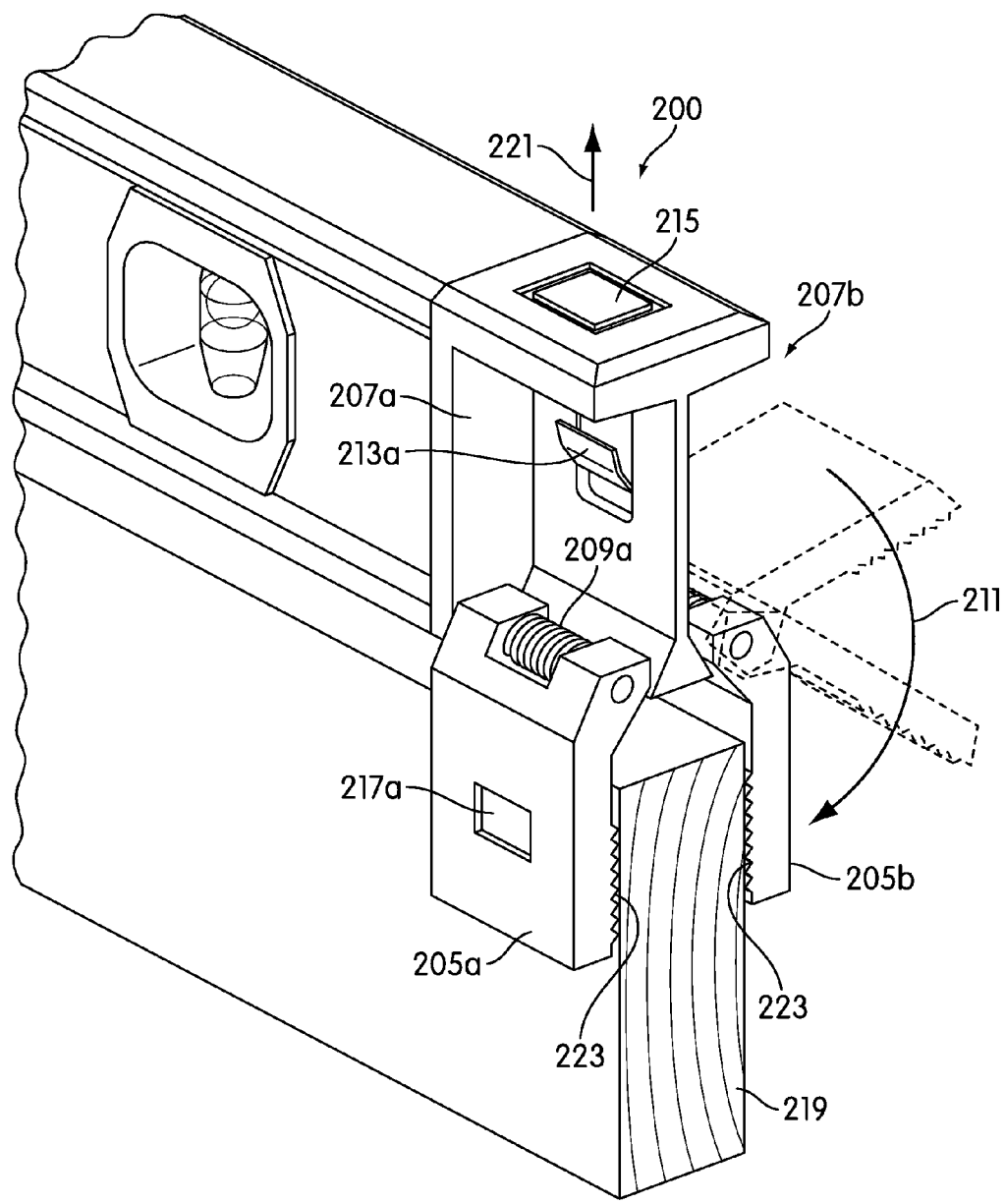
FIG. 2B illustrates an end of a clamp level and a workpiece according to various implementations of the invention.

In some implementations, a clamp used with a level as described herein may include a clamp body and two or more clamp members. FIGS. 2A and 2B illustrate a clamp 200, which includes a clamp body portion 201 attached to an end of elongated body portion 203 (having level sensing/indicating element 204) and two clamp members 205a and 205b.

In some implementations, clamp body portion 201 may include two recessed areas 207a and 207b. As shown, clamp member 205a, in one implementation, is pivotably attached to body portion 201 (e.g., via a hinge-type attachment). In some implementations, clamp members may be connected in a manner that enables movement other than, or in addition to, pivoting. For example, in some implementations, clamp members may be connected in a manner enabling slidable movement relative to a clamp body. (e.g., mounted on one or more tracks enabling linear slidable movement and/or rotational slidable movement relative to a clamp body.

Returning to FIGS. 2A and 2B, the pivotable attachment of clamp member 205a to body portion 201 may include a spring 209a, that biases clamp member 205a to rotate out of and/or away from recess 207a (i.e., counter clockwise in FIGS. 2A and 2B). Similarly, clamp member 205b may be pivotably attached to body portion 205 (e.g., via a hinge-type attachment). The pivotable attachment may also include a spring (not illustrated) that biases clamp member 205b to rotate out of and/or away from recess 207b (i.e., clockwise in FIGS. 2A and 2B—see arrow 211).

In some implementations, the clamps used herein may include a mechanism for selective deployment/release of clamping members so as to clamp a level to a workpiece (or at least to a portion of a workpiece). FIGS. 2A and 2B illustrate a release mechanism that includes a hook member 213a residing in recess 207a (a corresponding hook member may reside in recessed portion 207b, but is not illustrated). The release mechanism may also include an actuation portion 215 (e.g., a push button) connected to hook members 213.

Clamp members 205a and 205b are storable in a storage position wherein clamp members 205a and 205b are held in a compact configuration within recesses 207a and 207b, respectively. FIG. 2A illustrates clamp members 205a and 205b in the storage position. In some implementations, clamp members 205a and 205b may be held within their respective recesses 207 by the release mechanism. For example, hook member 213a residing in recess 207a may engage a catch 217a on clamp member 205a, thereby preventing clamp member 205a from moving in the direction in which spring 209a biases clamp member 205a (i.e., out of recess 207a). A hook member (not illustrated) of recess 207b may engage a corresponding catch (not illustrated on clamp member 205b, thereby preventing clamp member 205b from moving in the direction in which the spring (not illustrated) of clamp member 205b biases clamp member 205a (i.e., out of recess 207b). While reference to clamp 200 describes a release mechanism including a hook member and clamp members including a catch, the relative positions of the hook/catch mechanism may be reversed (i.e., release mechanism including a catch and clamp member including a hook. Furthermore, any combination of elements enabling releasable engagement of clamp members to the release mechanism may be used.

In one implementation, as illustrated, when in the stored position, the clamp 200 has dimensions that remain within the general dimensions of the level body 203, such that no elements used in clamping protrude from the clamp level device when the clamp is in a stored position. For example, in one implementation, wherein the stored position, the clamp 200 would not extend width-wise beyond the width dimension of level body 203 and/or would not extend height wise beyond the height dimension of level body 203.

Clamp members 205a and 205b may be deployed from the storage position into a deployed position. When deployed, clamp members 205a and 205b are moved out of their respective recesses in the direction of their respective bias and thereby move toward each other so as to enable clamping of a portion of a workpiece therebetween. FIG. 2B illustrates clamp members 205a and 205b in the deployed position clamping workpiece 213 between clamp members 205a and 205b.

In some implementations, when clamp members 205a and 205b are held in their respective recesses 207 by respective hooks 213 of a release mechanism, clamp members 205a and 205b may be deployed by a user manipulating an actuation portion 215, so as to move hooks 213 out of their respective catches 217 of clamp members 205a and 205b. When hooks 213 disengage catches 217, the bias acting on each clamp member 205 causes clamp members 205a and 205b to move out of their respective recesses 207 and towards each other, thereby creating a clamping force therebetween. In some implementations, the release mechanism, (i.e., hooks 213 and actuation portion 215) may be spring loaded (e.g., using a compression spring—not illustrated) such that hooks 213 are biased to engage their respective catches 217 (e.g., biased "up" in the direction of arrow 221 in FIG. 2B). Thus, clamp members 205a and 205b will not deploy until actuation portion 215 is moved against the bias of the internal spring.

In some implementations, one or more gripping surfaces 223 may be provided on the surface of clamp members 205a and 205b that contact the workpiece. While two clamps at either end of level body 203 are illustrated, only a single clamp may be provided. Such clamp can be provided at one end of the level body 203, at the center of clamp body 203, or elsewhere on body 203. The same is true of the other embodiments/implementations described herein.

Figure 3A:
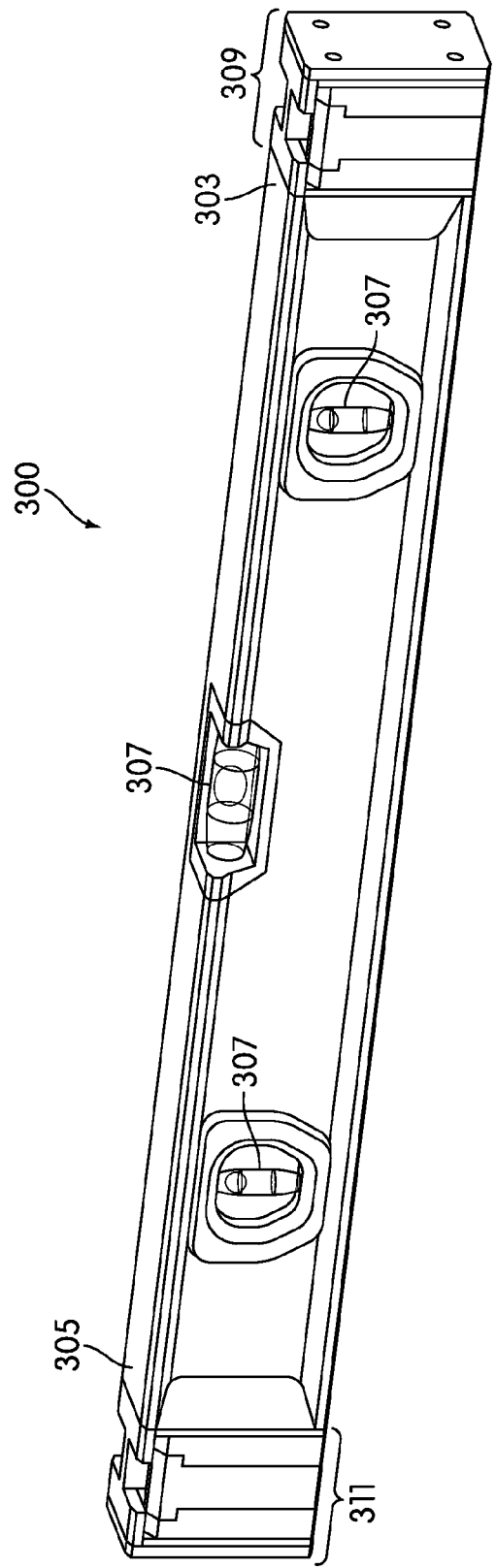
FIG. 3A illustrates a clamp level according to various implementations of the invention.
Figure 3B:
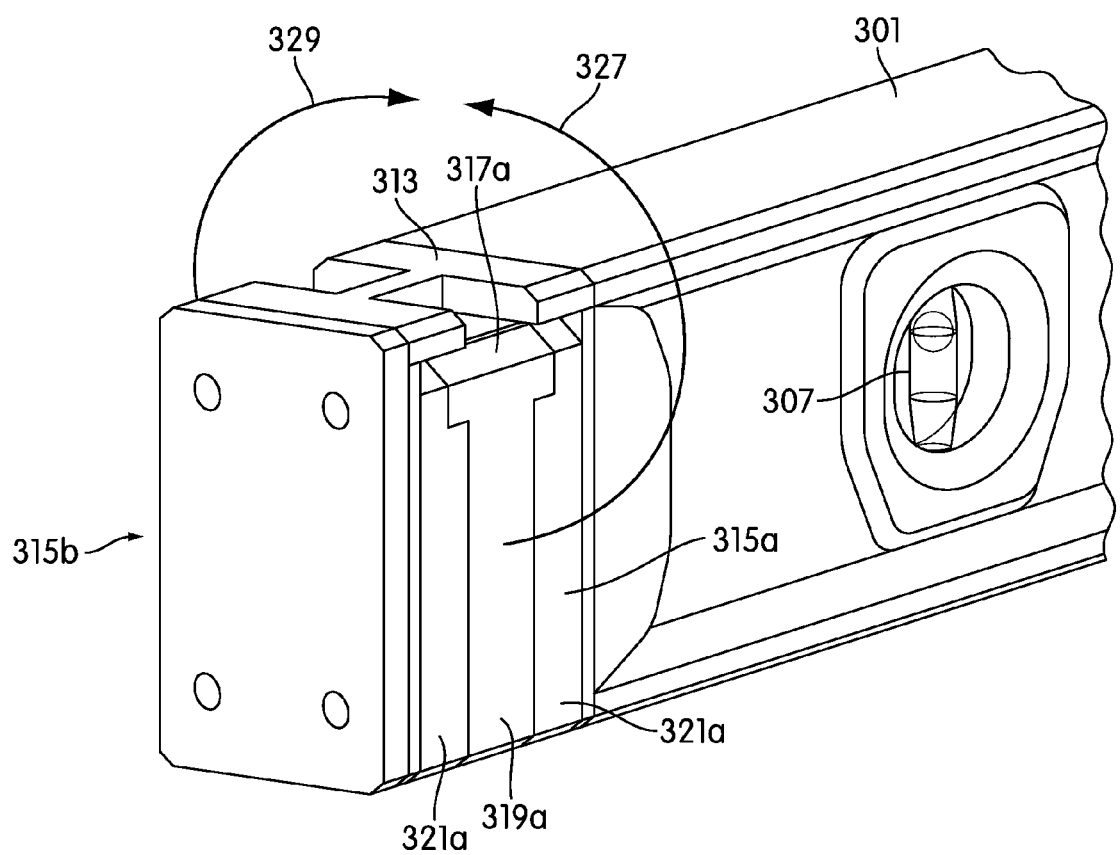
FIG. 3B illustrates an end of a clamp level according to various implementations of the invention.

In some implementations, different clamping and/or deployment mechanisms may be utilized. FIGS. 3A-3N illustrate a clamp level 300 (or portions thereof) having an elongated body 301 having a first end 303 and a second end 305, one or more level sensing/indicating elements 307, a first clamp 309 attached to first end 303 of elongated body 301, a second clamp 311 attached to second end 305 of elongated body 301, and/or other elements. In some implementations, one or more level sensing/indicating elements 307 may include bubble vials, electronic level sensors/indicators or other level sensing/indicating elements that communicate the deviation (if any) from a level position (relative to the surface of the earth) of a surface upon which elongated body 301 is placed.

In some implementations, each of first clamp 309 and second clamp 311 include a clamp body 313 having two side portions 315a and 315b and two clamp members 317a and 317b. In some implementations, each clamp body may include more than two clamp members. Each of clamp members 317a and 317b may include an arm extension 319 pivotably attached to a clamp arm portion 321 at a first pivot location (clamp member 317a having a clamp arm extension 319a and a clamp arm portion 321a and clamp member 317b having clamp arm extension 319b and a clamp arm portion 321b). In some implementations, the pivot location between each arm extension 319 and their corresponding clamp arm portions 321 may include a pin (or other axial supporting element). See pins 363a and 363b of FIG. 3N.

In some implementations, a clamp arm portion 321 may comprise two spaced apart arms that are pivotably attached to clamp body 313 at a pivot location (e.g., a different pivot location from the pivot locations that the clamp arm extensions 319 share with their respective clamp arm portions 321). In some implementations, clamp arm portions may be connected to a clamp body in a manner that enables movement other than, or in addition to, pivoting (e.g., slidable). In some implementations, clamp arm extensions may be connected to clamp arm portions in a manner that enables movement other than, or in addition to, pivoting (e.g., slidable).

Springs 323a and 323b bias clamp arm portions 321a and 321b toward one another so that when a workpiece is placed therebetween, clamp level 300 can clamp a workpiece between clamp arm portions 321a and 321b. For example, as illustrated in FIGS. 3C, 3D, 3E, 3F, and 3G, springs 323a and 323b bias clamp arm portion 321a in a clockwise direction and bias clamp arm portion 321b in a counter clockwise direction. In some implementations, each of springs 323a and 323b may include first and second ends (e.g., spring 323a having first end 353 and second end 355; spring 323b having first end 357 and second end 359—see FIGS. 3J-3L).

In some implementations, the pivot location between both clamp arm portion 321a and 321b and clamp body 313 may include a pin (or other axial supporting element) 325 that runs through springs 323a and 323b and/or other portions of clamp level 300.

In some implementations, each of clamp members 317a and 317b are storable in a storage position wherein various elements of clamps 309 and 311 position remain in a compact configuration (within the general dimensions of the clamp bodies as discussed in the implementation illustrated in FIGS. 2A and 2B), such that no elements used in clamping protrude from the height and width dimensions of the elongated level body (e.g., body 301), thereby providing ease of storage and transport, while also providing other benefits. In some implementations, the storage position for each clamp member 317 may include each arm extension 319 being positioned between the spaced apart arms of its respective clamp arm portion 321. FIGS. 3A and 3B illustrate clamp ends having clamp members 317 in the storage position.

In some implementations, clamp members 317a and 317b may be deployed from the storage position to a deployed position. When deployed, clamp arm portions 321 of each clamp member 317 are at least partially moved away from clamp body 313 so that the bias acting on each clamp arm portion 321 is able to move clamp arm portions 321a and 321b toward one another so as to enable clamping of a portion of a workpiece therebetween.

In some implementations, clamp members 317a and 317b may be deployed by first rotating each of the arm extensions 319 about their respective first pivot locations out from between the spaced apart arms of their respective clamp arm portions 321. Arm extensions 319 are rotated out of the spaced apart arms in a direction generally opposite to the direction in which their respective clamp arm portions 321 are biased (e.g., arm extension 319a of clamp member 317a in FIG. 3B is rotated counterclockwise). See arrows 327 and 329 in FIG. 3B illustrating the direction in which each arm extension is to be rotated to begin deployment of clamp members 317. In some implementations, arm extensions 319 are rotated out from/away from their respective clamp arm portion until they form an obtuse angle with respect to their respective clamp arm portions 321. In some implementations, arm extensions 319 may be rotated out of/away from their respective clamp arm portions 321 until they are prevented from rotating further (e.g., by a stop designed into their given pivotable attachment, by contact with clamp body 313, or other mechanism), thus forming a predetermined obtuse angle with their respective clamp arm portions 321. Arm extensions 319 are positioned, when fully rotated out of/away from their respective clamp arm portions 321, such that a downward force exerted on an arm extension 319 translates, at least partially, into a downward force onto its corresponding clamp arm portion 321.

Figure 3C:
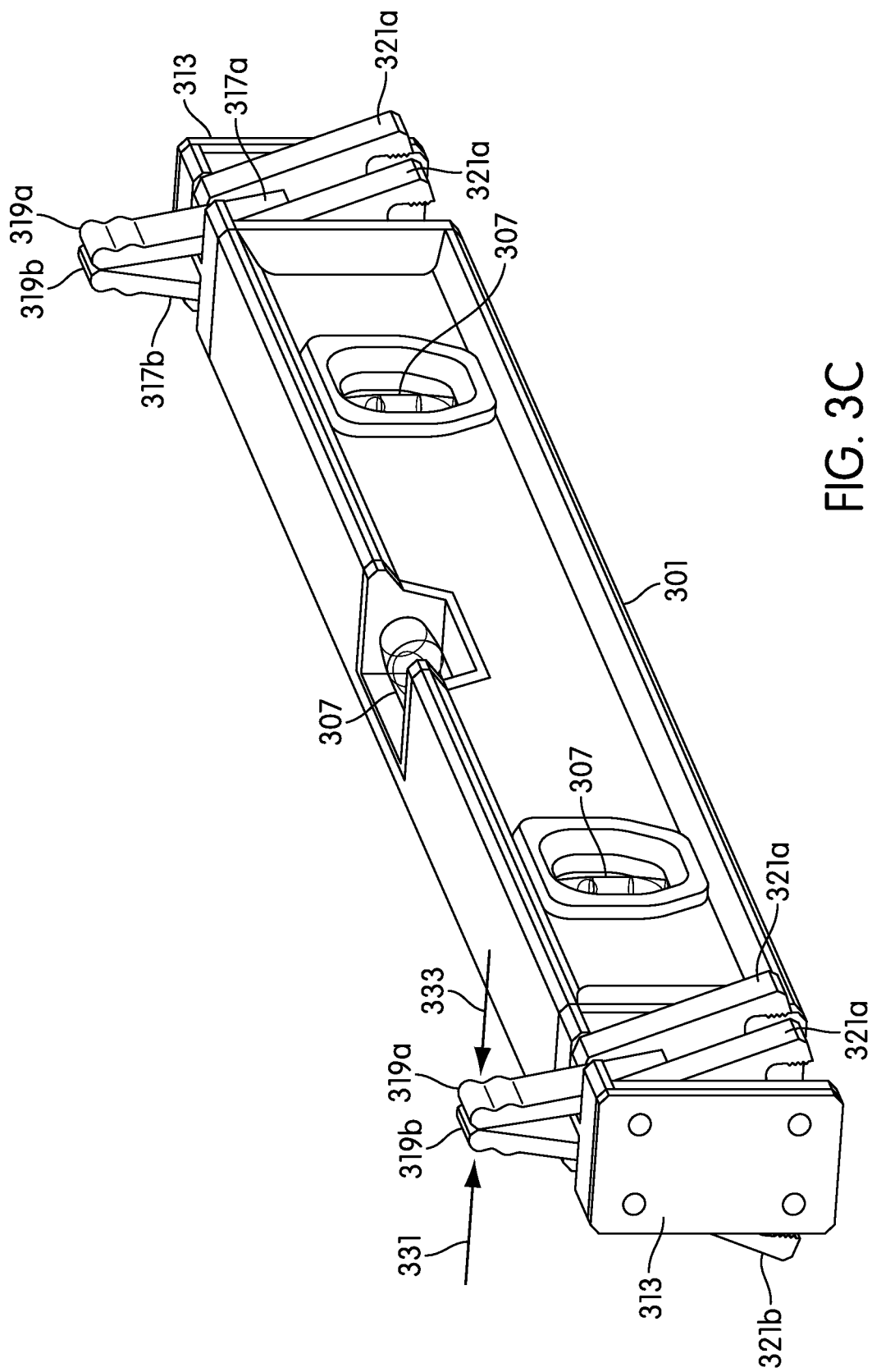
FIG. 3C illustrates a clamp level according to various implementations of the invention.
Figure 3D:
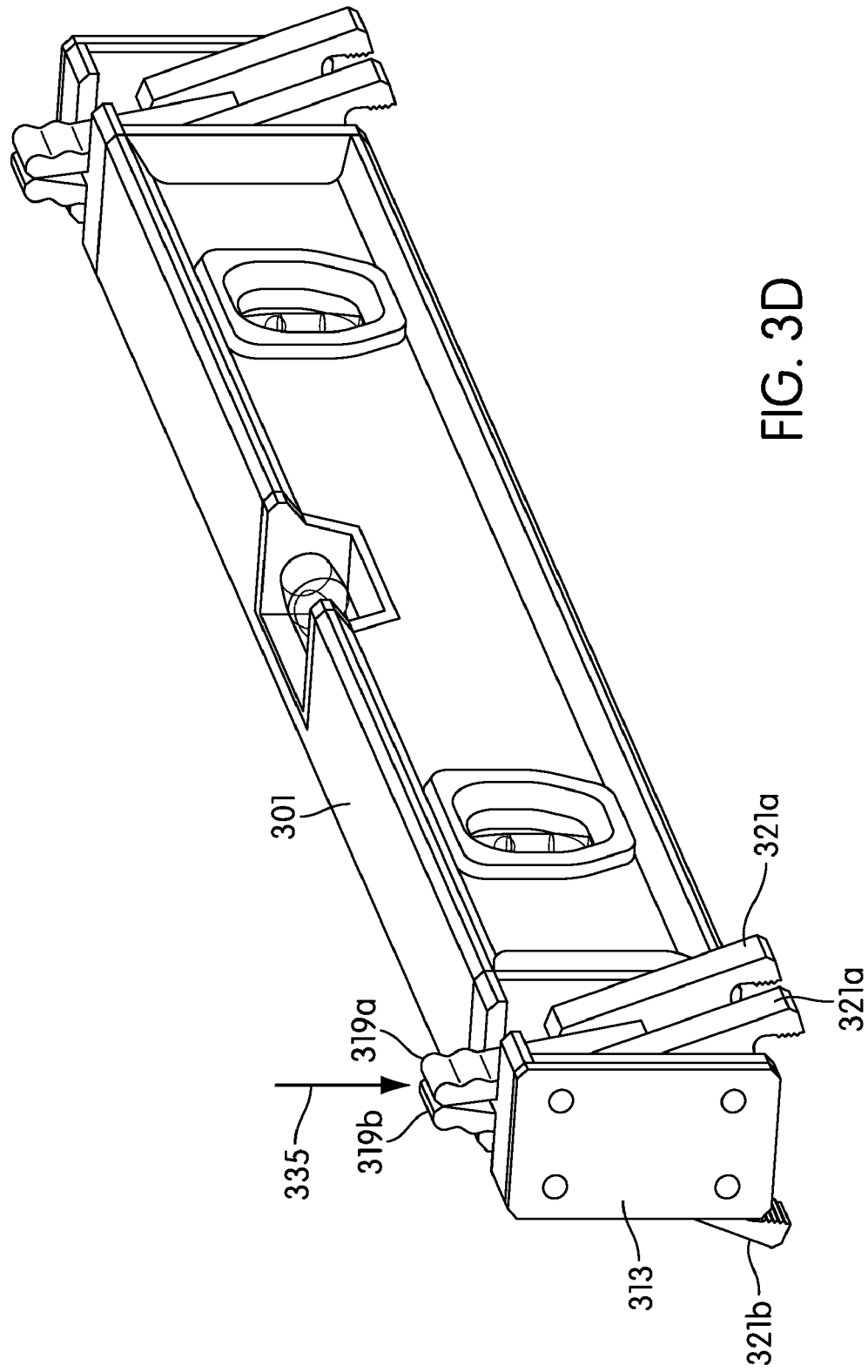
FIG. 3D illustrates a clamp level according to various implementations of the invention.
Figure 3E:
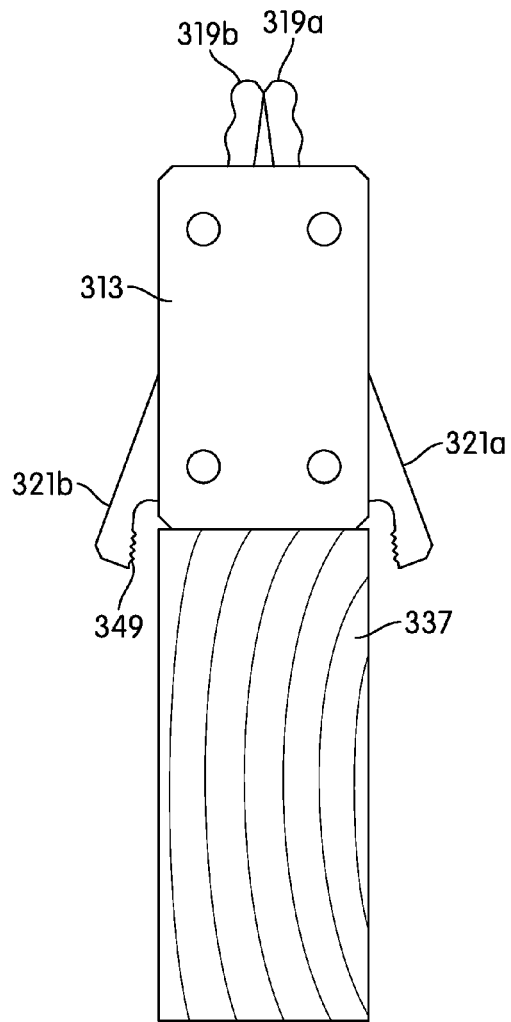
FIG. 3E illustrates an end of a clamp level and a workpiece according to various implementations of the invention.
Figure 3F:
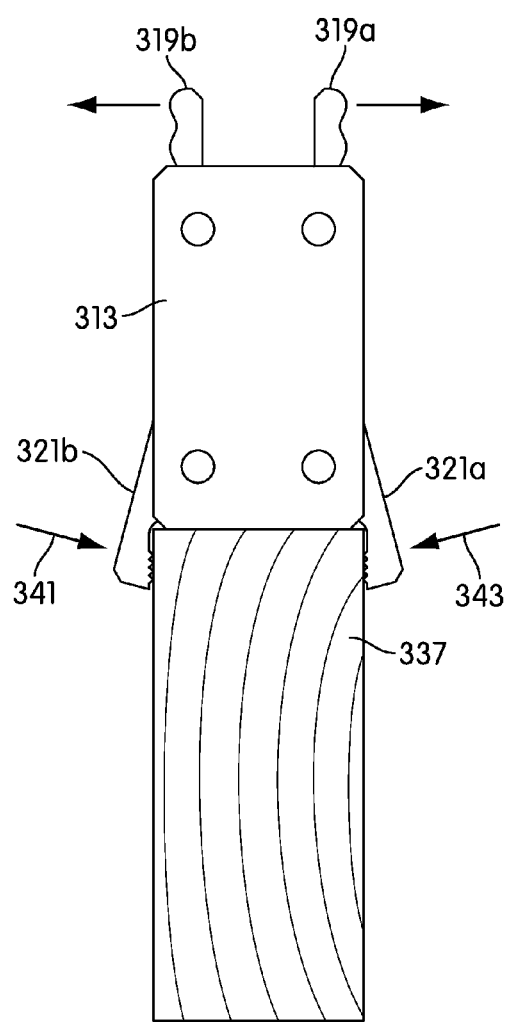
FIG. 3F illustrates an end of a clamp level and a workpiece according to various implementations of the invention.
Figure 3G:
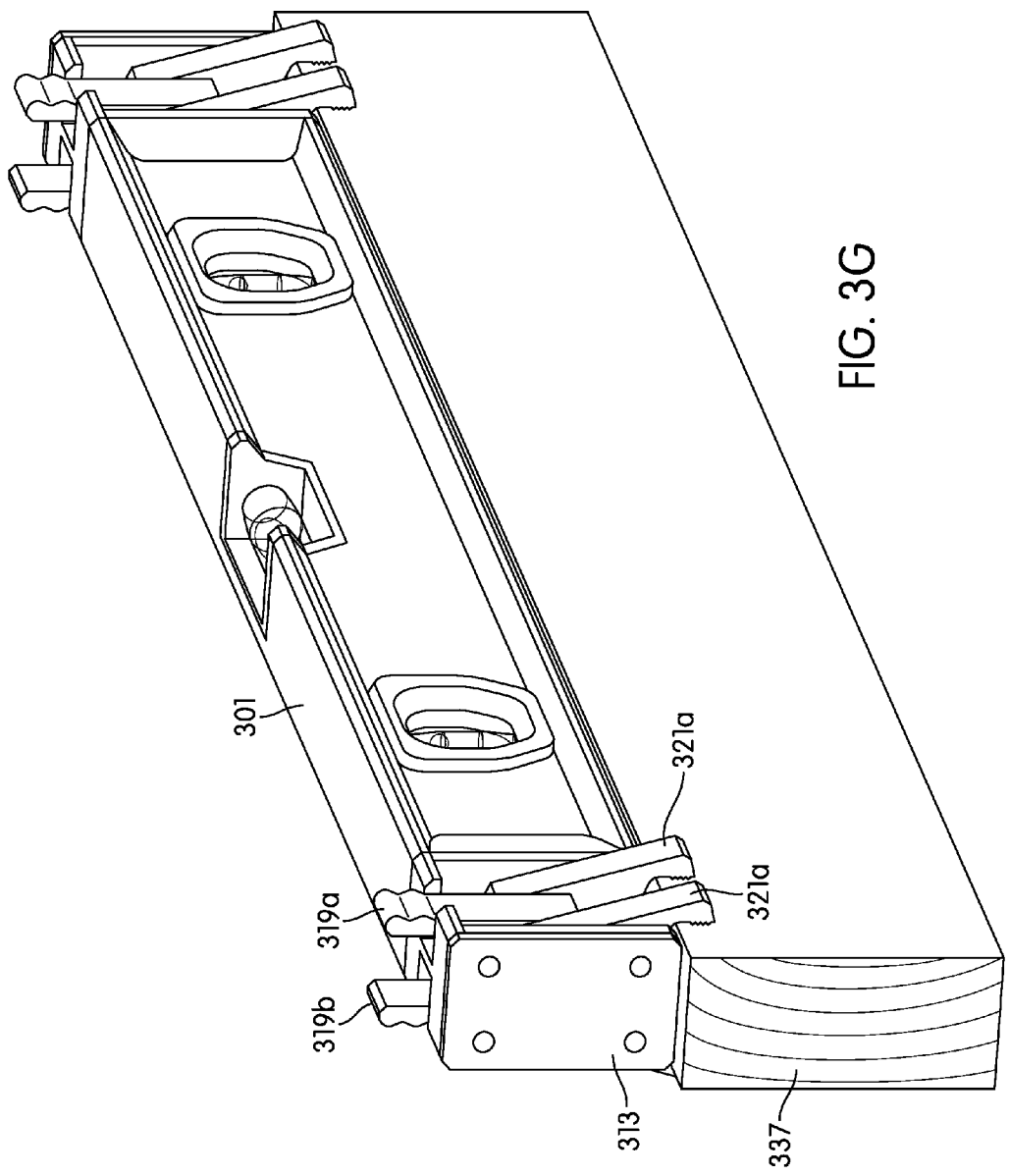
FIG. 3G illustrates a clamp level and a workpiece according to various implementations of the invention.
Figure 3H:
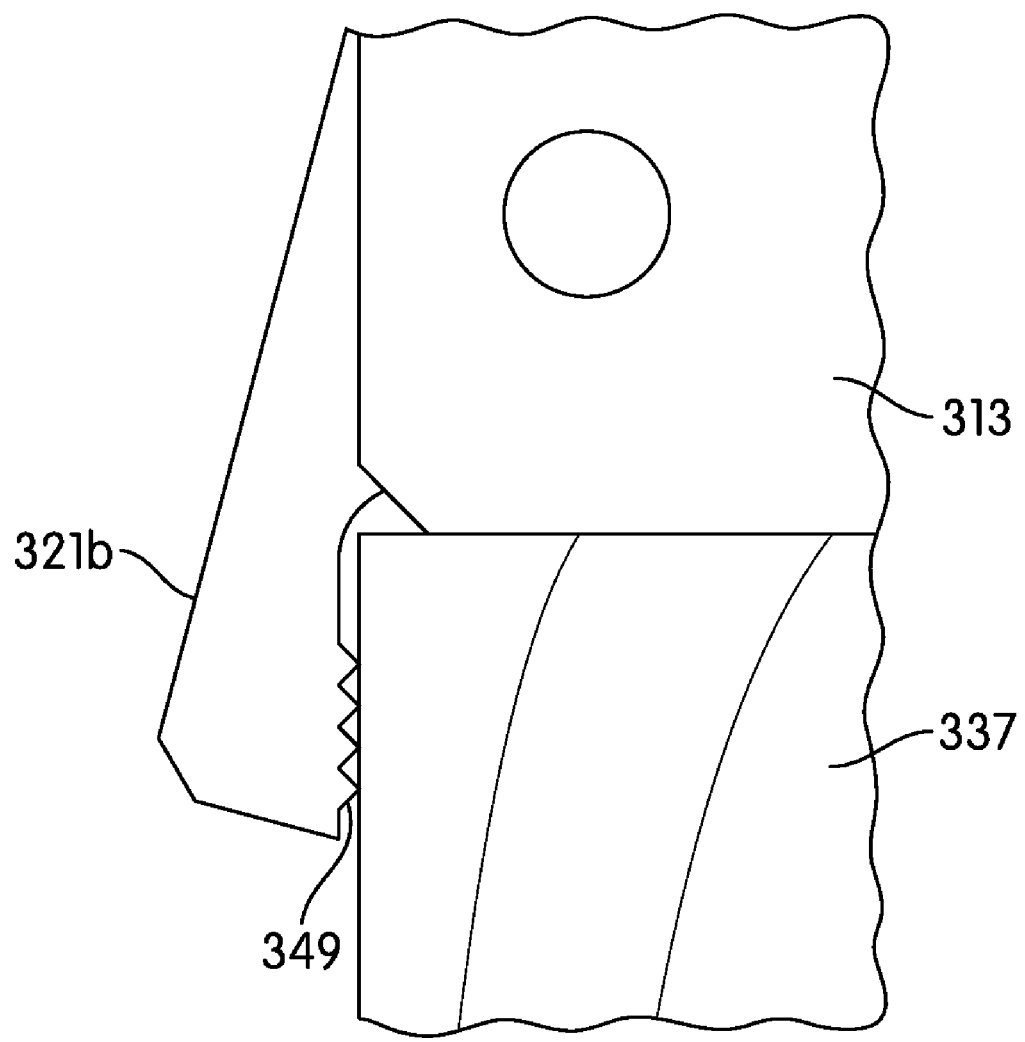
FIG. 3H illustrates portions of an end of a clamp level and a workpiece according to various implementations of the invention.

Deployment continues when the ends of arm extensions 319 furthest from their respective clamp arm portion 321 are manually "pinched" or otherwise forced together (see FIG. 3C and arrows 331 and 333). This force translates into a force that moves the clamping ends (i.e., the ends farthest away from their respective arm extensions 319) of respective clamp arm portions 321 away from one another (i.e., against their respective bias) and thus away from clamp body 313.

Figure 3I:
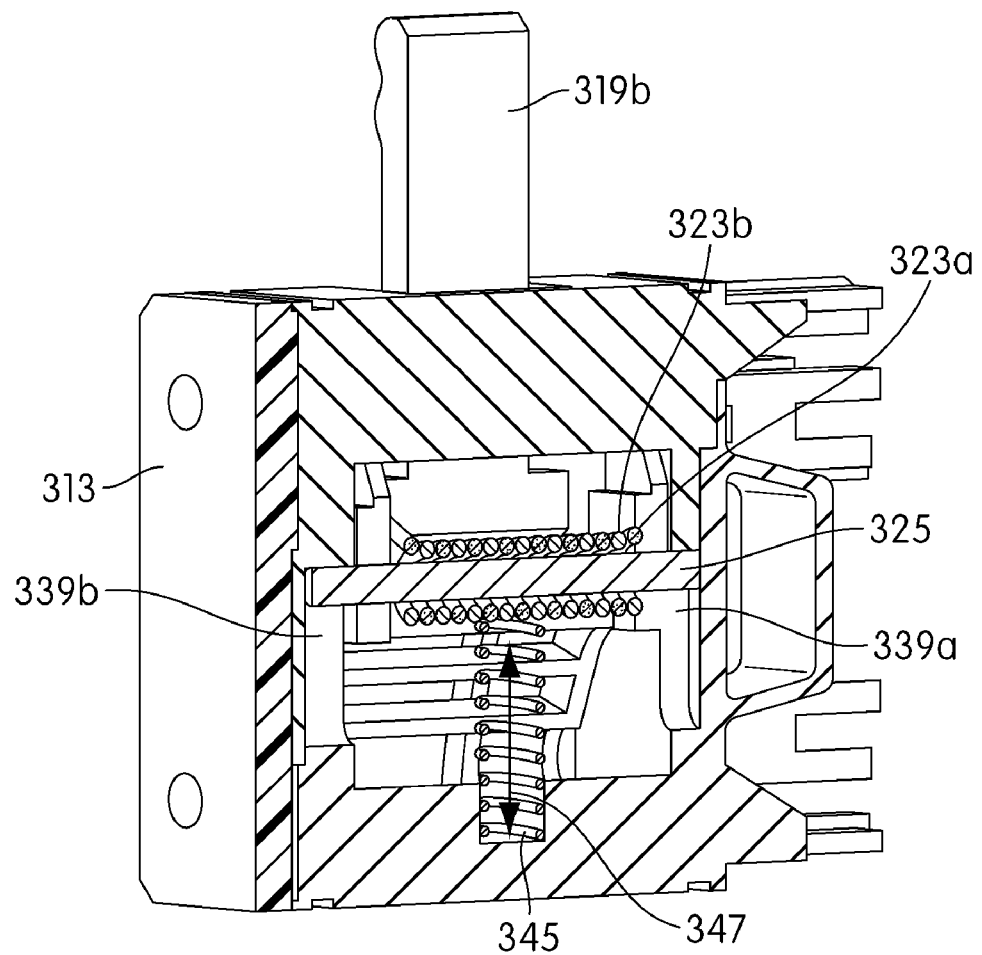
FIG. 3I illustrates a cross-section of a clamp of a clamp level according to various implementations of the invention.
Figure 3J:
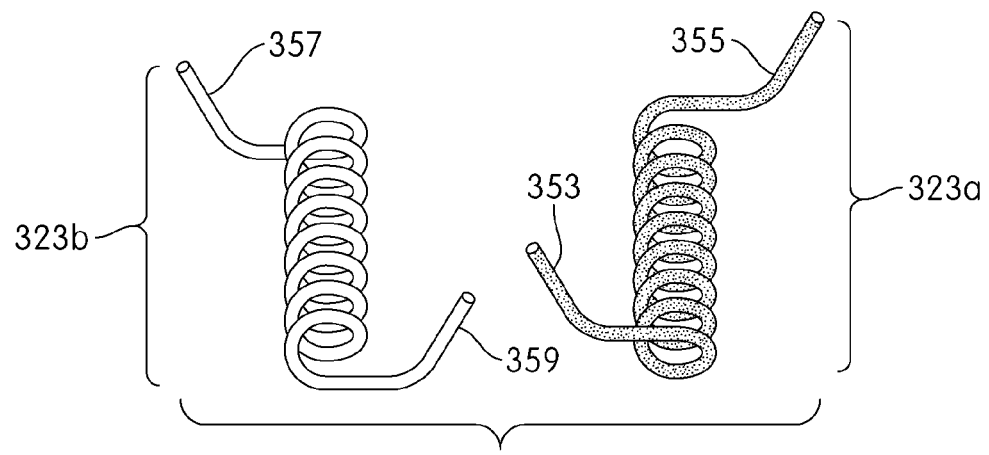
FIG. 3J illustrates spring windings according to various implementations of the invention.
Figure 3K:
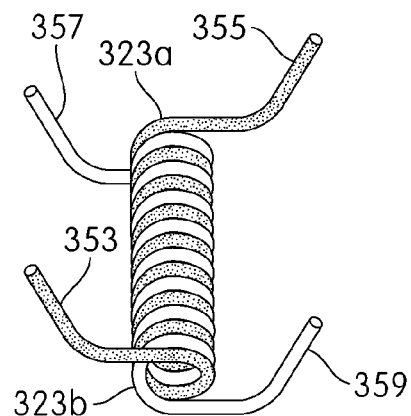
FIG. 3K illustrates spring windings according to various implementations of the invention.
Figure 3L:
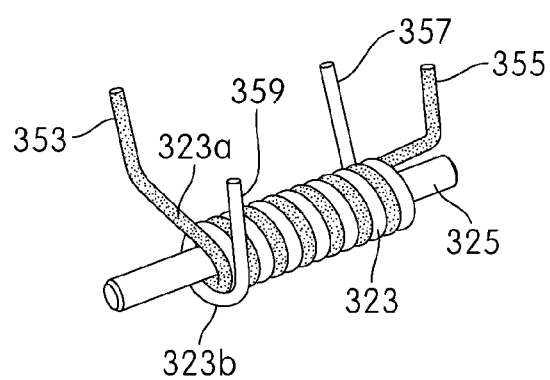
FIG. 3L illustrates spring windings and an axial support element according to various implementations of the invention.
Figure 3M:
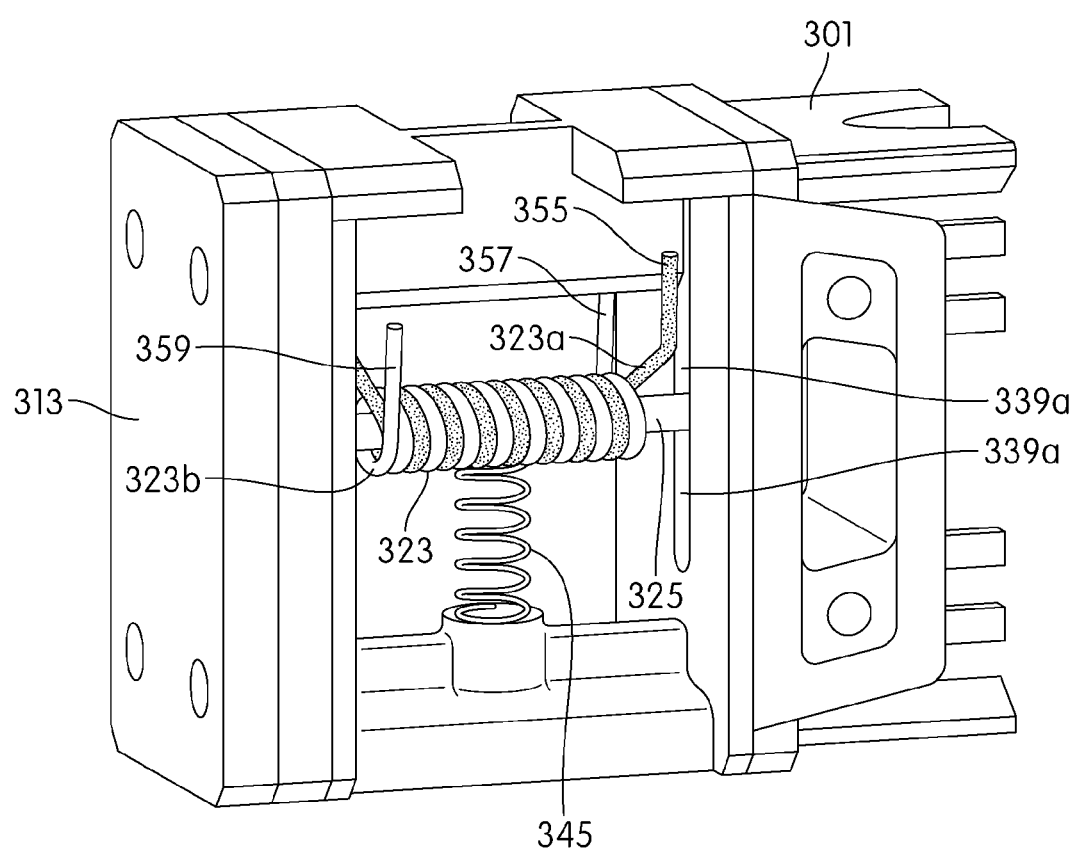
FIG. 3M illustrates portions of an end of a clamp level according to various implementations of the invention.
Figure 3N:
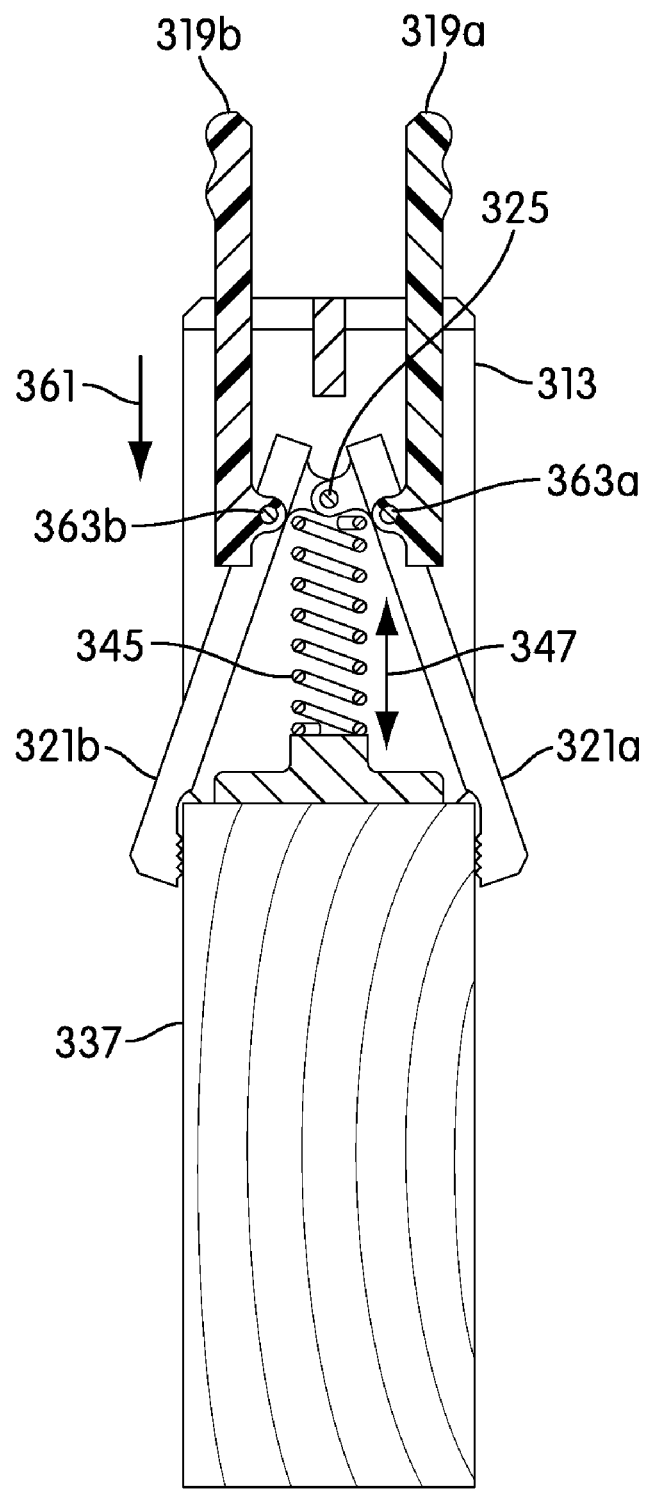
FIG. 3N illustrates a cross-section of a clamp of a clamp level and a workpiece according to various implementations of the invention.

In addition to being pivotably connected to clamp body 313, clamp members 317a and 317b by may be, as a unit, slidably connected to clamp body 313. This slidable connection may enable clamp members 317a and 317b to move vertically relative to clamp body 313. This vertical movement may be facilitated by the fact that clamp members 317a and 317b maintain a constant vertical relationship with spring 323 and pin 325. The ends of pin 325 are mounted in openings 339a and 339b of clamp body 313 as illustrated in FIGS. 3I and 3M. As such, an assembly including clamp members 317a and 317b, springs 323a and 323b, and pin 325 is rendered vertically movable relative to clamp body 313 by virtue of the axis center of pin 325 moving vertically in openings 339a and 339b.

Once the clamping ends of clamp arm portions 321a and 321b are moved apart and away from clamp body 313, a manual downward force (or a force towards the workpiece to be clamped) is applied to both of arm extensions 319a and 319b of a clamp portion. Because clamp members 317 are vertically movable relative to clamp body 313, this downward force moves clamp arm portions 321a and 321b down (see FIG. 3D, wherein the downward force is illustrated by arrow 335) such that the clamping ends of clamp arm portions 321a and 321b protrude beneath clamp body 313. In this position, a workpiece 337 is/can be disposed/positioned between these clamping ends (see FIG. 3E) such that clamp arm portions 321a and 321b can be clamped to workpiece 337 (see FIGS. 3F, 3G, and 3N).

Once a portion of workpiece 337 is positioned between the clamping ends of clamp arm portions 321a and 321b, the manual force that retains the ends of arm extensions 319a and 319b close (e.g., the "pinching" force) is released. As such, the bias acting on clamp arm portions 321a and 321b forces the clamping ends thereof toward each other (see arrows 341 and 343 of FIG. 3F, thus clamping workpiece 337 therebetween (see FIGS. 3F, 3G, 3H, and 3N).

In some implementations, a compression spring 345 is disposed underneath springs 323a and 323b, such that the main axes of spring 345 and pin 325 are orthogonal to one another and such that spring 345 is disposed between springs 323a and 323b and an interior surface of a lower portion of clamp body 313. This forces clamp members 317a, 317b, springs 323a and 323b, and pin 325 away from clamp body 313, as illustrated by double sided arrow 347 in FIG. 3I (see also FIGS. 3M and 3N for illustration of compression spring 345). Because clamp members 317a and 317b are movable/slidable along openings 339a and 339b, clamp body 313 (and thus elongated body 301) is biased toward an object on which clamp level 300 is clamped. FIG. 3N illustrates a cross-section of a clamp (e.g., clamp 309 or clamp 311) and a workpiece 337 according to various implementations, wherein arrow 361 illustrates the force exerted on clamp body 313 towards workpiece 337 by spring 345. The connection between clamp arm portions 321a and 317b and workpiece 337 essentially create a static relationship between clamp arm members 317 and workpiece 337. Thus, the vertical slidable relationship between clamp members 317 and clamp body 313 and the bias exerted by compression spring 345 (illustrated by arrow 347) enables clamp body 313 (and thus elongated level body 301) to be forced towards/against workpiece 337. This provides a stable connection between clamp level 300 and the workpiece. For example, in some applications, this bias may enable elongated body 301 of clamp level 300 to remain in contact with a workpiece even in certain difficult positions (e.g., severe angles, underside of a workpiece).

In some implementations, one or more gripping surfaces 349 may be provided on the surface of clamp arm portions 321 that contact the workpiece (i.e., the clamping surfaces).

Once clamp members 317 are deployed and clamp level 300 is attached to a workpiece (e.g., workpiece 337), clamp level 300 may be removed from the workpiece and clamp members 317 placed in the storage position. For example, to disengage clamp arm portions 321a and 321b from workpiece 337, arm extensions 319a and 319b may be squeezed together, which causes clamp arm portions 321a and 321b to spread apart. This enables workpiece 337 to be removed from between the clamping ends of clamp arm portions 321a and 321b. Clamp members 317a and 317b may then be slid upward in relation to clamp body 313 (e.g., via the slidable connection between pin 325 and openings 339a and 339b) so that clamp arm portions 321 do not extend horizontally beyond clamp body 313. In some implementations, this sliding motion may take place while arm extensions 319 are pinched together. In some implementations, this sliding motion may take place after the pinching force on arm extensions 319 has been released. Arm extensions 319 may then be folded down into the storage position so that neither arm extensions 319 or clamp arm portions 321 protrude from the general dimensions of clamp body 313.

In some implementations, any clamp body as described herein (e.g., clamp body 201, clamp body 313, etc.) may be part of or the same as an elongated body (e.g., elongated body 203, elongated body 301, etc.). In other words, a clamp body as referred to herein maybe integrally formed with an elongated level body rather than a separately formed structure. Thus, while this disclosure refers to both an elongated body portion and a clamp body portion, it should be understood that the elongated body portion may also include the structure/elements of the clamping portions described herein. Also, even if these elements (elongated body and clamp body portion) are claimed separately, such claims are intended to cover clamp levels that have the two bodies (i.e., clamp and level) integrally formed as well. While illustrations provided herewith show an elongated body having two clamps located at each end of the elongated body, more or less clamps may be used and/or may be placed elsewhere in relation to an elongated level body.

Figure 4A:
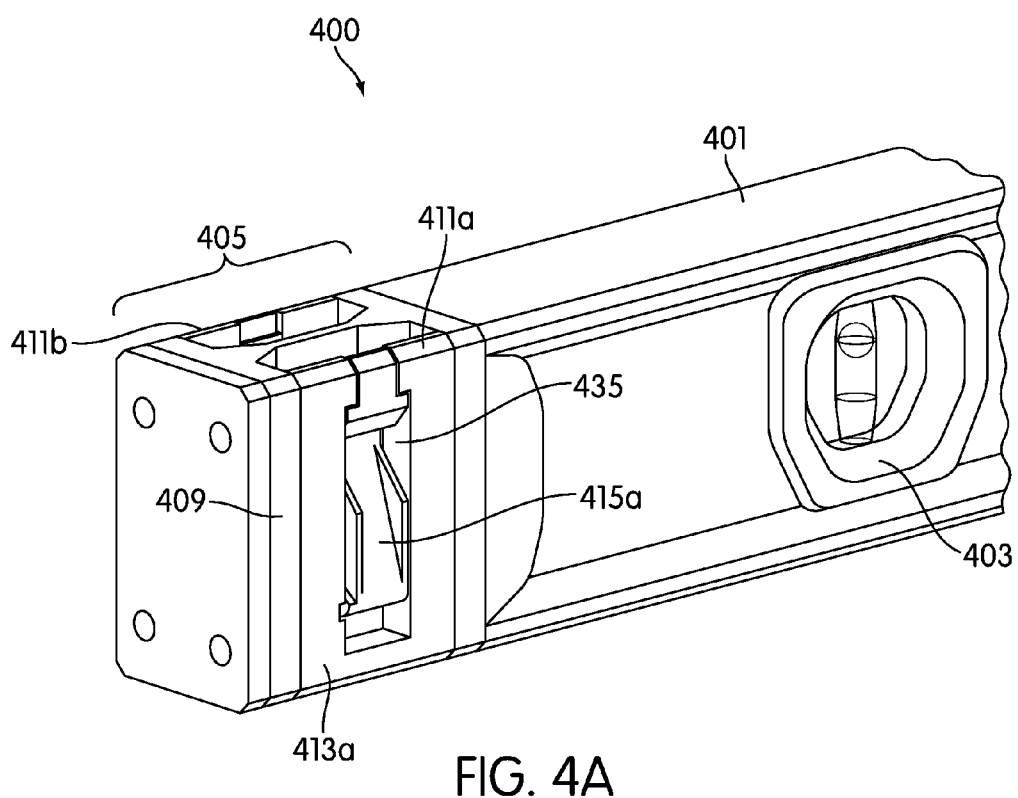
FIG. 4A illustrates an end of a clamp level according to various implementations of the invention.
Figure 4B:
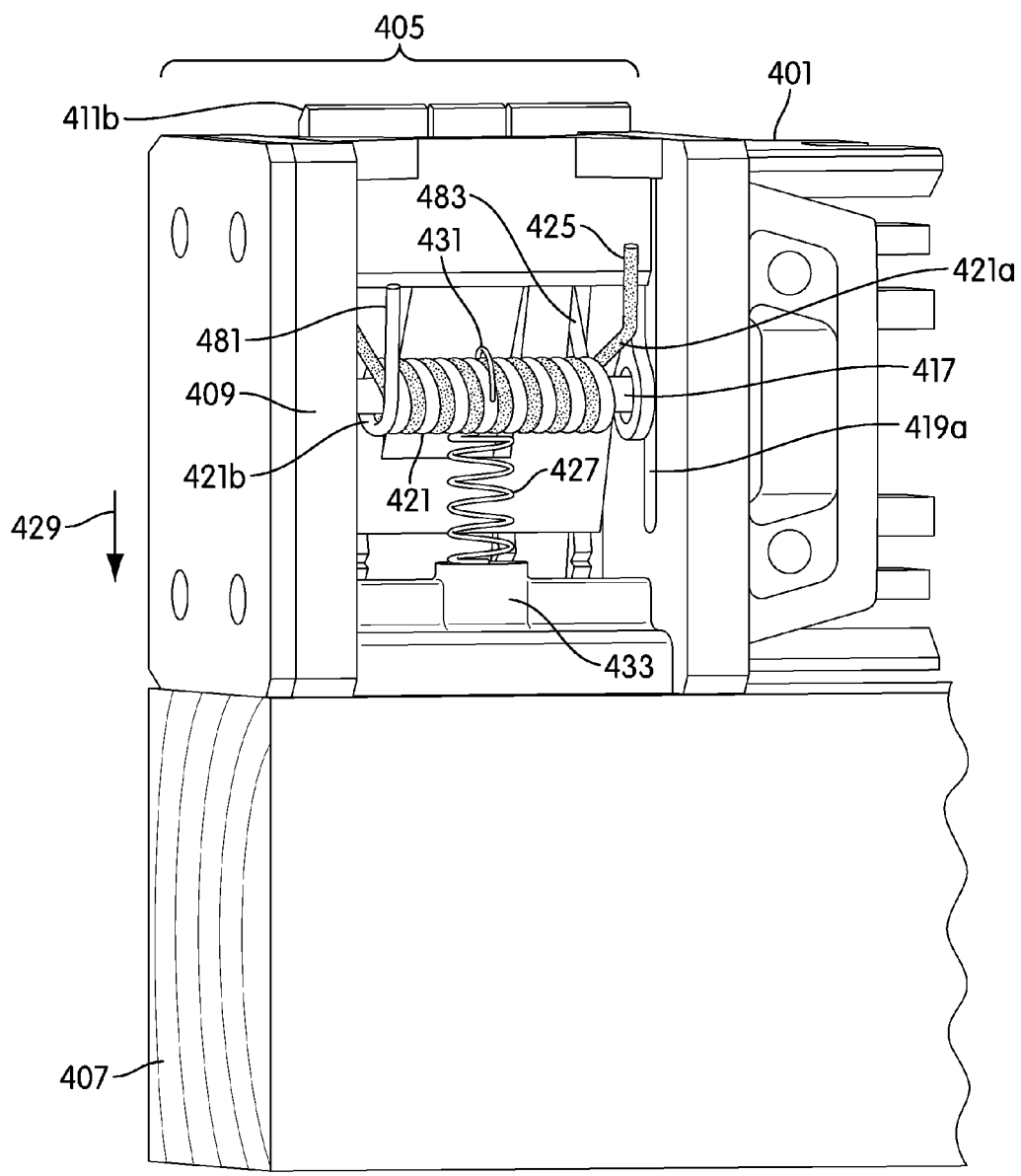
FIG. 4B illustrates portions of a clamp according to various implementations of the invention.
Figure 4C:
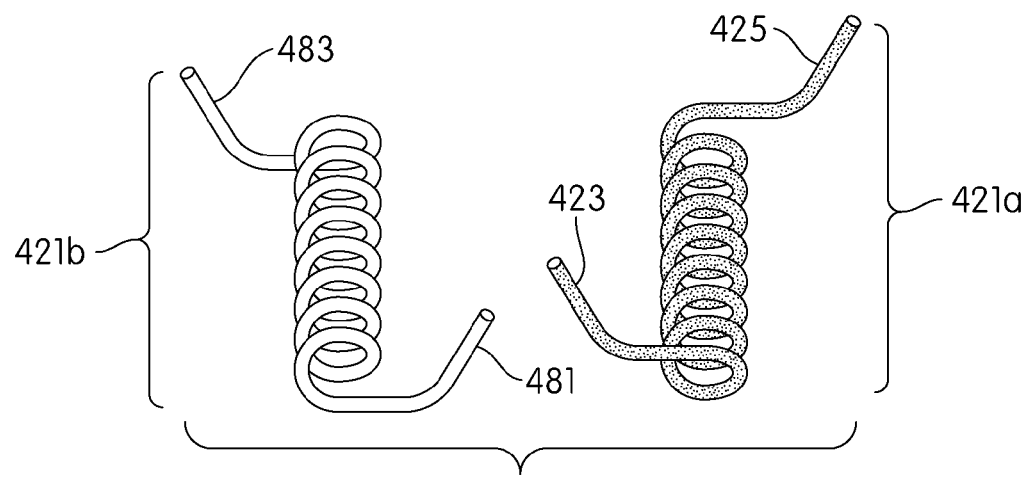
FIG. 4C illustrates spring windings according to various implementations of the invention.
Figure 4D:
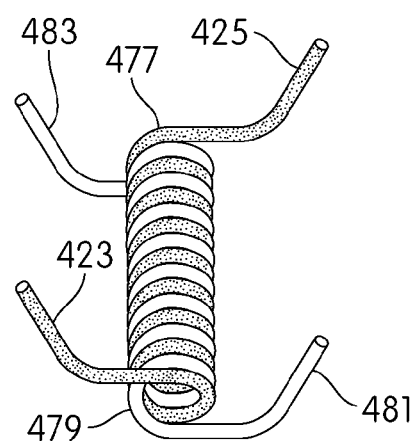
FIG. 4D illustrates spring windings according to various implementations of the invention.

Still other configurations for clamps may be used in a clamp level according to various embodiments. For example, FIGS. 4A-4O illustrate a clamp level 400 (or portions thereof) having at least one clamp that includes two sets of clamping surfaces. Each set of clamping surfaces is sized for clamping to different sized workpieces or two different-sized dimensions of a single workpiece.

Clamp level 400 includes an elongated level body 401 having one or more level sensing/indicating elements 403 therein. Clamp level 400 may also includes at least one clamp 405 attached to elongated body 401 to attach clamp level 400 to a workpiece 407.

Clamp 405 may include a clamp body 409, at least two clamp members 411a and 411b, and/or other elements. Each clamp member 411 may include a first clamp arm portion 413 (see first clamp arm portion 413a of clamp member 411a and first clamp arm portion 413b of clamp member 411b as illustrated in FIG. 4F) and a second clamp arm portion 415 (see second clamp arm portion 415a of clamp member 411a and second clamp arm portion 415b of clamp member 411b as illustrated in FIGS. 4G and 4K). Thus, clamp members 411a and 411b may include a first pair of clamp arms (e.g., first clamp arm portions 413a and 413b) and a second pair of clamp arms (e.g., second clamp arm portions 415a and 415b). Each of clamp members 411a and 411b may be pivotably attached to clamp body 409 at a pivot location by a pin (or other axial supporting element) 417 mounted in vertical openings 419a and 419b (see FIGS. 4B, 4H, and 4G).

Mounted over pin 417 at the pivot location are springs 421a and 421b. Springs 421a and 421b may be similar to springs 323a and 323b of FIG. 3L.). FIGS. 4C and 4D illustrates springs 421a and 421b. Each of springs 421a and 421b have two ends (i.e., spring 421a includes a first end 423 and a second end 425 and spring 421b includes a first end 481 and a second end 483. The end portions of springs 421a and 421b contact interior portions of clamp members 411a and 411b so as to bias clamp member 411a about the axis of pin 417 in a first direction and clamp member 411b about the axis of pin 417 in a second direction opposite to the first direction. The bias exerted by springs 421a and 421b on clamp members 411a and 411b is such that a workpiece (e.g., workpiece 407) can be clamped between portions of clamp members 411a and 411b when the workpiece is positioned therebetween, as described and illustrated herein.

In one implementation, a compression spring 427 is positioned between springs 421a and 421b and a portion of the interior of clamp body 409 (i.e., a portion of the interior of clamp body 409 nearest to the surface of clamp level 400 that abuts workpiece 407; i.e., the interior of the "bottom" of clamp body 409 when clamp level 400 is placed on top of workpiece 407). In some implementations, a first end of spring 427 may be attached to springs 421a and 421b via a hook 431. In some implementations, a second end of spring 429 may be mounted in a sleeve or collar 433 of clamp body 409. In some implementations, spring 429 may be wedged in between springs 421a and/or 421b and clamp body 409 and may be held in place by tension.

Spring 427 acts similarly to spring 345 of FIGS. 3I, 3M, and 3N. As springs 421a and 421b and clamp members 411a and 411b are, as a unit, slidably mounted to clamp body 409 via pin 417 and openings 419, clamp body 409, and thus elongated body 401, is vertically biased away from clamp members 411a and 411b. Thus, when clamp members 411a and 411b are used to clamp a workpiece as described herein, the workpiece, clamp members 411a and 411b, springs 421a and 421b, and pin 417 move as a single unit relative to clamp body 409 and elongated body 401. The bias of spring 427, therefore biases clamp body 409 (and thus elongated body 401) against workpiece 407 in the direction of arrow 429 (see FIG. 4B illustrating portions of clamp 405 when clamp members 411 are in a storage position; see FIGS. 4E, 4F, 4H, and 4K illustrating clamp members 411 when in deployed positions such that spring 427 is compressed, enabling the bias of spring 427 to force clamp body 409 towards workpiece 407, in the direction of arrow 429). This assists in keeping the level flush against the surface of a workpiece which aids in accurately reading the position of the workpiece to level. This may also assist in reading the position of a workpiece to level in an upside-down or extreme angle position.

Clamp members 411a and 411b may be storable in a storage position and deployable in first and second deployed positions. When in the storage position, both clamp members 411 (including their respective first clamp arm portions 413 and second clamp arm portions 415) are stored in a compact configuration within the general dimensions of clamp body 409 such that no portion of clamp members 411a or 411b extend beyond the height, width, or length dimensions of clamp body 409. See FIG. 4A for an illustration of clamp members 411a and 411b in the storage position.

In one implementation, when clamp members 411a and 411b are in the storage position, second clamp arm portions 415a and 415b are stored in a compact configuration within a space 435 in the center of each of their respective first clamp arm portions 413a and 413b.

Figure 4E:
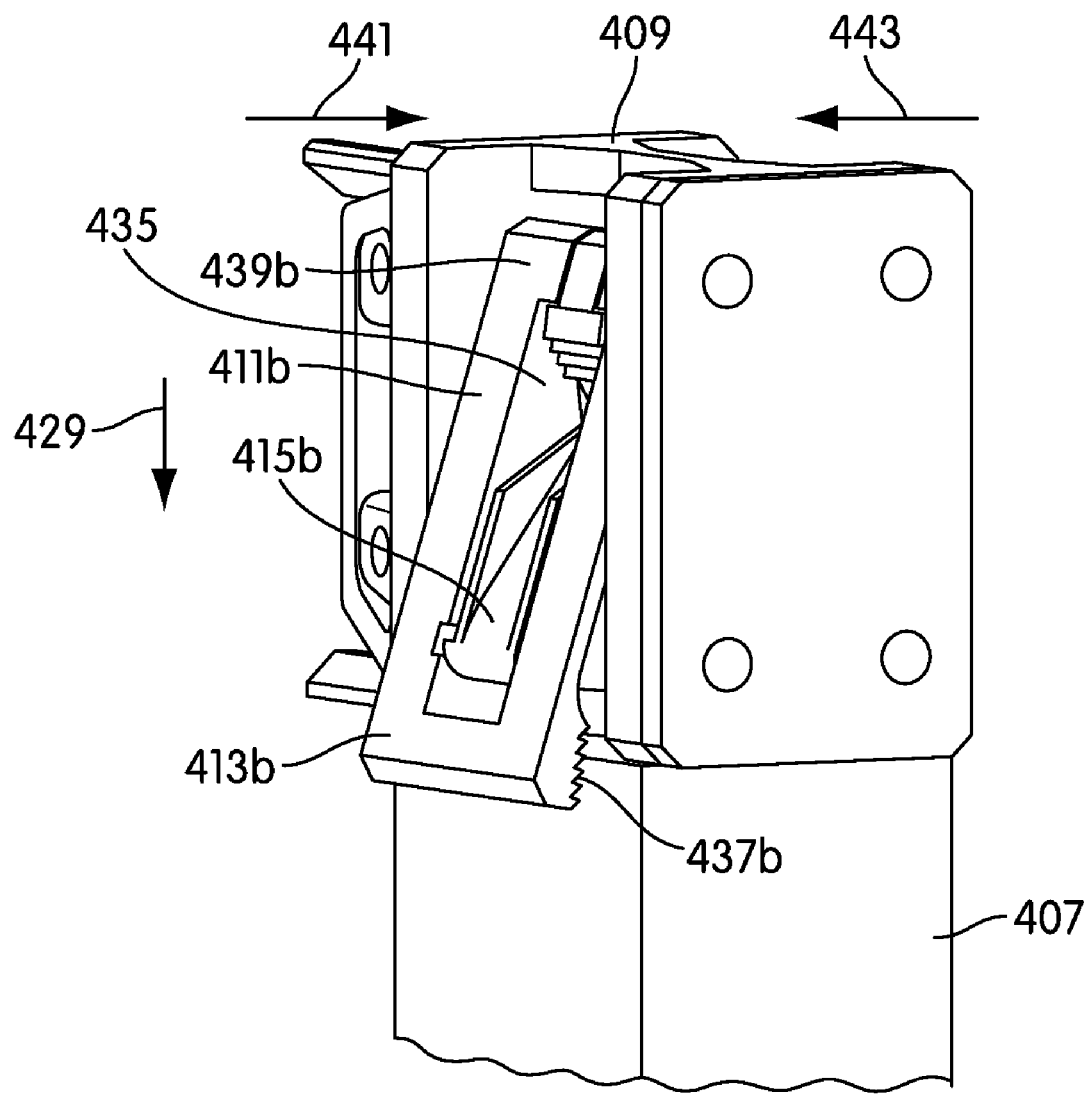
FIG. 4E illustrates a clamp and a workpiece according to various implementations of the invention.
Figure 4F:
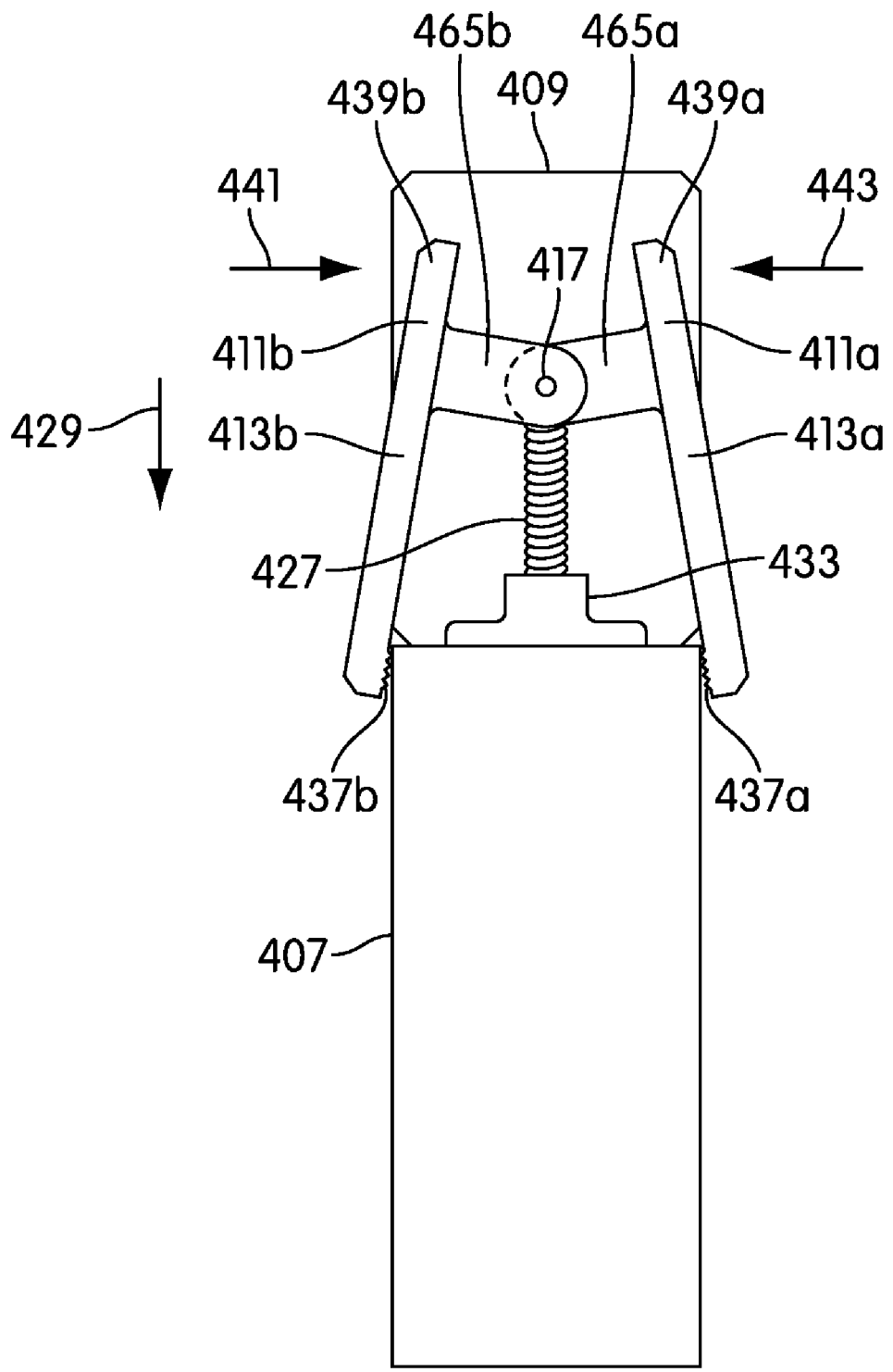
FIG. 4F illustrates a cross section of a clamp and a workpiece according to various implementations of the invention.
Figure 4G:
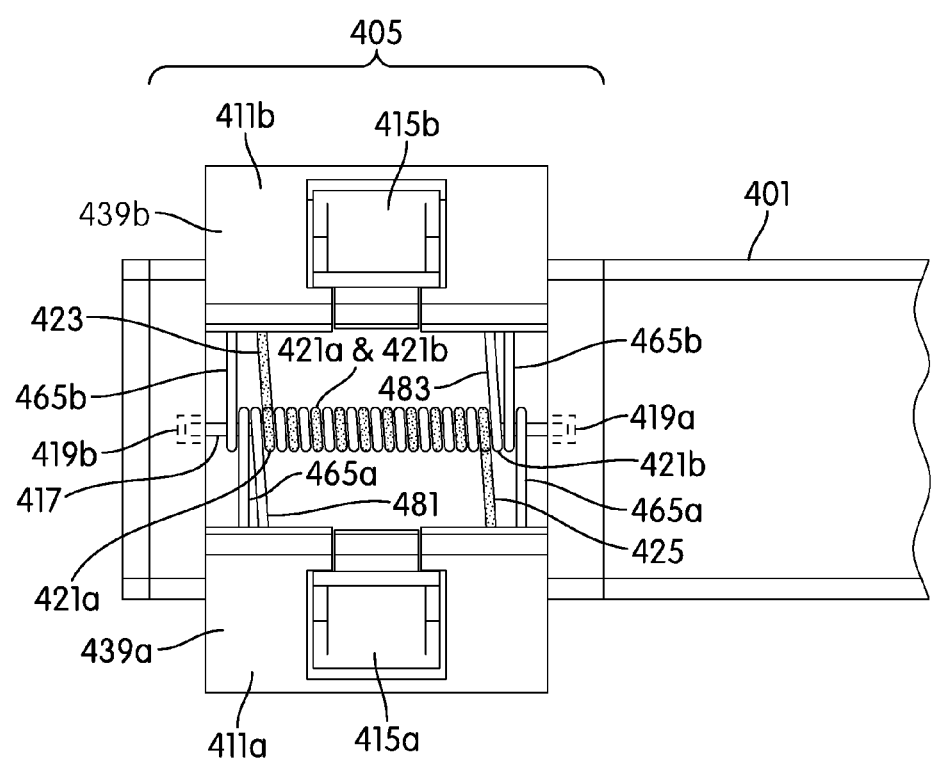
FIG. 4G illustrates portions of an end of a clamp level according to various implementations of the invention.
Figure 4H:
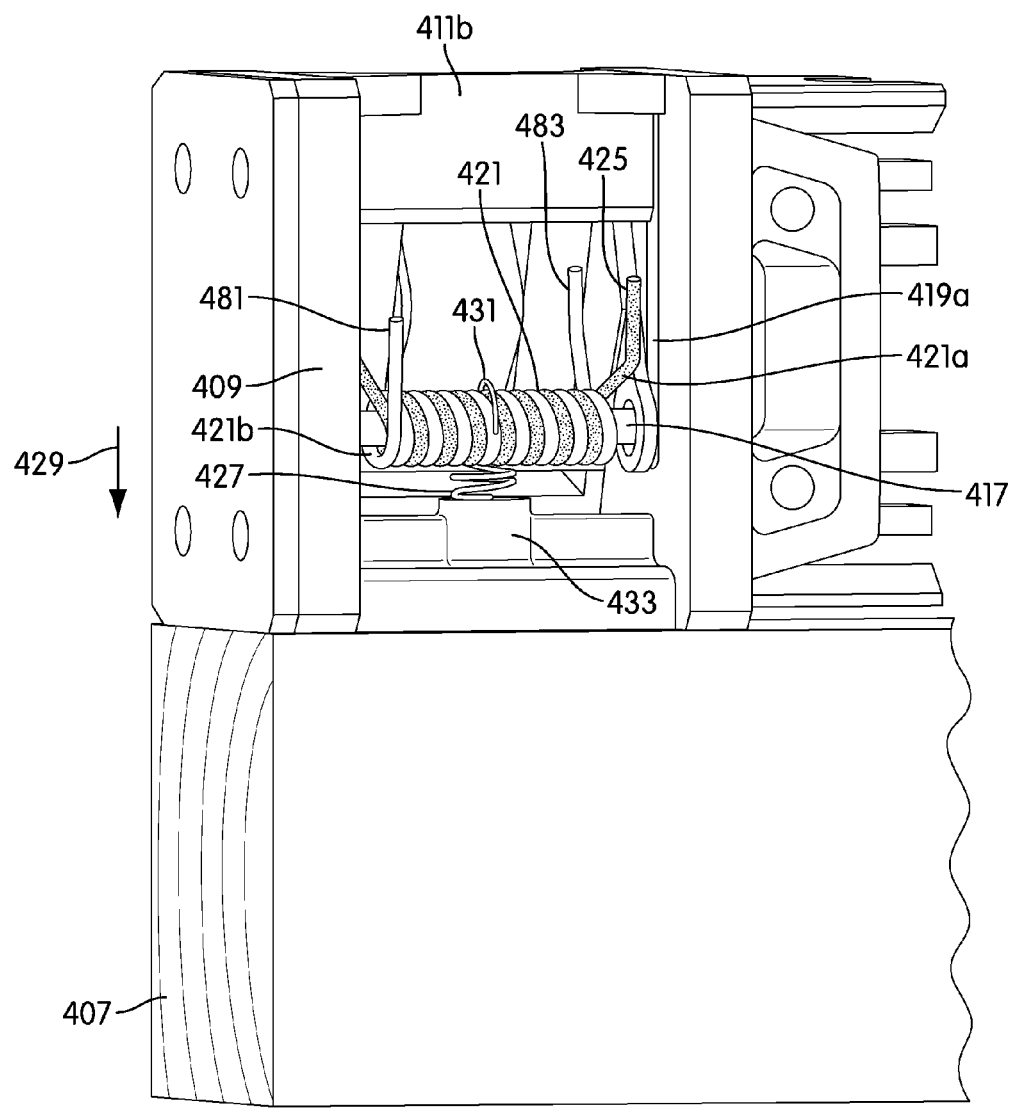
FIG. 4H illustrates portions of a clamp according to various implementations of the invention.

In one implementation, clamp members 411a and 411b may be deployed into a first deployed position wherein the respective first clamp arm portions 413a and 413b of clamp members 411a and 411b are used to clamp workpiece 407 therebetween at clamping surfaces 437a and 437b (see e.g., FIGS. 4E and 4F). First clamp arm portions 413a and 413b have a first maximum spread (i.e., a distance between the clamping surfaces thereof) enabling a workpiece having a first dimension to be clamped. The first deployed position may allow a workpiece of a first size to be clamped between clamping surfaces 437a and 437b of first clamp arm portions 413a and 413b (together, clamping surfaces 437a and 437b may be considered a "first set of clamping surfaces"). For example, the first deployed position may enable clamp level 400 to be clamped to the "2 inch" dimension of certain dimensional lumber (e.g., 2×2, 2×4, 2×6, 2×8, 2×10, 2×12, etc.) It should be noted that the "2 inch" dimension of "2×" lumber is generally narrower than 2 inches. In some implementations, the first deployed position (or any deployed position for a clamp described herein) may enable a clamping range such that workpiece surfaces bigger or smaller may also be clamped (e.g., slightly bigger or smaller than the "2 inch" dimension of certain lumber).

Deployment of clamp members 411a and 411b from the stored position to the first deployed position may be accomplished by manual squeezing or pinching together (e.g., in the direction of arrows 441 and 443 in FIGS. 4E and 4F) of the top portions 439a and 439b of the respective first clamp arm portions 413 of clamp members 411a and 411b. Clamp members 411a and 411b may be pivotably attached to pin 417 by connection portions 465a and 465b, respectively. In some implementations, such as, for example as illustrated in FIG. 4G, each clamp member 411 may have two connection portions 465 such that each of a clamp member 411's connection portions 465 may flank springs 421a and 421b (see illustration of FIG. 4G, wherein clamp member 411a has two connection portions 465a positioned on either end of springs 421a and 421b and clamp member 411b has two connection portions 465b positioned on either end of each of springs 421a and 421b). In some implementations, clamp members may be connected in a manner that enables movement other than, or in addition to, pivoting (e.g., slidable).

The pinching motion of top portions 439a and 439b, may serve to rotate both first clamp arm portions 413 of clamp members 411a and 411b about the axis of pin 417, against the respective bias applied to both clamp members 411a and 411b by springs 421a and 421b. This rotation causes the end of first clamp arm portion 413 opposite to its top portion 439 to rotate in the opposite direction of the pinching/squeezing (i.e., the pinching of top portions 439a and 439b together causes clamping surfaces 437a and 437b to rotate away from one another, thus opening the clamp).

When top portions 439a and 439b are pinched together, both clamp members 411a and 411b may be pushed or moved "downward" or otherwise toward workpiece 407 (e.g., in the direction illustrated by arrow 429 in FIG. 4E) so that clamping surfaces 437a and 437b extend past the bottom of clamp body 409 and so that a portion of workpiece 407 can be positioned between clamping surfaces 437a and 437b of clamp members 411a and 411b. This movement of clamp members 411a and 411b towards the workpiece is facilitated by the fact that the clamp members 411 are slidably mounted in clamp body 409 via pin 417 in openings 419a and 419b. When workpiece 407 is positioned between first clamp arm portions 413 of clamp members 411a and 411b, the pinching or squeezing forces are released, thus clamping workpiece 407 between clamping surfaces 437a and 437b of clamp members 411a and 411b. In some implementations, each clamping surface 437 may include one or more gripping surfaces to improve grip. Note that in some implementations of the first deployed position, second clamp arm portions 415a and 415b may be stored in a compact configuration with respect to their corresponding first clamp arm portions 413a and 413b.

In some implementations, clamp members 411a and 411b are also deployable in a second deployed position. The second deployed position may enable clamp level 400 to be clamped to a surface of a workpiece having a dimension that is larger than the clamping range of the first deployed position. For example, if the first deployed position enables clamping clamp level 400 to the "2 inch" dimension of certain lumber, the second deployed position may enable clamp level 400 to be clamped to a "4 inch" dimension of certain lumber (which may actually be slightly bigger or smaller than 4 inches). Workpieces having other dimensions may be clamped using the second deployed position.

Figure 4I:
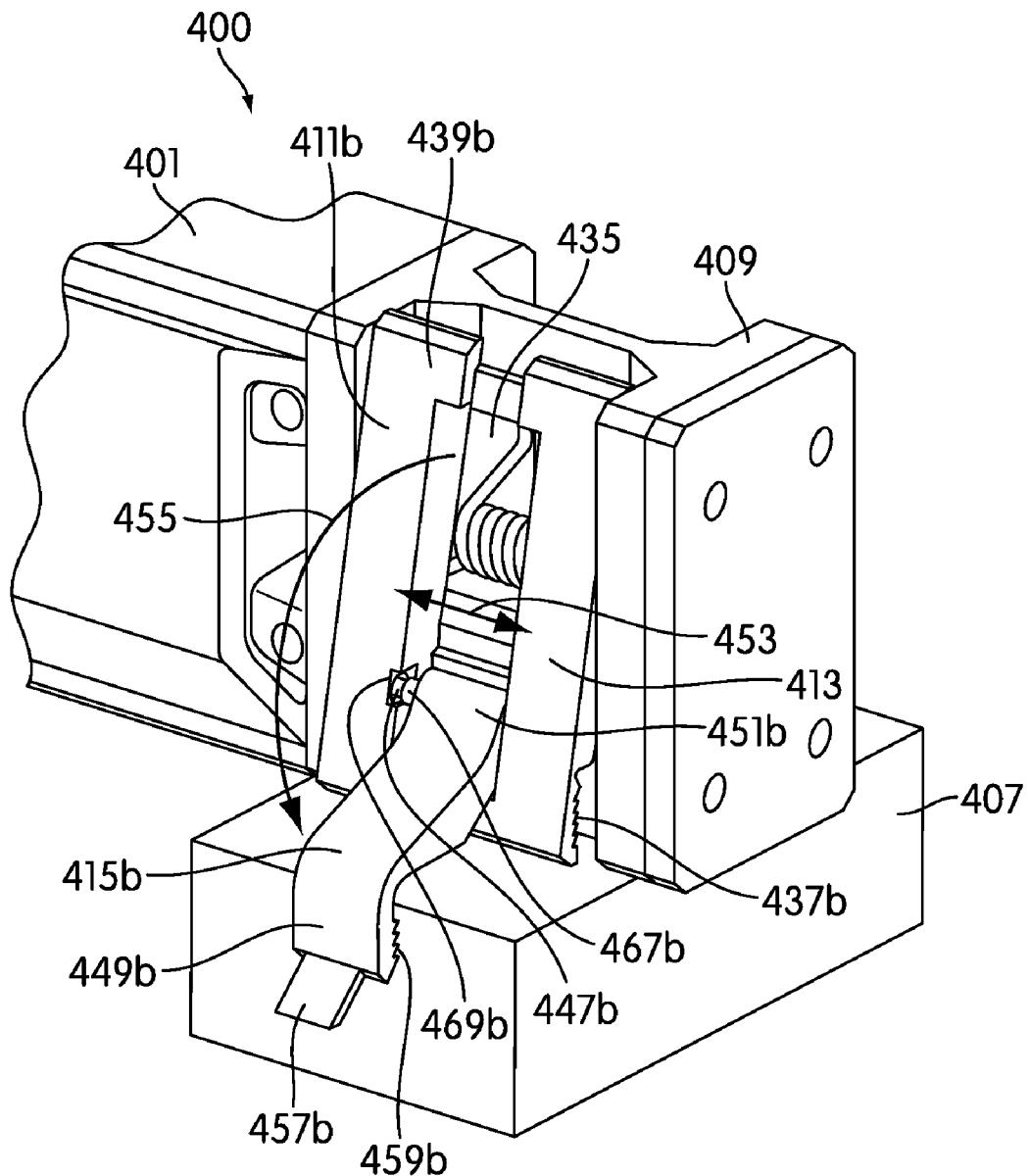
FIG. 4I illustrates an end of a clamp level and a workpiece according to various implementations of the invention.
Figure 4J:
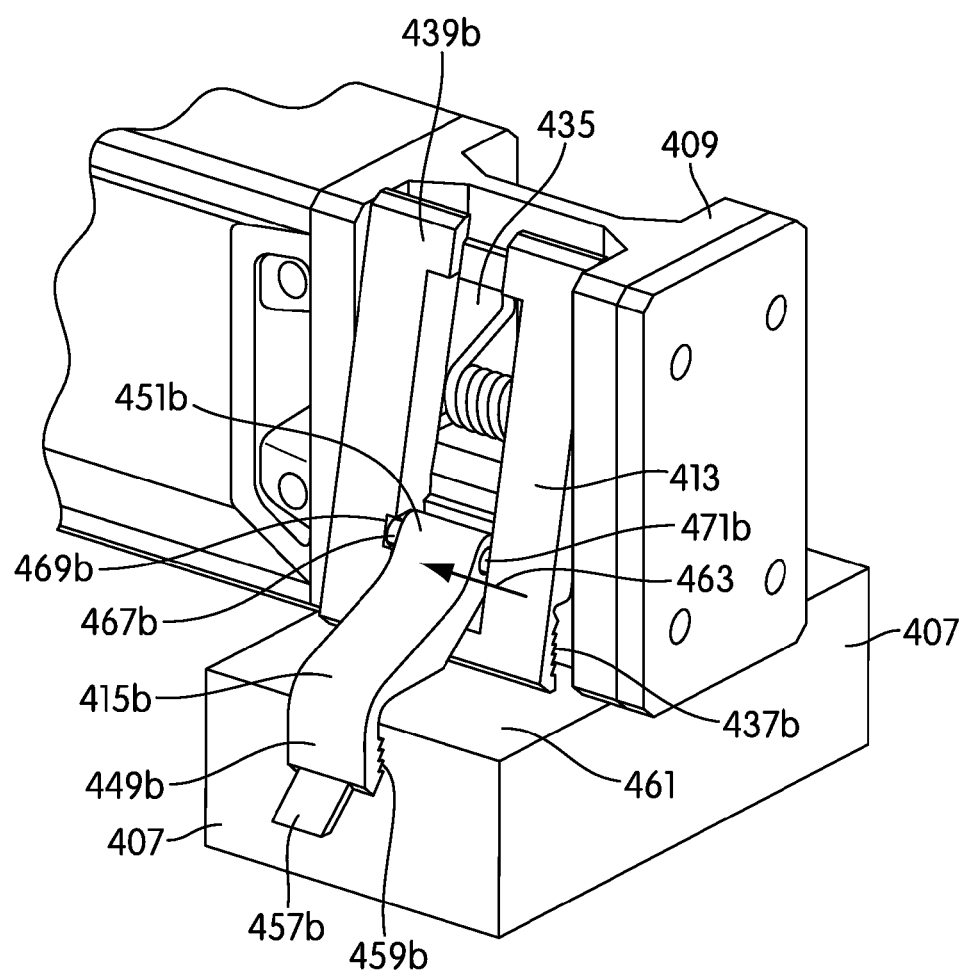
FIG. 4J illustrates an end of a clamp level and a workpiece according to various implementations of the invention.
Figure 4K:
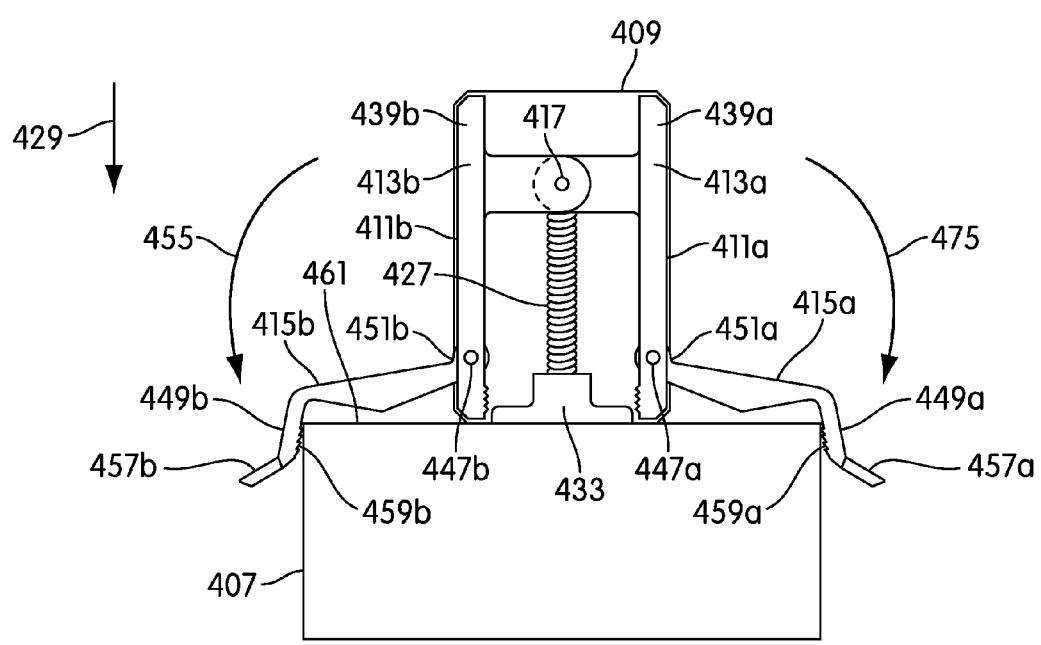
FIG. 4K illustrates a cross section of a clamp of a clamp level and a workpiece according to various implementations of the invention.

As discussed above, each of first clamp arm portions 413a and 413b may have a space 435 located in the center thereof wherein their respective second clamp arm portions 415a and 415b are stored in either a storage position or in a first deployed position. Each second clamp arm portion 415 may have a first end 449 and a second end 451 (see first end 449b and second end 451b of second clamp arm portion 415b in FIGS. 4I, 4J, and 4K and see first end 449a and second end 451a of second clamp arm portion 415a in FIG. 4K). As illustrated in FIGS. 4I, 4J, and 4K, each first end 449 may be bent at a 90 degree angle relative to the underside of its respective second clamp arm portion 415. However, other configurations may be used.

Second end 451 of each second clamp arm portion 415 may be pivotably connected to its respective first clamp arm portion 413 at a pivot location located within the space 435 at a point along first clamp arm portion 413 that is between the end of first clamp arm portion 413 carrying top portion 439 and the end of first clamp arm portion 413 carrying clamping surface 437. This pivotable connection may be enabled by a second clamp arm portion pin (or other axial supporting element) 447 (see second arm portion pins 447a and 447b in FIG. 4K) such that each second clamp arm portion is freely pivotable about the axis defined by its respective pin 447. In some implementations, second clamp arm portions may be connected in a manner that enables movement other than, or in addition to, pivoting (e.g., slidable).

Figure 4L:
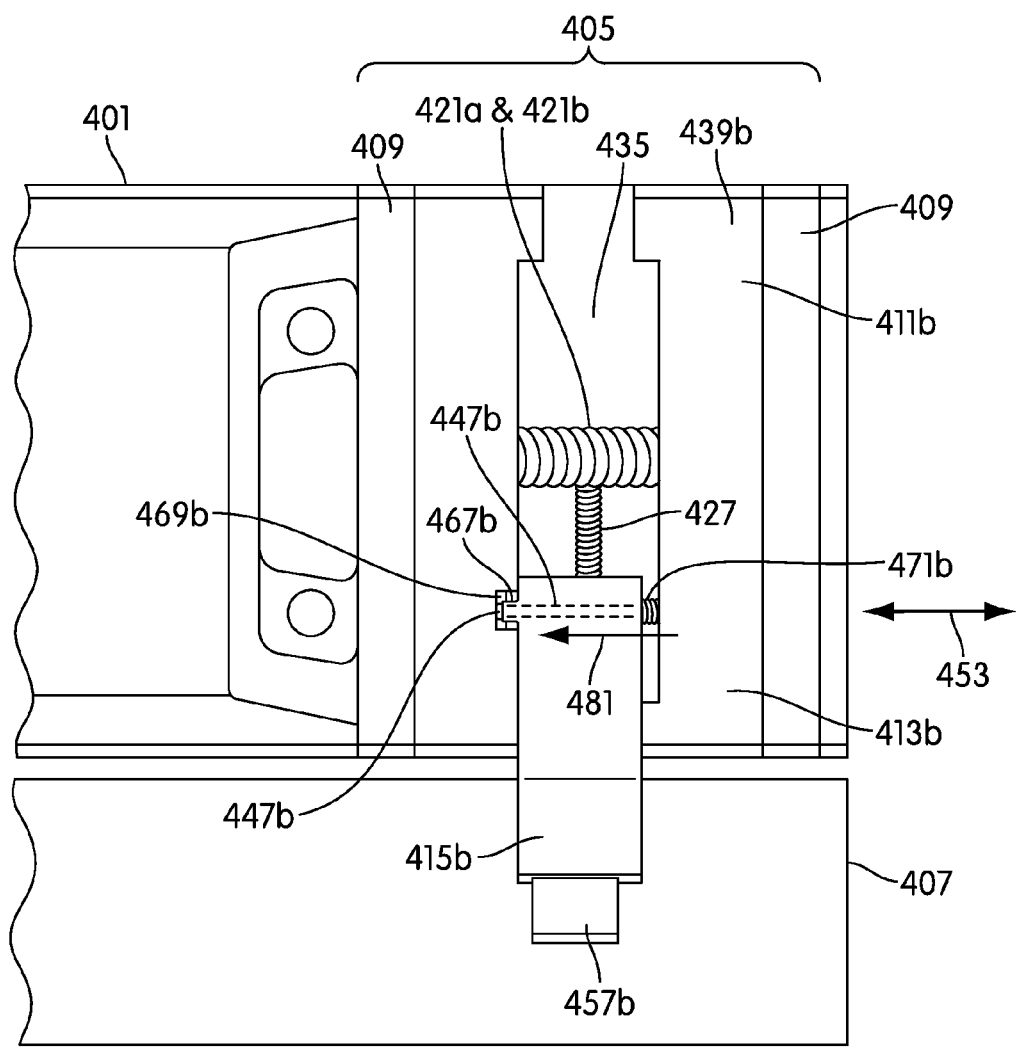
FIG. 4L illustrates portions of an end of a clamp level and a workpiece according to various implementations of the invention.
Figure 4M:
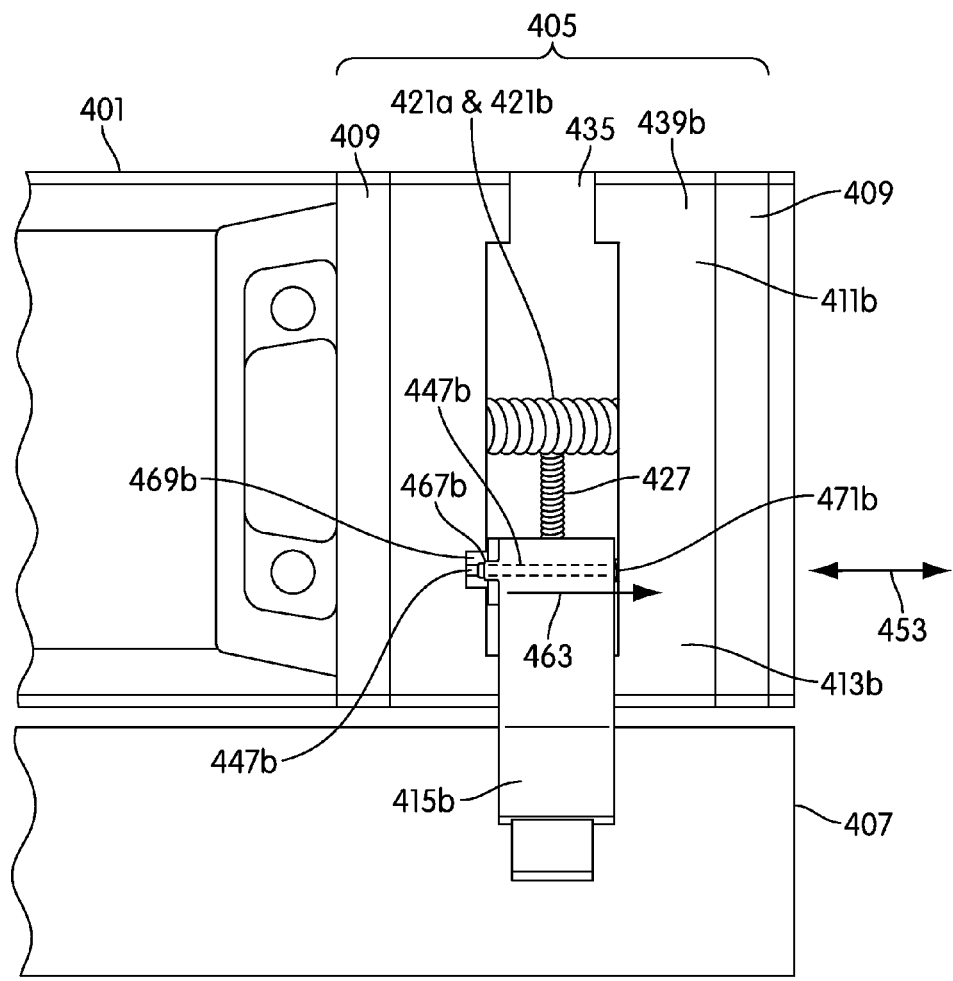
FIG. 4M illustrates portions of an end of a clamp level and a workpiece according to various implementations of the invention.

In some implementations, each second clamp arm portion 415 is also "horizontally" movable/slidable along the axis defined by its respective second clamp arm portion pin 447 (e.g., in the directions indicated by double-sided arrow 453 in FIGS. 4I and 4L). Each second clamp arm portion 415 may include a locking tab 467 (see locking tab 467b of second clamp arm portion 415b of FIGS. 4I-4J, and 4L-4O; locking tab 467a of second clamp arm portion 415a is not illustrated) that corresponds with a corresponding locking slot (or other opening) 469 of first clamp arm portion 413 (see locking slot 469b of first clamp arm portion 413b in FIGS. 4I-4J, and 4L-4O). A spring 471 (e.g., a compression spring) is present on pin 447 (i.e., such that pin 447 runs through a central opening in a circular spring 471) abutting the side of each second clamp arm portion 415 opposite to the side on which locking tab 467 is present (see FIGS. 4I, 4J, and 4L-4O, wherein spring 471b is present on second clamp arm portion 415b) such that the particular second clamp arm portion 415 is biased along the axis of pin 447 in the direction of locking slot 469. For example, FIG. 4L illustrates that spring 471b biases second clamp arm portion 415b in a direction indicated by arrow 481 towards locking slot 469b, such that when second clamp arm portion is extended out of space 435 and into the second deployed position, locking tab 467b is forced within locking slot 469b by the bias of spring 471b. When locking tab 467b is positioned within locking slot 469b, second clamp arm portion 415b is locked into the second clamping position with respect to first clamp arm portion 413b. Correspondingly, when second clamp arm portion 415a is in the second deployed position, it is locked relative to first clamp arm portion 413a. When both clamp members 411a and 411b are locked in the second deployed position, a workpiece can be positioned and clamped between clamping surfaces 459a and 459b (collectively, the "second set of clamping surfaces").

Clamp members 411a and 411b may be deployed into the second deployed position by rotating second clamp arm portions 415a and 415b about the axis of their respective pins 447a and 447b, out from the space 435 of their respective first clamp arm portions 413a and 413b (e.g., see that second clamp arm portion 415b is rotated in the direction of arrow 455 illustrated in FIG. 4I). A tab 457 located at the first end 449 of each second clamp arm portion 415 may assist a user to manually deploy second clamp arm portions 415 from their storage positions.

Once each second clamp arm portion 415 is rotated such that clamping surfaces 459a and 459 of second clamp arm portions 415a and 415b are each generally perpendicular to the surface whose relationship to level is being measured (e.g., as shown in FIGS. 4I, 4J, and 4K, clamping surfaces 459a and 459b are generally perpendicular to top surface 461 of workpiece 407) or are otherwise positioned such that a workpiece can be clamped therebetween (e.g., clamping surfaces 459a and 459b can engage surfaces of the workpiece so as to grip the workpiece therebetween). The locking mechanism described herein is configured such that second clamp arm portions 415a and 415b will be locked into place relative to their respective first clamp arm portions 413a and 413b. Second clamp arm portions 415a and 415b have a second maximum spread (i.e., a distance between the clamping surfaces thereof) enabling a workpiece having a second dimension to be clamped.

Because second clamp arm portions 415a and 415b are locked relative to their respective first clamp arm portions 413a and 413b, the bias that springs 421a and 421b exert on first clamp arm portions 413a and 413b is likewise exerted on second clamp arm portions 415a and 415b in a manner similar to that described herein with respect to the first deployment position (i.e., clamping surfaces 459a and 459b are biased towards each other). Thus, manually squeezing together top portions 439a and 439b of first clamp arm portions 413a and 413b causes clamping surfaces 459a and 459b to be spread apart from one another. Workpiece 407 may then be placed between clamping surfaces 459a and 459b (i.e., the "second set of clamping surfaces"). When the squeezing/pinching forces applied to top portions 439a and 439b are released, the bias of springs 421a and 421b causes clamping surfaces 459a and 459b to contact the sides of workpiece 407 and clamp workpiece 407 therebetween. In some implementations, clamping surfaces 459a and 459b may include one or more gripping surfaces thereon to assist in gripping a workpiece.

Workpiece 407 may be released from clamp 405 in the second deployment position by manually squeezing/pinching top portions 439a and 439b together, thus spreading apart clamping surfaces 459a and 459b, and removing workpiece 407 from between clamping surfaces 459a and 459b. Second clamp arm portions 415a and 415b may be returned to their storage positions by manually pushing each second clamp arm portion 415 horizontally along the axis of their respective pins (or other axial support elements) 447 against the bias of spring 471 (e.g., pushing second clamp arm portion 415b, in the direction of arrow 463 in FIG. 4M), such that the locking tab 467 of the second clamp arm portion 415 is removed from its corresponding locking slot 469 (see e.g., FIG. 4M, wherein locking tab 467b is removed from locking slot 469b). While the locking tab 467 is positioned out of its corresponding locking slot 469, the second clamp arm portion 415 may be rotated into the storage position (i.e., the first end 449 of the second clamp arm portion 415 is rotated toward top portion 439 of its respective first clamp arm portion 413 until second arm portion 415 is generally within space 435.).

Figure 4N:
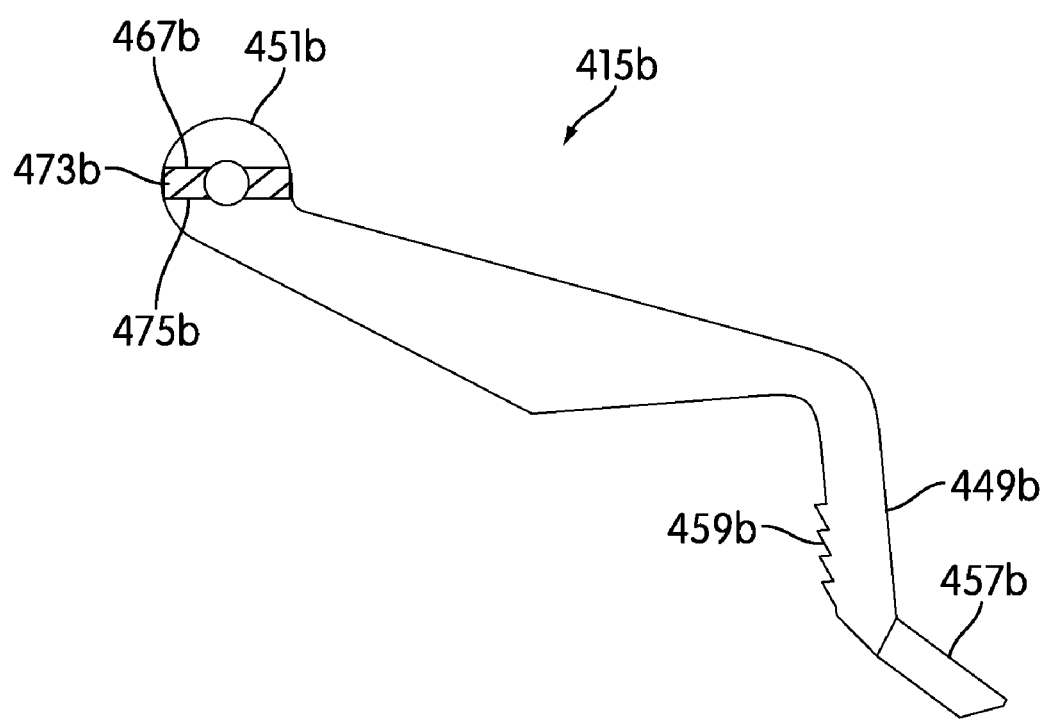
FIG. 4N illustrates a second clamp arm portion according to various implementations of the invention.
Figure 4O:
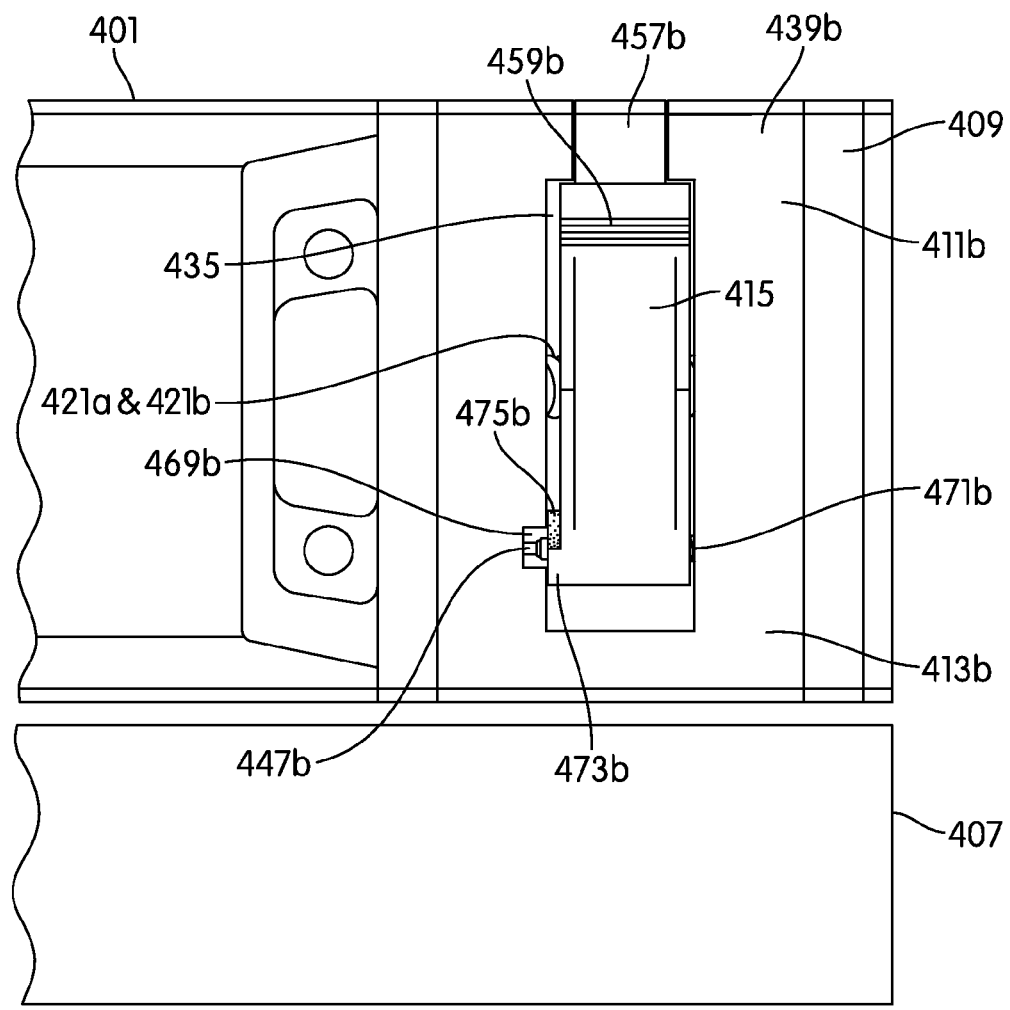
FIG. 4O illustrates portions of an end of a clamp level and a workpiece according to various implementations of the invention.

FIG. 4N illustrates a side view of second clamp arm portion 415b, wherein locking tab 467b is shaded. A back portion 473b and side portion 475b of locking tab 467b are also illustrated. A similar configuration can be used on second clamp arm portion 415a. In this example configuration of locking tab 467b (other configurations may be used), when second clamp arm portion 415b is in the stored position (as illustrated in FIG. 4O), locking tab 467b works against the bias of spring 471b, thus preventing second clamp arm portion 415b from moving horizontally toward locking slot 469b. As such, second clamp arm portion 415b remains unlocked when in the stored position.

Still other configurations for clamps may be used in a clamp level according to various embodiments. For example, FIGS. 5A-4C illustrate portions of a clamp 500 clamping a workpiece 501. Clamp 500 may include a clamp body 503, a clamp element 505, an actuation portion 507, and/or other elements.

In some implementation, clamp element 505 may include a rigid member having a first end 509, a second end 511, and at least one acute bend 513 therebetween. Bend 513 is such that first end 509 and second end 511 generally oppose each other. As such, when deployed, first end 509 and second end 511 are positioned so as to clamp workpiece 501 therebetween. In some implementations, clamp element 505 may include a flat sheet of material that is bent (e.g., at bend 513) such that the view provided by FIGS. 5A-C is a cross-section of the sheet of material. Clamp element 505 may be rigid and constructed such that ends 509 and 511 are biased toward one another, thus enabling an object (i.e., workpiece 501) to be clamped therebetween. Furthermore, the portion of clamp element 505 between each of ends 509 and 511 and bend 513 may be considered a clamp arm (see FIGS. 5A-5C, illustrating a first clamp arm 515 between first end 509 and bend 513 and a second clamp arm 517 between second end 511 and bend 513.

Clamp element 505 of clamp 500 may be stored in a storage position and deployed to clamp a workpiece in a deployed position. FIG. 5A illustrates clamp 500 in a storage position, wherein ends 509 and 511 do not extend beyond a surface of clamp body 503 that contacts a workpiece when a level measurement of the workpiece is desired. A compression spring 519 is disposed between bend 513 of clamp element 505 and an angle carrying element 521 (e.g., a block of material having at least two angled surfaces, i.e., angled surface 525 and angled surface 527). Angle carrying element 521 is positioned adjacent to or is part of the interior of the bottom portion of clamp body 503 (the bottom portion of clamp body 503 is the portion that contacts a workpiece when a level measurement of the workpiece is desired). As angle carrying element 521 causes ends 509 and 511 of clamp element 505 to spread apart, angle carrying element 521 may also be referred to as a "spreading element" or "spreading portion." Spring 519, being so positioned, biases clamp element 505 (or at least bend 513) and angle carrying element 521 away from one another. Clamp element 505 is disposed between actuation portion 507 and spring 519. In some implementations, actuation portion 507 may be a piece of material (e.g., an elongated button) capable of transferring an actuation force exerted thereon to clamp element 505.

In some implementations, when clamp 500 is clamped to a workpiece (e.g., workpiece 501), spring 519 biases clamp body 503 (and/or a level body to which clamp 500 is attached) towards the workpiece (similar to the action of spring 345 of FIGS. 3I, 3M, and 3N and spring 472 of FIGS. 4B and 4F, 4H, 4K, etc.), thus providing certain advantages (e.g., stable connection, accurate level measurement, use in awkward positions, and other advantages).

When actuation portion 507 is depressed (e.g., in the direction of arrow 523 of FIG. 5B, against the bias of spring 519), the depression force is transferred to clamp element 505. As each of clamp arms 515 and 517 are positioned adjacent to angled surfaces 525 and 527, respectively, the force transferred to clamp element 505 is at least partially translated by contact of the clamp arms with the angled surfaces into forces (illustrated by arrows 529 and 531 in FIG. 5B) that act against the rigid bias of each of clamp ends 509 and 511, thus forcing the clamp ends open. The force transferred from actuation portion 507 (i.e., in direction of arrow 523) concurrently moves clamp ends 509 and 511 below/beyond the "bottom" portion of clamp body 503, so that workpiece 501 is disposed between clamp ends 509 and 511. When the force is removed from actuation portion 507, the bias of spring 519 forces clamp element 505 (or at least bend 513) away from angle carrying portion 521 (in the direction of arrow 533 in FIG. 5C), thus reversing the spreading action that angled surfaces 525 and 527 impart on clamp arms 515 and 517, causing the bias of rigid clamp element 505 to act to draw ends 509 and 511 toward one another (see arrows 535 and 537 of FIG. 5C). As workpiece 501 is positioned between ends 509 and 511, workpiece 501 is clamped therebetween when both ends 509 and 511 contact workpiece 501 as they draw together, placing clamp 500 in the deployed position.

Clamp 500 can be returned to the storage position by depressing actuation portion 507 towards the clamped workpiece, thus spreading ends 509 and 511 apart, and removing the workpiece from between ends 509 and 511. After the workpiece is removed from between ends 509 and 511 and the force depressing actuation portion 507 is removed, spring 519 and the bias of rigid clamp element 505 cause ends 509 and 511 to be drawn back into the storage position.

Figure 6A:
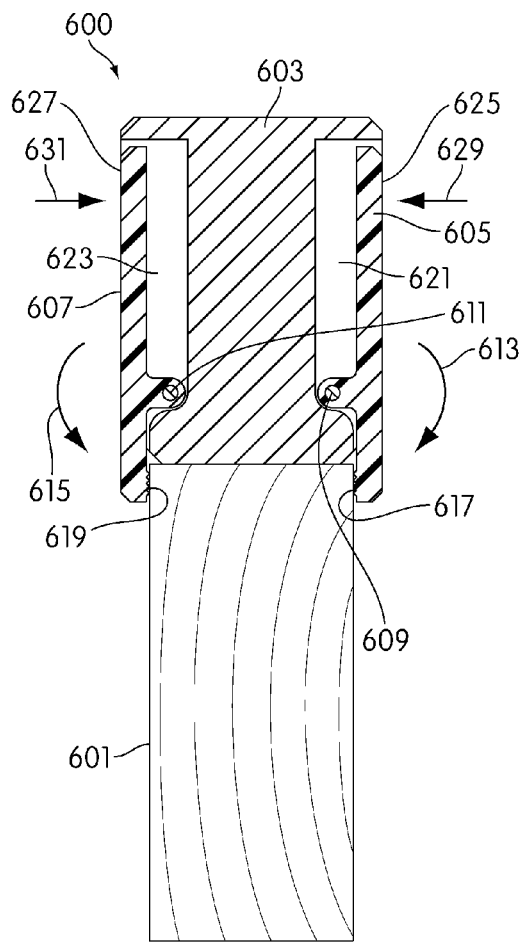
FIG. 6A illustrates a cross-section of a clamp and a workpiece according to various implementations of the invention.

Still other configurations for clamps may be used in a clamp level according to various embodiments. For example, FIG. 6A illustrates portions of a clamp 600 clamping a workpiece 601. Clamp 600 may include a clamp body 603, a first clamp member 605, a second clamp member 607, and/or other elements. In some implementations, less or more than two clamp members may be used (see, e.g., FIG. 6B, wherein one clamp member is used.).

Each of clamp members 605 and 607 may be movably mounted to clamp body 603. In some implementations, each of clamp members 605 and 607 may be pivotably mounted to clamp body at pivot axes 609 and 611 respectively. In some implementations, clamp members may be pivotably mounted to clamp body 603 via an axial support element (e.g. a pin; see e.g., pins 609 and 611 of FIG. 6A). In some implementations, clamp members 605 and 607 may be otherwise movably mounted to clamp body 603 (e.g., slidably mounted.).

In some implementations, the pivotable mounting of a clamp member (e.g., clamp members 605 and 607) may include a spring or other rigid element (not illustrated) that biases clamp members 605 and 607 toward one another (e.g., in the directions indicated by arrows 613 and 615 of FIG. 6B), such that workpiece can be clamped between clamping surfaces 617 and 619 of clamp members 605 and 607. Clamp body 603 may include a first recess 621 on the side of clamp body 603 where clamp member 605 is mounted and a second recess 623 on the side of clamp body 603 where clamp member 607 is mounted. These recesses enable their respective clamp members to pivot against their respective bias. Therefore, when top portions 625 and 627 of clamp members 605 and 607 are pinched together (i.e., in the direction of arrows 629 and 631 of FIG. 6A), clamping surfaces 617 and 619 are spread apart such that workpiece 601 can be placed between or removed from the clamping surfaces. When the pinching force is removed from top portions 625 and 627, clamp portions 605 and 607 rotate in the direction of their respective bias, thus enabling clamping of workpiece between clamping surfaces 617 and 619.

Figure 6B:
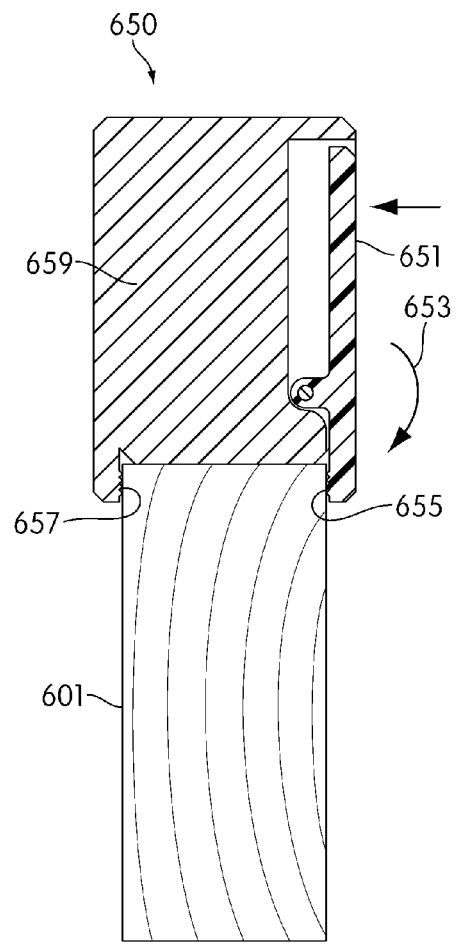
FIG. 6B illustrates a cross-section of a clamp and a workpiece according to various implementations of the invention.

FIG. 6B illustrates a clamp 650, which is an example of a clamp similar to clamp 600, having only one movable clamp member 651, that is biased in a direction indicated by arrow 653, such that workpiece 601 can be clamped between clamping surface 655 of clamp member 651 and stationary surface 657 of clamp body 659.

Figure 7B:
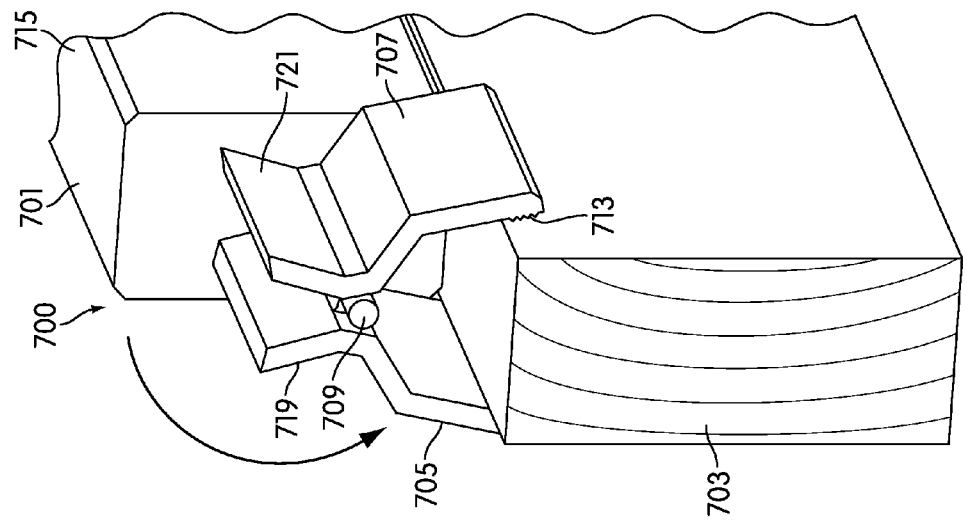
FIG. 7B illustrates at least a portion of an end of a clamp level and a workpiece according to various implementations of the invention.
Figure 7A:
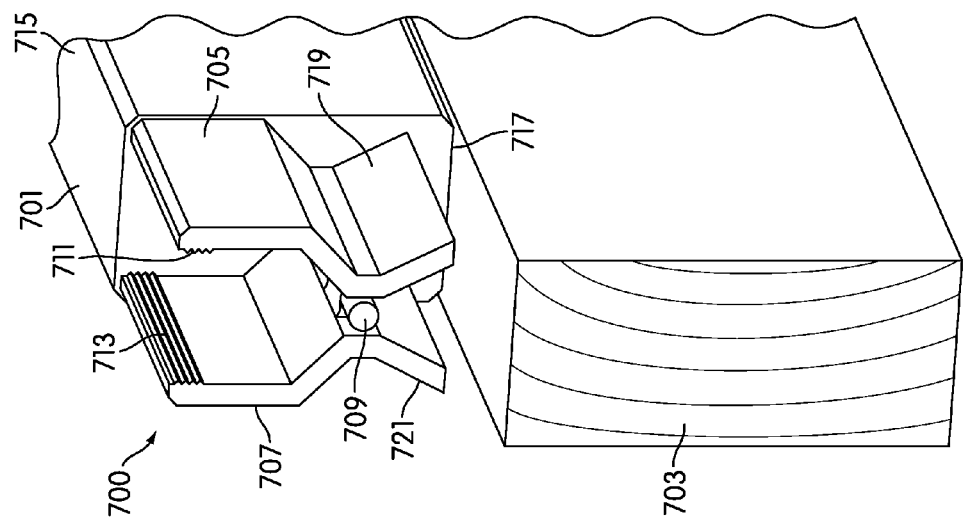
FIG. 7A illustrates at least a portion of an end of a clamp level and a workpiece according to various implementations of the invention.

FIGS. 7A and 7B illustrate an example of a clamp 700 attached to a level body 701 for clamping level body 701 to a workpiece 703. Clamp 700 may include a first clamp member 705, a second clamp member 707, an axial support element (e.g., a pin) 709, and/or other elements. Each of clamp members 705 and 707 may be pivotably connected to pin 709. Furthermore, a spring or other rigid element (not illustrated, although springs similar to 323a and 323b may be used) may be present at the connection of 705 and 707 so as to bias clamping surfaces 711 and 713 towards one another (thus, enabling a workpiece to be clamped therebetween).

FIG. 7A illustrates clamp 700 in a storage position wherein an opening adjacent to clamping surfaces 711 and 713 is oriented adjacent to a first surface 715 of level body 701. In this orientation, clamping surfaces 711 and 713 do not extend beyond the general height dimensions of level body 701. Clamp 700, as a unit, is rotatable around the axis of pin 709. Additionally, pin 709 is placed closer towards a second surface 717 of level body 701 that is on the opposite side of level body 701 from first surface 715. Therefore, when clamp 700, as a unit, is rotated 180 degrees about the axis of pin 709, clamping surfaces 711 and 713 extend beyond the general height dimension of level body 701 (see FIG. 7B). As such, workpiece 703 is able to be clamped between clamping surfaces 711 and 713 when: 1) ends 719 and 721 of clamp members 705 and 707 are pinched/squeezed together (ends 719 and 721 may be considered "actuation elements" or "actuation portions"), thereby spreading clamping surfaces 711 and 713 apart from one another, 2) positioning workpiece 703 and/or clamp 700 such that workpiece is disposed between clamping surfaces 711 and 713, and 3) releasing the pinching/squeezing force on ends 719 and 721, thereby causing the bias acting upon clamp members 705 and 707 to move clamping surfaces 711 and 713 toward one another and clamp workpiece 703 therebetween.

Figure 8B:
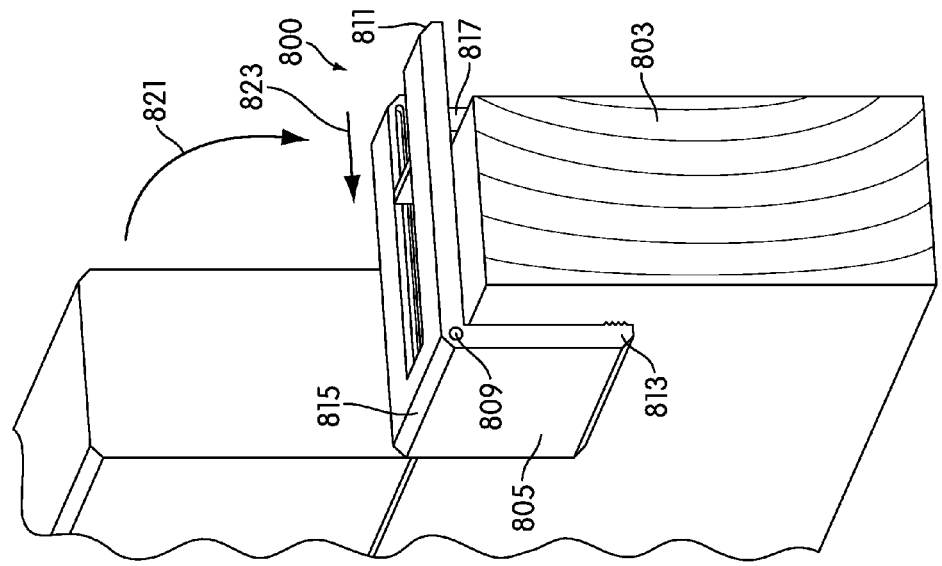
FIG. 8B illustrates at least a portion of an end of a clamp level and a workpiece according to various implementations of the invention.
Figure 8A:
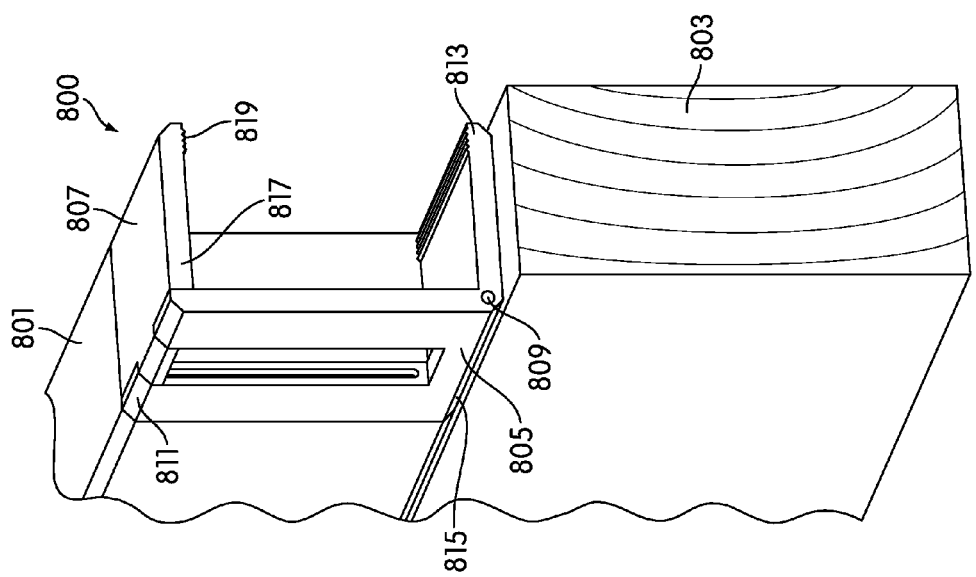
FIG. 8A illustrates at least a portion of an end of a clamp level and a workpiece according to various implementations of the invention.

FIGS. 8A and 8B illustrate a clamp 800 that can be used to clamp level body 801 to a workpiece 803. Clamp 800 may include large clamp member 805, small clamp member 807, axial support element (e.g., a pin) 809, and/or other elements. In some implementations large clamp member 805 may be an "L" shaped element having a first end 811, a second or clamping end 813, and a 90 degree bend 815 therebetween. A first end 817 of small clamp member 807 may be movably attached to large clamp member such that a distance or gap between the second or clamping end 819 of small clamp member 807 and the clamping end 813 of large clamp member 805 is varied by the position of small clamp member 807. In some embodiments, the movable attachment may be a slidable attachment, as illustrated in FIGS. 8A and 8B. In some implementations, this slidable attachment may enable continuous scale of variations in the gap between large clamp member 805 and small clamp member 80. Additionally, while large clamp member 805 may be rotatable relative to level body 801 as described further herein, large clamp member 805 may be considered "stationary" relative to small clamp member 807, while small clamp member 807 may be considered "movable". However, juxtaposition of the relative "movable" and "stationary" clamp members of this description may also be employed.

Large clamp member 805 is pivotably mounted to a corner of level body 801 by pin 809. Pin 809 is mounted through large clamp member 805 at bend 815 such that upon pivoting 90 degrees, the portion of large clamp member 805 between bend 815 and clamping end 813, and small clamp member 807 extend beyond the height dimension of clamp body. FIG. 8A illustrates clamp 800 in a storage position, wherein both large clamp member 805 and small clamp member 807 are generally within the height and width dimensions of level body 801. When clamp 800 is pivoted 90 degrees (in the direction indicated by arrow 821 in FIG. 8B), clamping ends 813 and 819 extend beyond the height dimension of level body 801 such that workpiece 803 can be positioned therebetween. Note that in some configurations, a workpiece must be moved away from clamp similar to clamp 800 when transitioning the clamp to the deployed position, so as to allow clearance for clamping end 803 (or similar element) to move into position. Small clamp member 807 is then moved (e.g., slid in the direction of arrow 823 illustrated in FIG. 8B, which shows clamp 800 in a deployed position) toward large clamp member 805 until workpiece 803 is clamped between large clamp member 805 and small clamp member 807. In some implementations, small clamp member 807 may be releasably locked into place with relation to large clamp member 805 so as to secure the clamped workpiece therebetween.

FIGS. 9A and 9B illustrate a clamp 900 that can be used to clamp level body 901 to workpiece 903. Clamp 900 includes clamp members 905 and 907, a cap 909, a clamp body 911, and/or other elements. Each of clamp members 905 and 907 are pivotably (or otherwise movably) attached to clamp body 911 and spring loaded so as to be biased to rotate toward one another (e.g., clamp member 905 is biased in a clockwise direction, indicated by arrow 921 in FIG. 9B; clamp member 907 is biased in a counterclockwise direction, indicated by arrow 923 in FIG. 9B). Each of clamp members 905 and 907 include a clamping end located at the end of the clamp member farthest from the attachment to clamp body (e.g., clamp member 907 includes a clamping end 917; clamp member 905 includes a clamp end 915 [obscured in both FIGS. 9A and 9B].).

In a storage position, clamp members 905 and 907 are held within the general height and width dimensions of level body 901. In this storage position, the clamp ends 915 and 917 of clamp members 905 and 907 are held within spaces present in cap 909, thus preventing clamp members 905 and 907 from moving according to their respective bias. To deploy clamp 900 to a deployed position, cap 909, which may be slidably attached to clamp body 911 so as to allow vertical movement, may be moved away from clamp body 911 (e.g., in the direction of arrow 919 in FIG. 9B). This movement of cap 909 removes the restriction on clamp ends 915 and 917 and thus allows clamp members 905 and 907 to move in the direction of their respective bias (e.g., clamp member 905 moves in the direction indicated by arrow 921 in FIG. 9B and clamp member 907 moves in the direction indicated by arrow 923 in FIG. 9B). Therefore, workpiece can be clamped between clamp ends 915 and 917. Clamp 900 can be returned to the storage position by manually rotating clamp members 905 and 907 against their respective bias and storing their clamp ends within cap 909.

FIGS. 10A-10D illustrate a clamp 1000 that can be used to clamp a level body 1001 to a workpiece 1003. Clamp 1000 may include a clamping element 1005 and a clamp body 1007, a compression spring 1009, and/or other elements.

Clamp element 1005 may include a rigid element having two arm portions 1011 and 1013 and a top portion 1029 that is generally orthogonal to each of arm portions 1011 and 1013. Each arm portion may include a clamping portion comprised of at least two angled sides. FIGS. 10A and 10B illustrate that arm portion 1011 includes a clamp portion 1015 having angled sides 1019 and 1021 and that arm portion 1013 includes a clamp portion 1017 having angled sides 1023 and 1025. Clamp element 1005 is a rigid element and is constructed such that clamp portions 1015 and 1017 are biased towards one another.

Compression spring 1009 is disposed between the underside of top portion 1029 of clamp element 1005, biasing clamp element 1005 in a storage position wherein arm portions 1011 and 1013 of clamp element do not protrude away from the width or height dimensions of level body 1001. However, when a downward force (i.e., in the direction of arrow 1027 of FIG. 10B) is exerted on top portion 1029 of clamp element 1005 (top portion 1029 may also be referred to as an "actuation portion" or an "actuation surface"), compressing spring, clamp portions 1015 and 1017 extend beyond the height and width dimensions of level body 1001 so that workpiece 1003 is positionable therebetween. Because of the angled nature of the lower sides 1021 and 1025 of clamp portions 1015 and 1017 (lower sides 1021 and 1025 may be referred to as "spreading surfaces" or "spreading portions"), respectively, the downward force not only pushes clamping portions beyond the height dimension of level body 1001, but contact with workpiece 1003 by sides 1021 and 1025 translates the downward force into forces that spread arms 1011 and 1013 apart, against their respective bias. Thus, the bias of arms 1011 and 1013 generates clamping forces against the body of workpiece 1003, securely clamping workpiece 1003 between clamp portions 1015 and 1017. These clamping forces are necessarily stronger than the force of compression spring 1009 acting on the underside of top portion 1029. As such, level body 1001 remains clamped.

To return clamp element 1005 to the storage position, workpiece 1003 is removed from between clamp portions 1015 and 1017 (or clamp 1000 is removed from workpiece 1003), enabling the bias of compression spring 1009 to return clamp 1000 to its storage position.

Note also that, in some implementations, spring 1009 biases clamp body 1007 and/or level body 1001 towards a clamped workpiece (similar to the action of spring 345 of FIGS. 3I, 3M, and 3N and spring 472 of FIGS. 4B and 4F, 4H, 4K, etc.), thus providing certain advantages (e.g., stable connection, accurate level measurement, use in awkward positions, and other advantages).

Figure 10D:
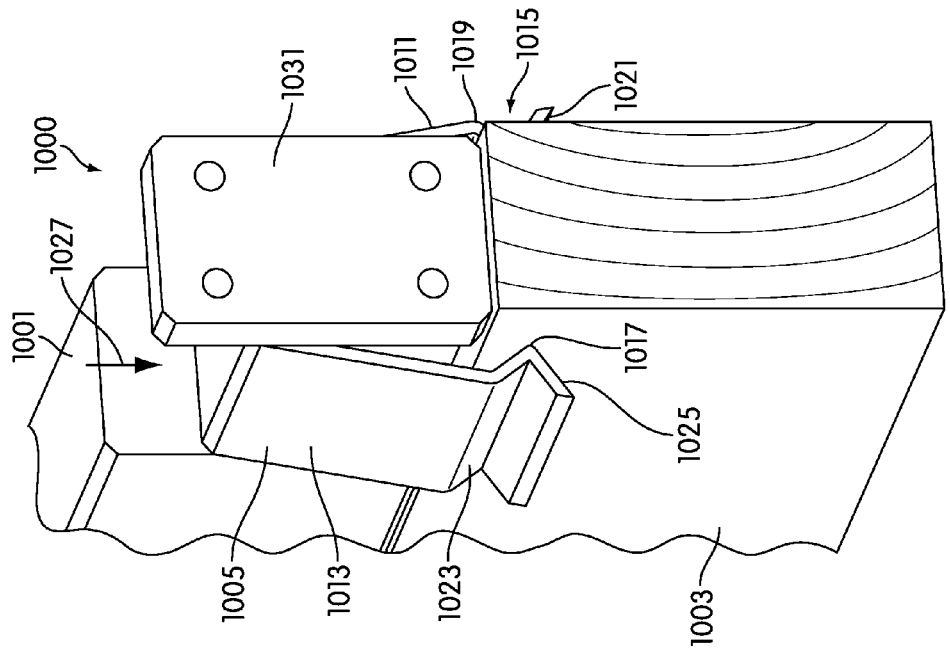
FIG. 10D illustrates at least a portion of an end of a clamp level and a workpiece according to various implementations of the invention.
Figure 10C:
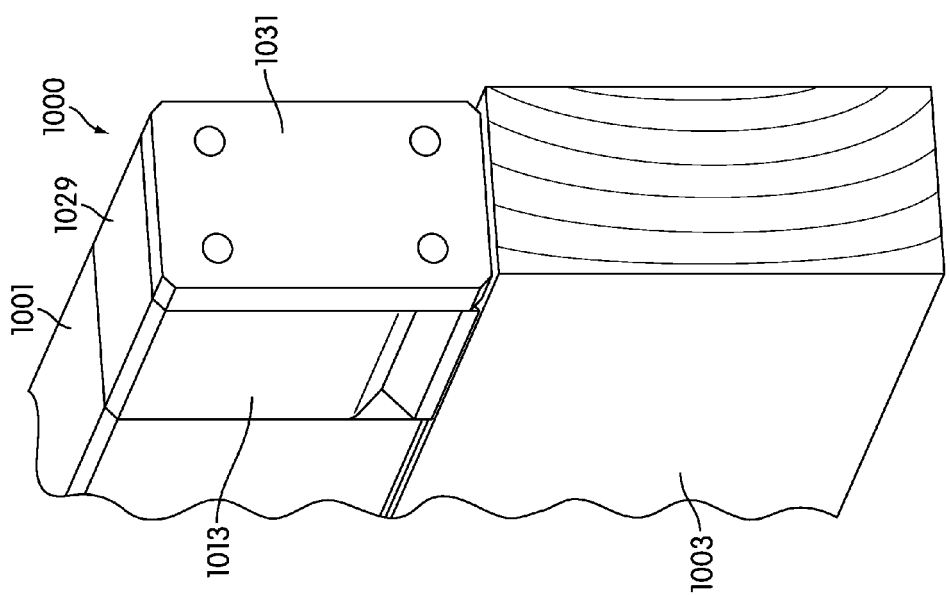
FIG. 10C illustrates at least a portion of an end of a clamp level and a workpiece according to various implementations of the invention.

FIGS. 10C and 10D illustrate clamp 1000 in the positions illustrated in FIGS. 10A and 10B, respectively. However, FIGS. 10C and 10D also illustrate an end portion 1031, which may be attached to or be part of clamp body 1007.

Figure 11B:
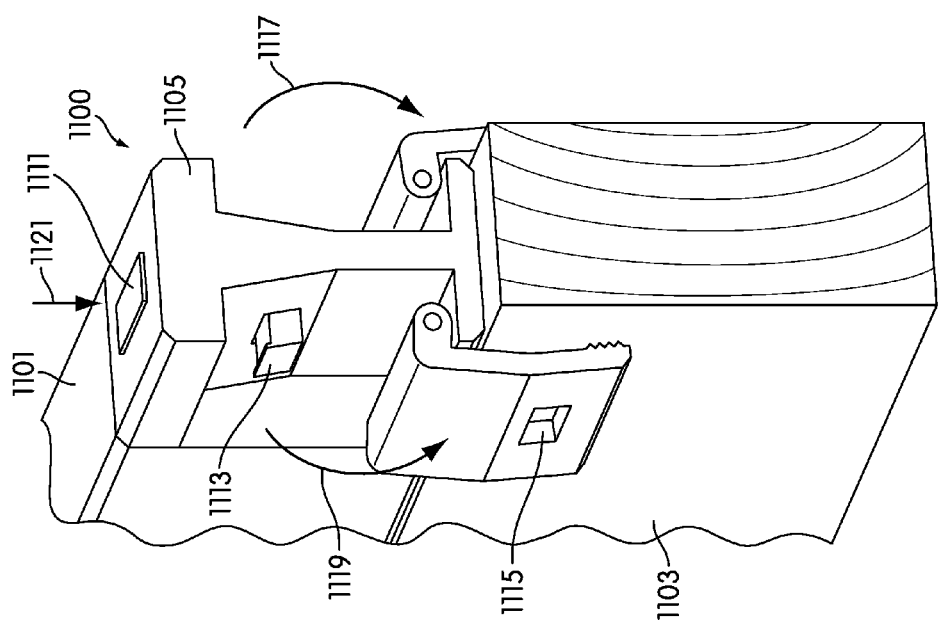
FIG. 11B illustrates at least a portion of an end of a clamp level and a workpiece according to various implementations of the invention.
Figure 11A:
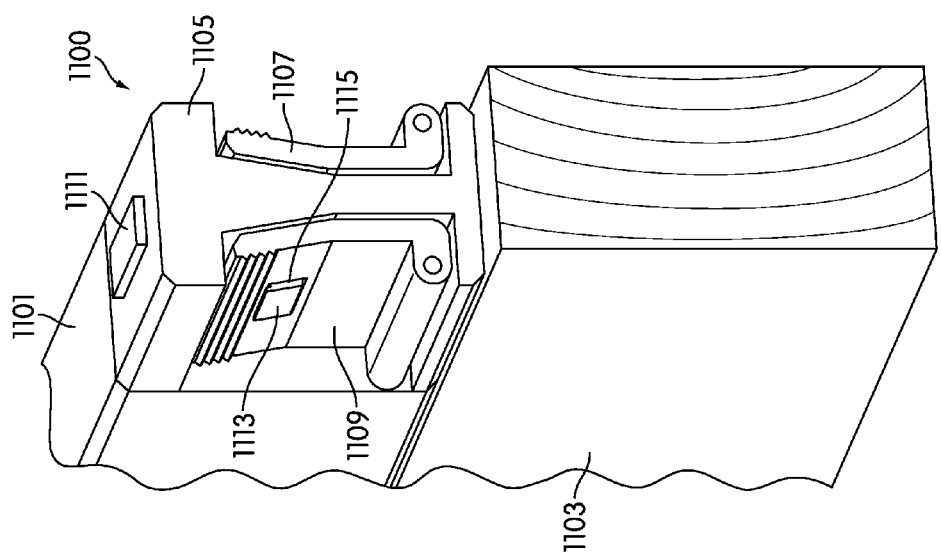
FIG. 11A illustrates at least a portion of an end of a clamp level and a workpiece according to various implementations of the invention.

FIGS. 11A and 11B illustrate a clamp 1100 that can be used to clamp a level body 1101 to a workpiece 1103. Clamp 1100 is similar to clamp 200 of FIGS. 2A and 2B, in that it includes a clamp body 1105 and two clamp members (1107, 1109) that are spring biased towards one another so that a workpiece (1103) can be clamped therebetween (see FIG. 11B). Similar to clamp 200, clamp 1100 includes a spring loaded actuation mechanism that includes an actuation portion (1111) and two catches, each hook-type portions (1113) engaging catches (1115) that hold the clamp members (1107, 1109) within the general height and width dimensions of the level body (1101) when in a storage position (FIG. 11A). When the actuation portion is actuated (e.g., pushed in the direction of arrow 1121 of FIG. 11B), the hook-type portions disengage the catches of the clamp members, enabling the clamp members to rotate in the direction of their bias (see arrows 1117 and 1119 of FIG. 11B) and clamp the workpiece (1103) therebetween. While clamp 200 illustrates that the catch portions (217) of the clamp members (205) are embedded within a surface of the clamp members (see FIG. 2B), clamp 1100 includes catch portions that are through-holes extending through the entire width of the clamp members.

Figure 12A:
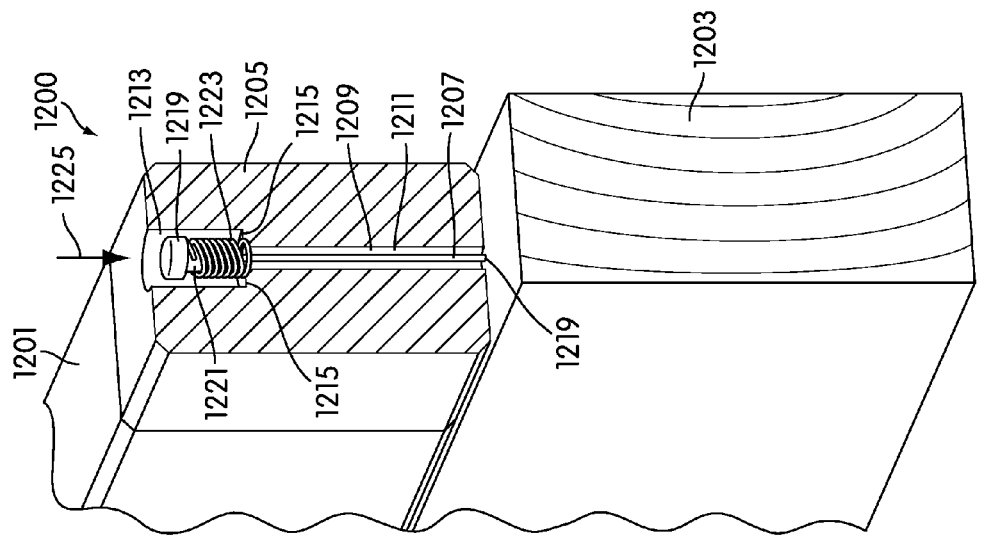
FIG. 12A illustrates at least a portion of an end of a clamp level and a workpiece according to various implementations of the invention.
Figure 12B:
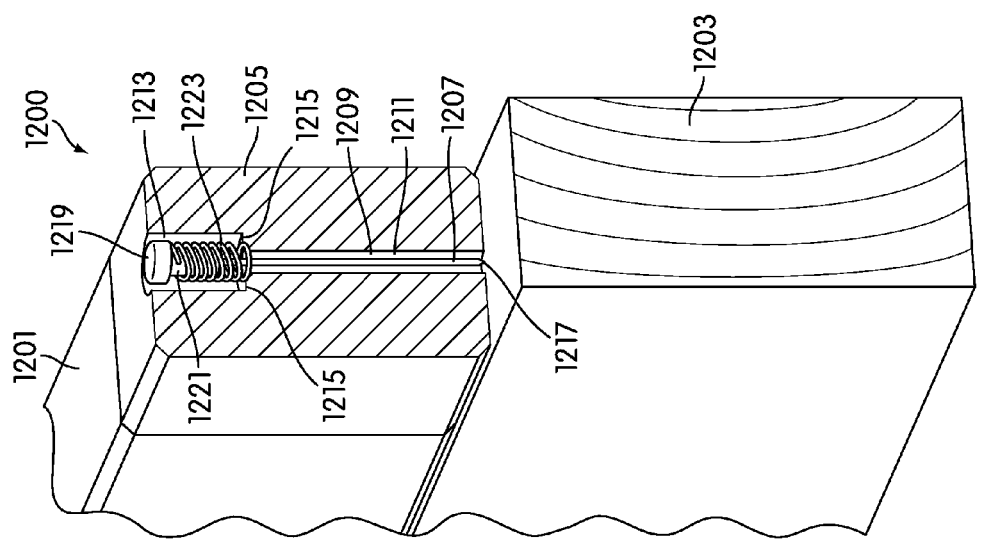
FIG. 12B illustrates at least a portion of an end of a clamp level and a workpiece according to various implementations of the invention.
Figure 12C:
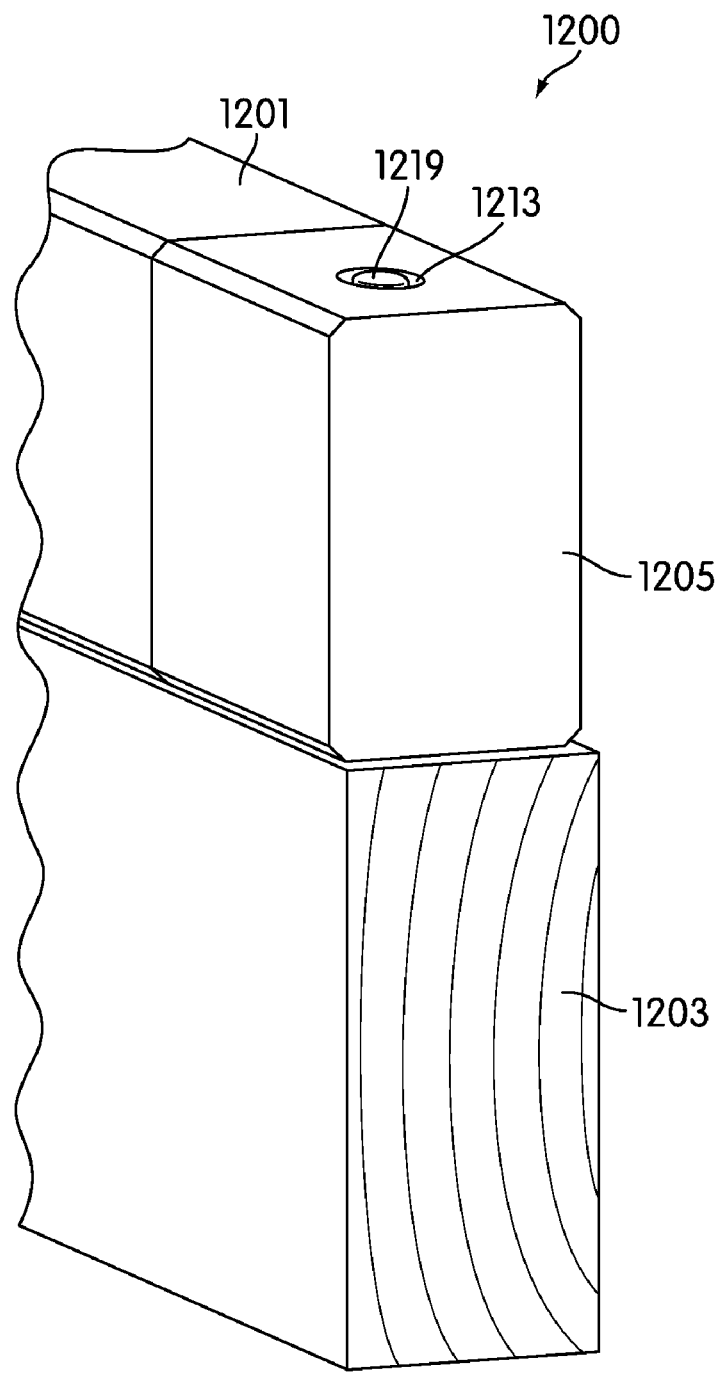
FIG. 12C illustrates at least a portion of an end of a clamp level and a workpiece according to various implementations of the invention.

In some implementations, a level body need not be attached to a workpiece using a clamping device, but rather the workpiece may receive pins, screws, or other implements. FIGS. 12A, 12B, and 12C illustrate an attachment portion 1200 that can be used to attach a level body 1201 to a workpiece 1203. Attachment portion 1200 includes a body 1205 and at least one attachment member, which is illustrated in FIGS. 12A and 12B as pin 1207. Pin 1207 is mounted in through-hole 1209 of body 1205 (additional pins may be used, each in their own through-hole). Through-hole 1209 includes a narrow portion 1211 and a wide portion 1213. The transition between narrow portion 1211 and wide portion 1213 includes shoulders 1215. FIGS. 12A and 12B illustrate a cross-section of body 1205, to better illustrate the internal parts of through-hole 1209, while FIG. 12C illustrates an intact body 1205.

Pin 1207 may have a first end 1217 that is sharpened sufficiently to penetrate wood or other materials. Located at the second end of pin 1207 is an actuation portion (e.g., a button) 1219 and a collar portion 1221. Mounted over pin 1207, proximate to collar portion 1221, is spring 1223 (e.g., a compression spring). When pin is located in through-hole 1209, spring 1223 is positioned over collar portion 1221, between actuation portion 1219 and shoulders 1215 such that when actuation portion 1219 is moved/pushed in the direction of arrow 1225 (see FIG. 12B), spring 1223 is compressed, creating a bias in a direction opposite to the direction of arrow 1225. When actuation portion 1219 is pressed with sufficient force, sharpened/first end 1217 of pin 1207 penetrates workpiece 1203 (e.g., penetration point 1219 in FIG. 12B). If enough force is used to move actuation portion 1219, pin 1207 may penetrate workpiece 1203 deep enough to hold body 1205 (and thus level body 1201) to workpiece 1203 (thereby counterbalancing the bias of spring 1223, which tends to remove pin 1207 from workpiece 1203).

In some implementations, actuation portion 1219 may be designed to withstand a blow from a striking tool (e.g., hammer, nail set, etc.) intended to drive pin 1207 into workpiece 1203. In some implementations, sharpened/first end 1217 may be designed (e.g., sharp enough) such that manual (e.g., hand/thumb) pressure on actuation portion 1219 may be sufficient to drive sharpened/first end 1217 into workpiece 1203 such that body 1205 is held in place.

When sharpened/first end 1217 is within workpiece 1203, attachment portion 1200 may be said to be in the deployed position. Attachment portion 1200 (and thus level body 1201) may be removed from workpiece 1203 by manually pulling attachment portion 1200 away from workpiece 1203. When pin 1207 is removed from workpiece 1203, the bias of spring 1223 acts to retract pin 1207 away from workpiece 1203 and into through-hole 1209 so that sharp end 1217 does not protrude from through-hole 1209 (back into a storage position).

Figure 13A:
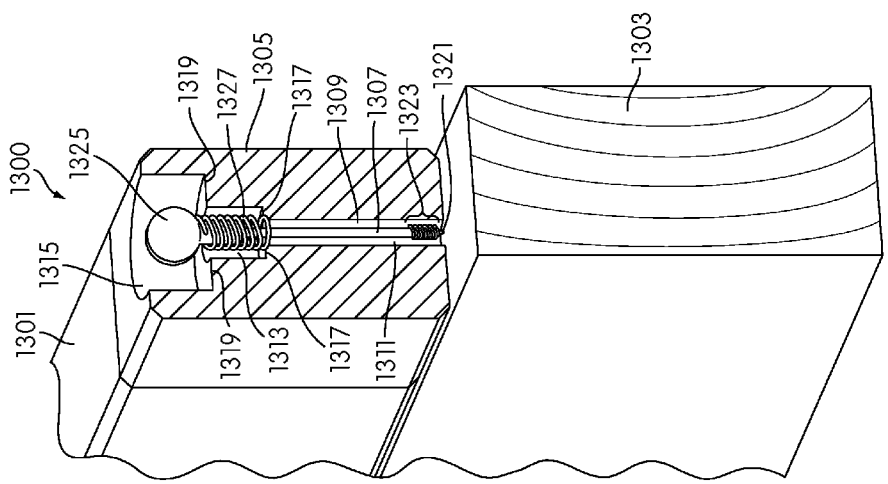
FIG. 13A illustrates at least a portion of an end of a clamp level and a workpiece according to various implementations of the invention.
Figure 13B:
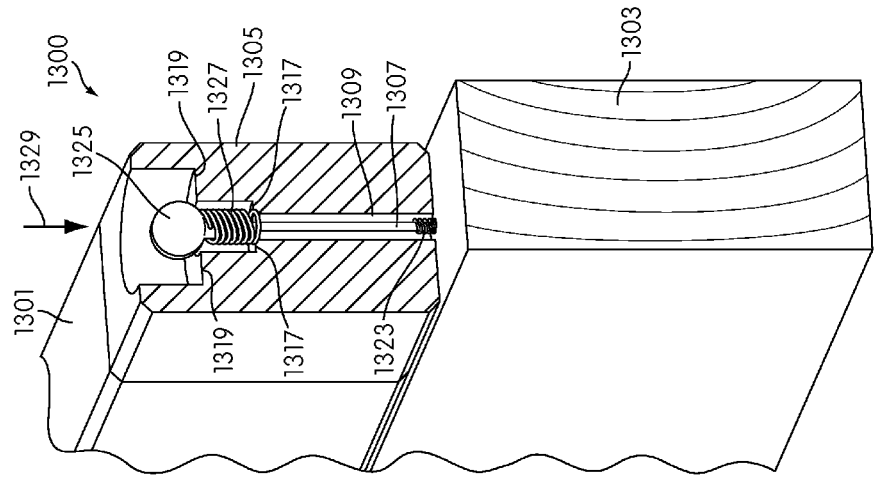
FIG. 13B illustrates at least a portion of an end of a clamp level and a workpiece according to various implementations of the invention.
Figure 13C:
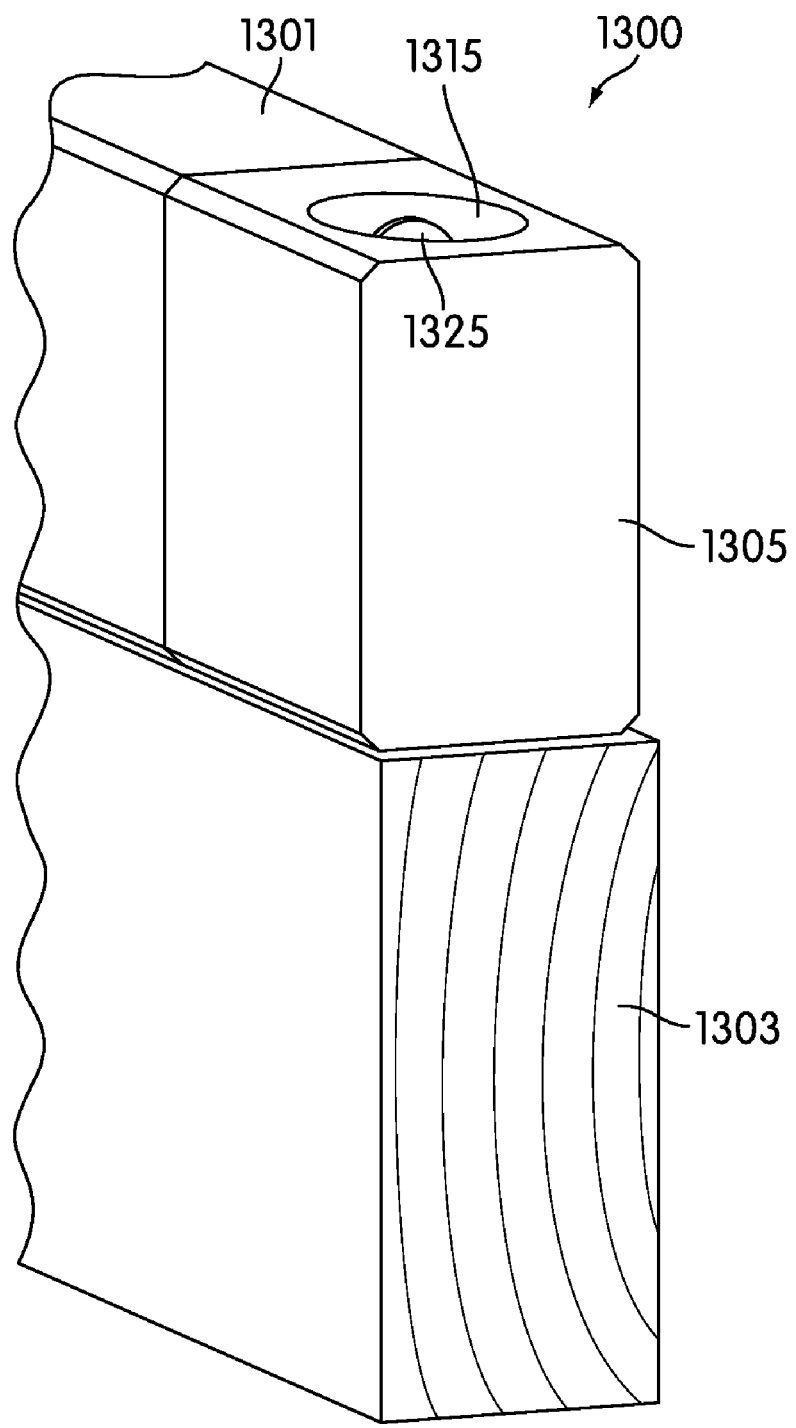
FIG. 13C illustrates at least a portion of an end of a clamp level and a workpiece according to various implementations of the invention.

FIGS. 13A, 13B, and 13C illustrate an attachment portion 1300 that can be used to attach a level body 1301 to a workpiece 1303. Attachment portion 1300 includes a body 1305 and at least one attachment member, illustrated in FIGS. 13A and 13B as screw 1307. Screw 1307 is mounted in through-hole 1309 of body 1305 (additional screws may be used, each in their own through-hole). Through hole 1309 includes a lower portion 1311, a middle portion 1313, and an upper portion 1315. The transition between lower portion 1311 and middle portion 1313 includes shoulders 1317. The transition between middle portion 1313 and upper portion 1315 includes shoulders 1319. FIGS. 13A and 13B illustrate a cross-section of body 1305, to better illustrate the internal parts of through-hole 1309, while FIG. 13C illustrates an intact body 1305.

Screw 1307 may have a first end that has a sharpened tip 1321 and a threaded portion 1323 (similar to a wood screw) such that the first end can penetrate and be threaded into wood or other materials. Located at a second end of screw 1307 is an actuation portion 1325 (e.g., a flattened portion rendering screw 1307 to be rotated by a human hand, similar to a thumb screw). Mounted over screw 1307, proximate to actuation portion 1325, is spring 1337 (e.g., a compression spring). When screw 1307 is located in through-hole 1309, spring 1337 is positioned between actuation portion 1325 and shoulders 1317 such that when screw 1307 is moved/pushed in the direction of arrow 1329 (see FIG. 13B), spring 1327 is compressed, creating a bias in a direction opposite to the direction of arrow 1329. When actuation portion 1325 moved in the direction of arrow 1329 and rotated so as to screw threaded portion 1323 into workpiece 1303, screw 1307 may be screwed into workpiece 1303 so as to hold body 1305 (and thus level body 1301) to workpiece 1303 (thereby counterbalancing the bias of spring 1327, which tends to remove screw 1307 from workpiece 1303).

In some implementations, actuation portion 1325 need not be a flattened portion described above, but may include other features. For example, in some implementations, actuation portion may have surfaces similar to that of a wing nut so as to enable screw 1307 to be actuated by a human hand. In some implementations actuation portion need not include features enabling it to be actuated by a human hand, but may include a more traditional screw head that is actuatable using a screwdriver (e.g., a Philips head, a flat head, star configuration, hexagon configuration or other configuration for screw heads) or other tool.

When the first end of screw 1307 is within workpiece 1303, attachment portion 1300 may be said to be in the deployed position. Attachment portion 1300 (and thus level body 1301) may be removed from workpiece 1303 by unscrewing threaded portion 1323 from workpiece 1303. When screw 1307 is removed from workpiece 1303, the bias of spring 1327 acts to retract screw 1307 within through-hole 1309 so that end 1321 does not protrude from through-hole 1309 (e.g., back into a storage position).

Other clamp embodiments other clamping elements/methods may be used to secure a level body to a workpiece using the features and functions described herein.

It will be appreciated that the above-described configurations are exemplary only and that other configurations having more, less, and/or different components may be used. The dimensions or other characteristics of the elements described herein for clamping a level to a workpiece may vary according to the size/shape/material of the workpiece to which the level is to be attached. For example, in some implementations, the clamp members or other clamping elements described herein may be sized to clamp the narrow edge of "two inch" dimensional lumber (e.g., the "two-inch" edge of a 2×3, 2×4, 2×6, 2×8, 2×10, 2×12, or other "2×" lumber), which may actually be narrower than two inches wide. However, in some implementations the clamps described herein may be designed to be utilized with workpieces having other dimensions.

In some implementations the spring bias or other bias exerted by the various springs and/or rigid elements as described herein may be such that the clamp levels described herein may be securely, but removably, clamped to wood or other building materials. Those having ordinary skill in the art will recognize that elements described herein as springs or otherwise described as "creating a bias," "being biased," or "biasing" a given element in a given manner may be accomplished by numerous types of rigid elements that deform under certain forces, but return to a given shape once the given forces are removed. As such, even though the term "spring" may be used herein in the description of certain implementations, other rigid elements (including springs of types other than those shown and described, may be used to perform one or more of the bias-creating the features and functions described herein.

In some implementations, clamping elements of the clamp levels described herein may be able to clamp to surfaces of varying widths and/or shapes. In some implementations, the clamping elements of the clamp levels described herein may be able to or configured to clamp to rounded (e.g., concave/convex) edged surfaces or circular workpieces (e.g., pipes), for example through the use of correspondingly shaped (e.g., convex/concave) clamping surfaces or certain materials at clamping surfaces.

In some implementations, the clamps described herein may include clamps that are removable from their respective elongated level bodies. In some implementations, clamps that are removable from an elongated clamp body may be readily removable (e.g., an elongated level body may have a clamp located at each end, wherein each clamp includes an attachment portion configured to slide into a hollow end of the elongated body). In some implementations, clamps that are removable may be removable when one or more fasteners (e.g., screws, clips, and/or other fasteners) are manipulated and/or removed. In some implementations, the clamps of a clamp level described herein may not be removable from their elongated level bodies, but may be integrated into an elongated level body (e.g., a clamp body may be a part of or integrated with an elongated level body). In some implementations, clamps may be present at one or more ends of an elongated level body. In some implementations one or more clamps may be present anywhere along the length of an elongated clamp body (e.g., in the middle of an elongated clamp body or between the middle of an elongated clamp body and an end) instead of or in addition to clamps present at one or more ends of an elongated level body.

While some of the implementations described herein refer to un-deployed or storage positions wherein elements of a clamp do not protrude generally from the height and/or width dimensions of a level body (of clamp body) associated with such described implementations, other implementations using similar mechanisms and/or elements as those described may be used that result in un-deployed or storage positions wherein certain elements do extend beyond height and/or width dimensions of an associated level body or clamp body.

Additionally, while some of the implementations described herein include description of two movable clamping members or elements having two movable clamping surfaces/ends, it should be understood that in some implementations similar mechanisms and/or elements may be used to construct implementations having only one movable clamping member/surface/end that clamps a workpiece between itself and a stationary element. Furthermore, mechanisms and elements similar to those described herein may be used to construct implementations having more than two movable clamp members/surfaces/ends for clamping a workpiece therebetween.

Figure 14:
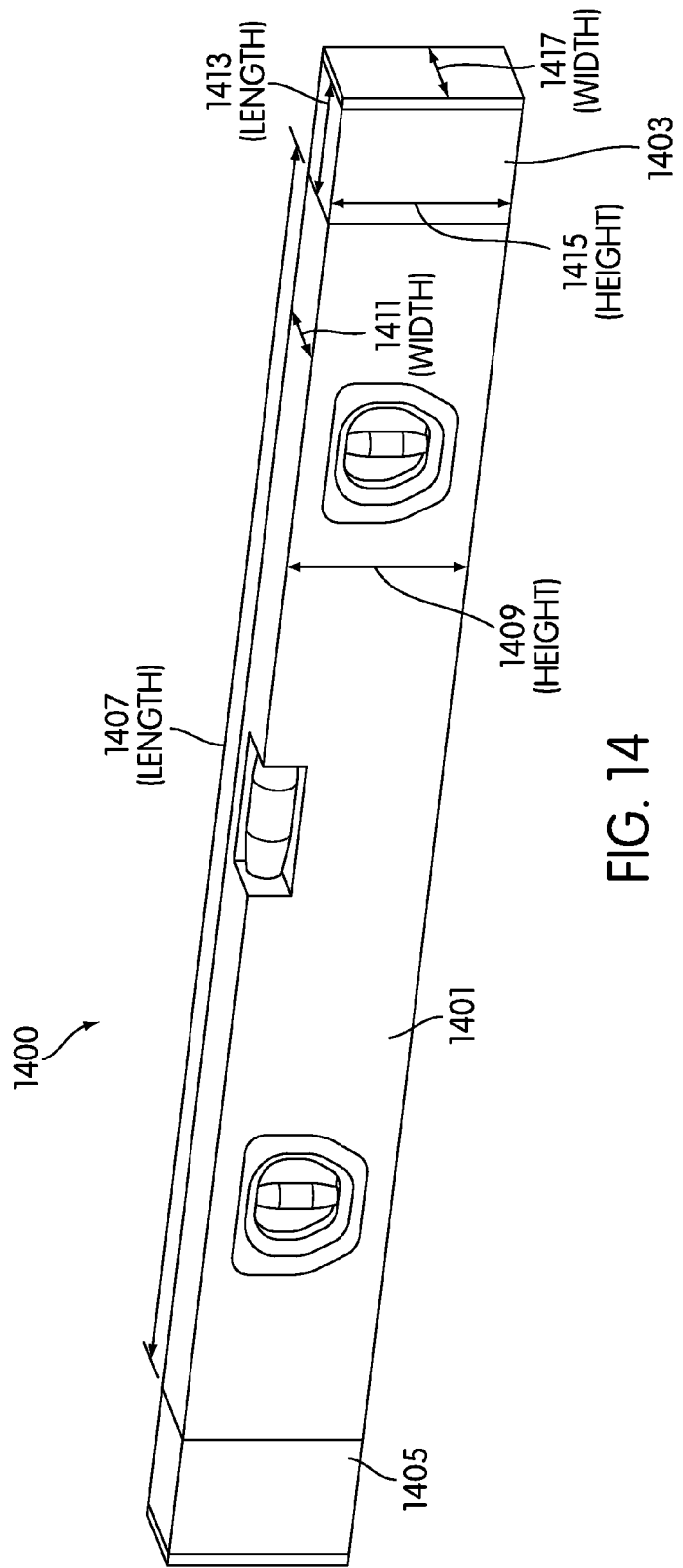
FIG. 14 illustrates a clamp level according to various implementations of the invention.

FIG. 14 illustrates a clamp level 1400, having an elongated body 1401 and attachment portions (e.g., clamps or other attachment portions) 1403 and 1405. Clamp level 14 illustrates that elongated body has a length dimension 1407, a height dimension 1409, and a width dimension 1411. So as to avoid confusion, the dimensions of a given attachment portion as described herein (e.g., clamp or other attachment portion) should be construed with reference to the above-recited dimensions of the corresponding elongated body as described in FIG. 14. As such, the length dimension of the elongated body provides a reference point for what is considered to be the length dimension of an attachment portion (even though this may not be the longest dimension of the attachment portion). Correspondingly, the height dimension of the elongated body provides a reference point for what is to be considered the height dimension of an attachment portion and the width dimension provides a reference point for what is to be considered the width dimension of an elongated body. Therefore, for example, attachment portion 1403 may include a length dimension 1413, a height dimension 1415, and a width dimension 1417.

While the invention has been described with reference to the certain illustrated embodiments, the words that have been used herein are words of description, rather than words of limitation. Changes may be made, within the purview of the associated claims, without departing from the scope and spirit of the invention in its aspects. Although the invention has been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the associated claims.

What is claimed is:

1. A level device that is attachable to a workpiece, the level device comprising:
    an elongated body portion having one or more level-sensing elements incorporated therein;
    at least one clamp on the elongated body portion, the at least one clamp including:
        a clamp body portion having first and second recesses, first and second clamp members movable relative to the body portion,
        a clamp release that holds the first and second clamp members in a storage position and enables the first and second clamp members to be moved into a deployed position,
    wherein the first and second clamp members are storable within their corresponding first and second recesses when in the storage position, and
    wherein the first and second clamp members are deployed into the deployed position by actuating the release portion so that the first and second clamp members move away from their respective recesses.

2. The level device of claim 1, wherein the at least one clamp portion includes a first clamp end portion attached to a first end of the elongated body portion, and a second clamp end portion attached to a second end of the elongated body portion.

3. The level device of claim 1, wherein the at least one clamp further includes a first spring that biases the first clamp member away from the first recess in a first direction, and wherein the at least one clamp further includes a second spring that biases the second clamp member away from the second recess in a second direction.

4. The level device of claim 3, wherein the release portion includes a first hook member protruding into the first recess, a second hook member protruding into the second recess, and an actuation portion.

5. The level device of claim 4, wherein the first hook member engages a catch portion of the first clamp member, thus preventing the first latch member from moving in the first direction as biased by the first spring, and when the second hook member engages a catch portion of the second clamp member, thus preventing the second latch member from moving in the second direction as biased by the second spring.

6. The level device of claim 5, wherein the first and second clamp members are deployed from the first and second recesses by actuating the actuating portion of the release portion such that the first and second hook members are disengaged from the first and second catch portions of the first and second clamp members, thus enabling the first clamp member to move out of the first recessed area in the first direction and the second clamp member to move out of the second recessed area in the second direction.

7. The level device of claim 1, wherein the first and second clamp members include one or more gripping surfaces on a surface that contacts the workpiece.

8. The level device of claim 1, wherein at least one of the one or more level-sensing elements includes a bubble vial.

9. The level device of claim 1, wherein the elongated body portion has a width dimension and a height dimension, and wherein the at least one clamp does not exceed the width dimension or the height dimension of the elongated body portion when the first and second clamp members are in the storage position.

10. The level device of claim 9, wherein the first and second clamp members protrude beyond the height dimension of the elongated body portion when in the deployed position.

11. The level device of claim 1, wherein the movement of one or more of the first or second clamp members relative to the clamp body portion includes one or more of pivotable movement, linearly slidable movement, or rotational slidable movement.

12. A level device that is attachable to a workpiece, the level device comprising:
   an elongated body portion having one or more level-sensing elements;
   a clamp having first and second clamp members, the clamp members being movable relative to the body portion between a storage position and a deployed position, wherein, in the storage position, the clamp members are in a compact configuration, adjacent the body, and in the deployed position, the clamp members are positioned to clamp a workpiece therebetween; and
   a release structure that retains the first and second clamp members in the storage position, the release structure being movable to an activated position, wherein movement of the release structure to the activated position enables movement of the clamp members from the storage position to the deployed position.

13. The device of claim 12, wherein the first and second clamp members are spring biased toward one another when in the deployed position.

14. A device for determining the relationship of a surface to level, the device comprising:
   an elongated body portion having one or more level-sensing elements incorporated therein; and
   at least one clamp on the elongated body portion, the at least one clamp including:
      first and second clamp members, each of the first and second clamp members including an arm extension and a clamp arm, wherein the first and second clamp members are spring biased towards one another
   wherein the first and second clamp members are storable in a storage position, wherein the arm extensions of the first and second clamp members are in a compact configuration relative to their corresponding clamp arms when in the storage position, and
   wherein the first and second clamp members are deployable to a deployed position, wherein in the deployed position the arm extensions extend away from their corresponding clamp arms, and wherein the extended arm extensions are spaced apart from one another and configured such that the clamp arms spread apart when the arm extensions are manually squeezed together against the spring bias.

15. The device of claim 14, wherein the at least one clamp further comprises a clamp body portion, and wherein the clamp arm of each of the first and second clamp members comprises two spaced apart arm portions and is pivotably attached to the clamp body portion at a pivot location.

16. The device of claim 15, wherein when the first and second clamp members are in the storage position, the arm extension of each of the first and second clamp members rests between the spaced apart arm portions of the first clamp arm.

17. The device of claim 15, wherein each clamp arm of the first and second clamp members are pivotably attached to the clamp body portion at the pivot location by a spring that exerts the spring bias such that the clamp arm portion of the first clamp member is biased in a first direction, and such that the clamp arm of the second clamp member is biased in a second direction opposite to the first direction.

18. The device of claim 17, wherein the first and second clamp members are deployed when:
   the arm extension of the first clamp member is rotated about the pivot location in the second direction, out of the spaced apart arm portions of the clamp arm of the first clamp member, until the arm extension of the first clamp member forms a predetermined obtuse angle in relation with the clamp arm of the first clamp members, wherein the arm extension of the first clamp member is prevented from moving further in the second direction relative to the clamp arm of the first clamp member,
   the arm extension of the second clamp member is rotated about the pivot location in the first direction, out of the spaced apart arm portions of the clamp arm of the second clamp member, until the arm extension of the second clamp member forms a predetermined obtuse angle in relation with the clamp arm of the second clamp member, wherein the arm extension of the second clamp member is prevented from moving further in the second direction relative to the clamp arm of the second clamp member,
   a force is applied that moves the arm extension of the first clamp member and the arm extension of the second clamp member towards one another, thereby forcing the clamp arm of the first clamp member and the clamp arm of the second clamp member away from one another against the bias of the clamp arm of the first clamp member in the first direction and against the bias of the clamp arm of the second clamp member in the second direction,
   the first and second clamp members are moved toward the workpiece so as to position at least a portion of the workpiece between at least a portion of the clamp arms of the first and second clamp members, and
   the force is removed such that the clamp arm of the first clamp member moves about the pivot location in the first direction and the clamp arm of the second clamp member moves about pivot location in the second direction, thereby clamping the at least a portion of the workpiece between the clamp arms of the first and second clamp members.

19. The device of claim 18, wherein the at least one clamp further comprises a compression spring biasing the first and second clamp members away from the portion of clamp body portion closest to the workpiece, thereby biasing the clamp body portion and the elongated body portion of the device towards the workpiece.

20. The level device of claim 14, wherein each clamp arm of the first and second clamp members include one or more horizontal ridges on a surface that contacts the workpiece.

21. The device of claim 14, wherein at least one of the one or more level-sensing elements includes a bubble vial.

22. The level device of claim 14, wherein the elongated body portion has a width dimension and a height dimension, and wherein the at least one clamp does not exceed the width dimension or the height dimension of the elongated body portion when the first and second clamp members are in the storage position.

23. The level device of claim 22, wherein the clamp arms of the first and second clamp members protrude beyond the height dimension of the elongated body portion when in the deployed position.

24. A device for determining the relationship of a surface to level, the device comprising:
   an elongated body portion having one or more level-sensing elements incorporated therein; and
   at least one clamp on the elongated body portion, the at least one clamp including:
      a clamp body,
      a first clamp member having at least a first actuating surface and a first clamping surface, and
      a second clamp member having at least a second actuating surface and a second clamping surface,
   wherein the first and second clamping surfaces are spring biased towards one another,
   wherein the first and second clamp members are storable in a storage position such that the first and second clamp members do not protrude from the dimensions of the clamp body,
   wherein the first and second clamp members are deployable to a deployed position such that at least a portion of the first and second clamp members extend away from the dimensions of the clamp body, and
   wherein the first and second clamping surfaces are spread apart when the first and second actuating surfaces are manually squeezed together against the spring bias.

25. A device for determining the relationship of a surface to level, the device comprising:
   an elongated body portion having one or more level-sensing elements incorporated therein; and
   at least one clamp on the body portion, the at least one clamp including:
      first and second clamp members, each of the first and second clamp members each including a first clamp arm portion and a second clamp arm portion, wherein each first clamp arm portion has a clamping surface such that the first clamp arm portions of the first and second clamp members form a first set of clamping surfaces, and wherein each second clamp arm portion has a clamping surface such that the second clamp arm portions of the first and second clamp members form a second set of clamping surfaces,
   wherein the first and second clamp members are storable in a storage position when the second clamp arm portions of the first and second clamp members are located adjacent to their corresponding first clamp arm portions, and the first clamp arm portions are located adjacent to the at least one clamp body portion, and
   wherein the first and second clamp members are deployable to a first deployed position and a second deployed position, the first deployed position including the first set of clamping surfaces of the first clamp arm portions being extended such that a workpiece of a first size is positionable therebetween, the second deployed position including the second set of clamping surfaces of the second clamp arm portions being extended away from the first clamp arm portions such that a workpiece of a second size is positionable therebetween.

26. The device of claim 25, wherein the at least one clamp further comprises a clamp body, wherein each of the first and second clamp members are pivotably mounted to the clamp body at a pivot location, wherein the first clamp member is biased to rotate about the pivot location in a first direction, wherein the second clamp member is biased to rotate about the pivot location in a second direction opposite to the first direction.

27. The device of claim 26, wherein the first and second clamp members are, as a unit, slidably mounted to the clamp body, wherein the first set of clamping surfaces are extended away from the clamp body by manually sliding the first and second clamp members relative to the clamp body so that the first set of clamp surfaces extend a way from the clamp body, and wherein a workpiece is clamped between the first set of clamping surfaces.

28. The device of claim 26, wherein each second clamp arm portion has a first end and second end, each second clamp arm portion being pivotably mounted to their respective first clamp arm portion at the second end, and wherein the second set of clamping surfaces are extended away from the first clamp arm portions by pivoting the first end of each second clamp arm portion away from its respective first clamp arm portion.

29. A level device, comprising:
   an elongated body portion having one or more level-sensing elements incorporated therein, the elongate body portion including at least a reference surface to which the one or more level-sensing elements are calibrated to;
   a clamp assembly including:
      a first pair of clamp arms, the first pair of clamp arms having a first maximum spread therebetween to enable the first pair of clamp arms to clamp a workpiece of a first dimension, and
      a second pair of clamp arms, the second pair of clamp arms having a second maximum spread therebetween that is greater than the first maximum spread to enable the second pair of clamp arms to clamp a workpiece of a second dimension, the second dimension being larger than the first dimension,
   wherein the first pair of clamp arms and the second pair of clamp arms of the clamp assembly are positioned at the same end of the elongated body portion.

30. The level device of claim 29, wherein each of the clamp arms of the first pair of clamp arms include a clamping surface thereon, and wherein each of the clamp arms of the first pair of clamp arms are biased by a spring such that the clamping surfaces of the first pair of clamp arms are biased towards one another.

31. The level device of claim 30, wherein the first pair of clamp arms are slidably mounted within the clamp assembly so that the first pair of clamp arms are movable toward or away from the workpiece of a first dimension.

32. The level device of claim 31, wherein the first pair of clamp arms are positionable in a storage position and a deployed position, the storage position including when the first pair of clamp arms do not extend away from at least two dimensions of the elongated body portion, and the deployed position including when the first pair of clamp arms are slid toward the workpiece of a first dimension such that the clamping surface of each of the clamp arms of the first pair of clamp arms extend away from at least one of the at least two dimensions of the elongated body portion.

33. The level device of claim 32, wherein the first pair of clamp arms is moved from the storage position to the deployed position when:
 a top portion of each of the clamp arms of the first pair of clamp arms are squeezed together by a force such that the clamping surfaces of the first pair of clamp arms are moved, against the bias, apart from one another;
 the first pair of clamp arms are slid towards the workpiece of the first dimension such that the clamping surfaces of the first pair of clamp arms extend away from at least one of the at least two dimensions of the elongated body portion;
 the workpiece of a first dimension is positioned between the clamping surfaces of the first pair of clamp arms; and
 the force is released such that the clamping surfaces of the first pair of clamp arms move, with the bias, toward each other and clamp the workpiece of a first dimension therebetween.

34. The level device of claim 29, wherein each of the clamp arms of the second pair of clamp arms include a clamping surface thereon, and wherein each of the clamp arms of the second pair of claims arms are biased by a spring such that the clamping surfaces of the second pair of clamp arms are biased towards one another.

35. The level device of claim 34, wherein each clamp arm of the second pair of clamp arms is pivotably attached to one of the clamp arms of the first pair of clamp arms, and wherein each clamp arm of the second pair of clamp arms is movable about its pivotable attachment between a storage position and a deployed position.

36. The level device of claim 35, wherein a clamp arm of the second pair of clamp arms is in the storage position when the clamp arm of the second pair of clamp arms does not extend away from a clamp arm of the first pair of clamp arms to which the clamp arm of the second pair of clamp arms is pivotably attached.

37. The level device of claim 36, wherein a clamp arm of the second pair of clamp arms is in the deployed position when the clamp arm of the second pair of clamp arms is extended away from a clamp arm of the first pair of clamp arms to which the clamp arm of the second pair of clamp arms is pivotable attached.

38. The level device of claim 35, wherein a clamp arm from the second pair of clamp arms is moveable from the storage position to the deployed position by pivoting the clamp arm of the second pair of clamp arms about its pivotable connection with a clamp arm of the first pair of clamp arms so that the clamp arm of the second pair of clamp arms extends away from the clamp arm of the first pair of clamp arms.

39. A level device that is attachable to a workpiece, the level device comprising:
 an elongated body portion having one or more level-sensing elements incorporated therein; and
 at least one clamp on the elongated body portion, the at least one clamp including:
  a clamp body portion, and
  at least two clamp members configured to engage a workpiece,
 wherein the elongated body is biased towards the workpiece when the at least two clamp members engage the workpiece.

40. A level device that is attachable to a workpiece, the level device comprising:
 an elongated body portion having one or more level-sensing elements incorporated therein; and
 at least one clamp on the elongated body portion, the at least one clamp including:
  a stationary clamp member, and
  a movable clamp member that is movable relative to the stationary clamp member such that a size of a gap between the stationary clamp member and the movable clamp member varies with movement of the movable clamp member, the variation in the size of the gap being such that workpieces having varying sizes are clampable between the stationary clamp member and the movable clamp member.

41. A level device that is attachable to a workpiece, the level device comprising:
 an elongated body portion having one or more level-sensing elements incorporated therein; and
 at least one attachment portion on the elongated body portion, the at least one attachment portion including:
  a body portion having at least one through-hole,
  at least one attachment member located in the at least one through-hole, the at least one attachment member including a first end and a second end, wherein the first end is configured to be attached to the workpiece, and wherein the second end includes an actuation portion configured to enable attachment of the first end to the workpiece,
  a spring biasing the at least one attachment member away from the workpiece.

42. The level device of claim 41, wherein the at least one through-hole comprises at least two through holes, wherein the at least one attachment member includes at least two attachment members, wherein each of the at least two through holes include one of the at least two attachment members.

43. The level device of claim 41, wherein the first end of the at least one attachment member includes a sharpened end configured to penetrate the workpiece.

44. The level device of claim 43, wherein the actuation portion is configured to enable a human hand to push the first end into the workpiece.

45. The level device of claim 41, wherein the first end of the at least one attachment member includes a threaded end configured to be screwed into the workpiece.

46. The level device of claim 45, wherein the actuation portion is configured to enable to a human hand to screw the first end into the workpiece.

47. A level device that is attachable to a workpiece, the level device comprising:
 an elongated body portion having one or more level-sensing elements incorporated therein; and
 at least one clamp on the elongated body portion, the at least one clamp including:
  a clamp member having a first end and a second end, the clamp member including at least one bend between the first and second ends such that the first and second ends generally oppose one another, the clamp member having a rigidity such that the first and second ends are biased towards one another,
  a spreading portion, and
  an actuation portion, wherein the clamp member is positioned between the actuation portion and the spreading portion, such that when the actuation portion is moved towards the clamp member, the spreading portion causes the first and second ends to spread apart against the bias of the clamp member, enabling a workpiece to be positioned therebetween.

48. The level device of claim 47, wherein the at least one clamp includes a rigid element positioned between the at least one bend of the clamp member and the spreading portion, the rigid element biasing the bend away from the spreading portion, and wherein when a force that moved the actuation portion towards the clamp member is removed, the bias of the rigid element causes the first and second ends to be drawn together, therefore clamping the workpiece positioned therebetween.

49. A level device that is attachable to a workpiece, the level device comprising:
   an elongated body portion having one or more level-sensing elements incorporated therein; and
   at least one clamp on the elongated body portion, the at least one clamp including:
      a clamp member having a first end and a second end, the clamp member including at least one bend between the first and second ends such that the first and second ends generally oppose one another, the clamp member having a rigidity such that the first and second ends are biased towards one another, wherein each of the first and second ends include an angled spreading surface, and
      an actuation surface,
   wherein when the actuation surface is moved towards a workpiece to be clamped, the spreading surfaces of the first and second ends contact the workpiece and cause the first and second ends to spread apart against the bias of the clamp member, enabling the workpiece to be positioned therebetween.

50. The level device of claim 49, wherein the at lease one clamp further includes a clamp body and a rigid element positioned between the clamp body and the clamp member, the rigid element biasing the clamp member away from the workpiece to be clamped, and wherein when a force that moved the actuation surface towards the workpiece to be clamped, the bias of the rigid element causes the first and second ends to be drawn together, therefore clamping the workpiece positioned therebetween.

51. A level device that is attachable to a workpiece, the level device comprising:
   an elongated body portion having one or more level-sensing elements incorporated therein; and
   at least one clamp on the elongated body portion, the at least one clamp configurable in a storage position and a deployed position, the at least one clamp including:
      a first clamp member having a first clamping surface, and
      a second clamp member having a second clamping surface,
   wherein the first and second clamp member form an opening between the first and second clamping surfaces,
   wherein when in the storage position, the opening faces a first direction and the first and second clamping surfaces do not extend beyond a height dimension of the elongated level body, and
   wherein when in the deployed position, the opening faces a second direction and the first and second clamping surfaces extend beyond the height dimension of the elongated level body.

52. The level device of claim 51, wherein the first clamp member includes a first actuation surface and the second clamp member includes a second actuation surface, wherein when in the deployed position, the first and second actuation surfaces are manually squeezed together, thereby spreading the first and second surfaces apart and widening the opening such that a workpiece can be positioned therein.

\* \* \* \* \*

UNITED STATES PATENT AND TRADEMARK OFFICE
CERTIFICATE OF CORRECTION

PATENT NO.        : 8,402,667 B2
APPLICATION NO.   : 12/726180
DATED             : March 26, 2013
INVENTOR(S)       : Spaulding et al.

It is certified that error appears in the above-identified patent and that said Letters Patent is hereby corrected as shown below:

Title Page, Item (12) "Spaulding" should read -- Spaulding, et al. --.

Title Page, Item (75) Inventor is corrected to read:
-- James Spaulding, Bristol (CT);
  John Delneo, Middletown (CT) --.

Signed and Sealed this
Sixth Day of October, 2015

Michelle K. Lee
*Director of the United States Patent and Trademark Office*